US007404148B2

(12) United States Patent
Lincke et al.

(10) Patent No.: US 7,404,148 B2
(45) Date of Patent: Jul. 22, 2008

(54) METHOD, SYSTEM AND APPARATUS USING A SENSORY CUE TO INDICATE SUBSEQUENT ACTION CHARACTERISTICS FOR DATA COMMUNICATIONS

(75) Inventors: Scott D. Lincke, San Carlos, CA (US); Ronald Marianetti, II, Morgan Hill, CA (US); Joseph K. Sipher, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 713 days.

(21) Appl. No.: 10/353,262

(22) Filed: Jan. 27, 2003

(65) Prior Publication Data

US 2003/0197719 A1 Oct. 23, 2003

Related U.S. Application Data

(63) Continuation of application No. 09/182,945, filed on Oct. 29, 1998, now Pat. No. 6,590,588, which is a continuation-in-part of application No. 09/086,888, filed on May 29, 1998, now Pat. No. 6,253,326.

(51) Int. Cl.
*G06F 3/48* (2006.01)
*G06F 30/00* (2006.01)

(52) U.S. Cl. ................ 715/805; 715/760; 715/234; 709/168; 713/172

(58) Field of Classification Search .......... 715/734, 715/864, 805; 709/218; 705/40; 455/556.2
See application file for complete search history.

(56) References Cited

U.S. PATENT DOCUMENTS

| | | | | |
|---|---|---|---|---|
| 4,617,657 A | * | 10/1986 | Drynan et al. | 370/394 |
| 4,785,420 A | * | 11/1988 | Little | 704/271 |
| 5,182,553 A | * | 1/1993 | Kung | 340/7.1 |
| 5,333,256 A | * | 7/1994 | Green et al. | 715/772 |
| 5,379,057 A | * | 1/1995 | Clough et al. | 345/173 |
| 5,390,281 A | * | 2/1995 | Luciw et al. | 706/11 |
| 5,425,077 A | * | 6/1995 | Tsoi | 455/566 |
| 5,434,777 A | * | 7/1995 | Luciw | 704/9 |
| 5,491,495 A | * | 2/1996 | Ward et al. | 345/173 |

(Continued)

OTHER PUBLICATIONS www.w3c.org et al."Compact HTML for small information appliances", 1998.*

*Primary Examiner*—Weilun Lo
*Assistant Examiner*—Steven B. Theriault
(74) *Attorney, Agent, or Firm*—Kacvinsky LLC

(57) ABSTRACT

A communications device provides a user with a sensory cue that informs the user of certain characteristics of a subsequent action that includes data communications. By informing the user of the data communication characteristics before the user initiates the data communication action, the invention appropriately sets user expectations regarding the data communication characteristics. For example, one embodiment of the invention is implemented in a portable communications device with a screen. For subsequent actions that include wireless communications, the portable communications device simultaneously displays a wireless link icon sensory cue next to a user interface graphic element. The user interface element is used to initiate the subsequent action. The user interface element can be an operating system object having an embedded link type icon. The wireless link icon informs the user that the subsequent action corresponding to the user interface element requires wireless communication and the expense and time associated therewith. A method, a system and an apparatus for indicating characteristics of a subsequent action to a user before the user begins the subsequent action are provided.

39 Claims, 18 Drawing Sheets

U.S. PATENT DOCUMENTS

| | | | |
|---|---|---|---|
| 5,519,392 A * | 5/1996 | Oder et al. | 340/995.27 |
| 5,537,474 A * | 7/1996 | Brown et al. | 380/248 |
| 5,552,779 A * | 9/1996 | Gaskill et al. | 340/7.56 |
| 5,586,317 A * | 12/1996 | Smith | 719/320 |
| 5,668,875 A * | 9/1997 | Brown et al. | 380/248 |
| 5,727,159 A * | 3/1998 | Kikinis | 709/246 |
| 5,805,166 A * | 9/1998 | Hall et al. | 715/839 |
| 5,818,446 A * | 10/1998 | Bertram et al. | 715/746 |
| 5,825,353 A * | 10/1998 | Will | 345/184 |
| 5,831,664 A * | 11/1998 | Wharton et al. | 725/81 |
| 5,848,356 A * | 12/1998 | Jambhekar et al. | 455/403 |
| 5,861,883 A * | 1/1999 | Cuomo et al. | 715/733 |
| 5,890,172 A * | 3/1999 | Borman et al. | 715/501.1 |
| 5,900,875 A * | 5/1999 | Haitani et al. | 715/840 |
| 5,908,467 A * | 6/1999 | Barrett et al. | 709/218 |
| 5,948,066 A * | 9/1999 | Whalen et al. | 709/229 |
| 5,949,418 A * | 9/1999 | Shields et al. | 715/795 |
| 5,950,130 A * | 9/1999 | Coursey | 455/432.1 |
| 5,986,654 A * | 11/1999 | Alexander et al. | 715/744 |
| 6,026,435 A * | 2/2000 | Enomoto et al. | 709/217 |
| 6,037,935 A * | 3/2000 | Bates et al. | 715/760 |
| 6,047,197 A * | 4/2000 | Jarrad | 455/566 |
| 6,065,120 A * | 5/2000 | Laursen et al. | 726/5 |
| 6,073,113 A * | 6/2000 | Guinan | 705/26 |
| 6,084,584 A * | 7/2000 | Nahi et al. | 715/864 |
| 6,084,951 A * | 7/2000 | Smith et al. | 379/93.17 |
| 6,088,730 A * | 7/2000 | Kato et al. | 709/247 |
| 6,112,228 A * | 8/2000 | Earl et al. | 709/205 |
| 6,119,155 A * | 9/2000 | Rossmann et al. | 709/219 |
| 6,173,316 B1 * | 1/2001 | De Boor et al. | 709/218 |
| 6,208,342 B1 * | 3/2001 | Mugura et al. | 715/810 |
| 6,211,858 B1 * | 4/2001 | Moon et al. | 715/771 |
| 6,233,577 B1 * | 5/2001 | Ramasubramani et al. | 707/9 |
| 6,266,681 B1 * | 7/2001 | Guthrie | 715/501.1 |
| 6,278,449 B1 * | 8/2001 | Sugiarto et al. | 715/826 |
| 6,310,634 B1 * | 10/2001 | Bodnar et al. | 715/854 |
| 6,321,158 B1 * | 11/2001 | DeLorme et al. | 701/201 |
| 6,333,973 B1 * | 12/2001 | Smith et al. | 379/88.12 |
| 6,336,142 B1 * | 1/2002 | Kato et al. | 709/227 |
| 6,338,094 B1 * | 1/2002 | Scott et al. | 709/245 |
| 6,353,839 B1 * | 3/2002 | King et al. | 715/513 |
| 6,393,307 B1 * | 5/2002 | Kim | 455/566 |
| 6,397,246 B1 * | 5/2002 | Wolfe | 709/217 |
| 6,405,037 B1 * | 6/2002 | Rossmann | 455/426.1 |
| 6,415,164 B1 * | 7/2002 | Blanchard et al. | 455/566 |
| 6,433,800 B1 * | 8/2002 | Holtz | 715/835 |
| 6,438,390 B1 * | 8/2002 | Awan | 455/566 |
| 6,456,841 B1 * | 9/2002 | Tomimori | 455/412.2 |
| 6,473,629 B1 * | 10/2002 | Chang | 455/566 |
| 6,477,529 B1 * | 11/2002 | Mousseau et al. | 707/5 |
| 6,509,913 B2 * | 1/2003 | Martin et al. | 715/762 |
| 6,526,129 B1 * | 2/2003 | Beaton et al. | 379/90.01 |
| 6,610,105 B1 * | 8/2003 | Martin et al. | 715/513 |
| 6,674,453 B1 * | 1/2004 | Schilit et al. | 715/810 |
| 6,677,964 B1 * | 1/2004 | Nason et al. | 715/764 |
| 6,704,027 B2 * | 3/2004 | Nakano | 345/636 |
| 6,714,220 B2 * | 3/2004 | Sigl | 715/780 |
| 6,727,916 B1 * | 4/2004 | Ballard | 715/758 |
| 6,731,316 B2 * | 5/2004 | Herigstad et al. | 715/864 |
| 6,804,786 B1 * | 10/2004 | Chamley et al. | 726/20 |
| 6,826,593 B1 * | 11/2004 | Acharya et al. | 709/203 |
| 6,834,048 B1 * | 12/2004 | Cho et al. | 370/356 |
| 6,862,713 B1 * | 3/2005 | Kraft et al. | 715/728 |
| 6,886,013 B1 * | 4/2005 | Beranek | 707/10 |
| 6,904,570 B2 * | 6/2005 | Foote et al. | 715/863 |
| 6,987,987 B1 * | 1/2006 | Vacanti et al. | 455/556.2 |
| 6,996,777 B2 * | 2/2006 | Hiipakka | 715/727 |
| 7,143,193 B1 * | 11/2006 | Abbott et al. | 709/248 |
| 7,167,728 B1 * | 1/2007 | Wagner et al. | 455/566 |
| 7,246,323 B2 * | 7/2007 | Uemura et al. | 715/752 |
| 2001/0014615 A1 * | 8/2001 | Dahm et al. | 455/566 |
| 2002/0091738 A1 * | 7/2002 | Rohrabaugh et al. | 707/517 |
| 2003/0013483 A1 * | 1/2003 | Ausems et al. | 455/556 |
| 2003/0187806 A1 * | 10/2003 | Banerjee et al. | 705/400 |
| 2004/0024610 A1 * | 2/2004 | Fradkov et al. | 705/1 |
| 2004/0090469 A1 * | 5/2004 | Moon et al. | 345/846 |
| 2005/0020316 A1 * | 1/2005 | Mahini | 455/566 |

* cited by examiner

FIG. 4 – WIRELESS NETWORK TOPOLOGY
INCLUDING WEB/MAIL SERVER

FIG. 5 – WIRELESS NETWORK TOPOLOGY INCLUDING A WIRELESS NETWORK INTERFACE, A LEASED LINE, AND A DISPATCHER

FIG. 6 – WIRELESS CLIENT PROCESSING RESOURCES FLOW DIAGRAM

FIG. 7 – RMP PACKET STRUCTURE

FIG. 8 – SIMPLE EXCHANGE OF A SINGLE REQUEST PACKET AND A SINGLE RESPONSE PACKET

FIG. 9 – EXCHANGE OF MESSAGES COMPRISING A SINGLE REQUEST PACKET AND TWO RESPONSE PACKETS

FIG. 10 – EXCHANGE OF MESSAGES INCLUDING A RE-TRANSMIT SEQUENCE

FIG. 11 – LOWER LEVEL COMMUNICATIONS LAYERS

FIG. 12 – FORMAT OF DATA PASSED BETWEEN WIRELESS CLENT SOFTWARE LAYERS

FIG. 13 — IP AND UDP HEADERS

METHOD, SYSTEM AND APPARATUS USING A SENSORY CUE TO INDICATE SUBSEQUENT ACTION CHARACTERISTICS FOR DATA COMMUNICATIONS

RELATIONSHIP TO COPENDING APPLICATIONS

This application is a continuation of application Ser. No. 09/182,945, entitled "Wireless, Radio-Frequency Communications Using a Handheld Computer", filed Oct. 29, 1998, now U.S. Pat. No. 6,590,588 B2, which is a continuation-in-part of application Ser. No. 09/086,888, entitled "Method and System for Secure Communications," filed May 29, 1998, now U.S. Pat. No. 6,253,326 B1, both of which are incorporated herein by reference in their entirety. The application also relates to the following copending United States patent applications which are incorporated herein by reference: Ser. No. 09/087,515, entitled "Method and Apparatus for Communicating Information over Low Bandwidth Communications Networks," filed May 29, 1998, now U.S. Pat. No. 6,343,318 B1; Ser. No. 09/087,563, entitled "Method, System and Apparatus for Packet Minimized Communications," filed May 29, 1998, now U.S. Pat. No. 6,397,259 B1; and Ser. No. 09/087,552, entitled "Method and System for Wireless Internet Access," filed May 29, 1998. The invention of each application is assigned to the assignee of this invention.

COPYRIGHT NOTICE

A portion of the disclosure of this patent document contains material that is subject to copyright protection. The copyright owner has no objection to the facsimile reproduction by anyone of the patent disclosures, as it appears in the Patent and Trademark Office patent files or records, but otherwise reserves all copyright rights whatsoever.

FILED OF THE INVENTION

This invention relates generally to the field of information communications. In particular, the invention relates to a method for providing a user with prior knowledge of certain characteristics of a subsequent action that includes data communications.

BACKGROUND OF THE INVENTION

Different types of communications can occur between two communications devices. For example, a server and a client can exchange messages wirelessly or in a wired system. The communications can require a variety of security measures—including communications that require no security measures. Among other characteristics of data communications, the expense and wait time associated with different types of actions can vary greatly.

Before the user initiates data communication, the data communication is considered a subsequent action. Knowledge of subsequent action characteristics prior to initiating an action enables a user to evaluate cost, security, time, network speed, and data communications message size limitations when determining whether to initiate the subsequent action. Methods of informing users of these characteristics known in the art include printed guides and manuals, help directories, and product and service support centers. The guides, manuals, and service support centers do not inform the user directly through the communications device. The help directories require the user to invoke the help menu, to identify and select the appropriate help topic, and to read and understand the help topic description.

Therefore what is desired is an improved system, apparatus, and method that enables users to make an informed selection before initiating data communications. The improved method informs the user directly through the communications device with minimal required user action. An improved system, apparatus, and method for informing the user of subsequent action characteristics is also desired for handheld device access to Internet information over relative low bandwidth networks.

Wireless communications provides one method for mobile users to communicate to a wired network. In particular, wireless communications allows consumers to receive and send information. Examples of such wireless networks include cellular phones, pager systems, and satellite systems. The wireless network systems can be broken into relatively high bandwidth and low bandwidth systems. High bandwidth systems are for example satellite systems. Lower bandwidth systems include cellular phones and mobile radio systems. Still lower bandwidth systems include pager networks and low bandwidth packet switched radio systems (e.g., the BellSouth Mobile Data Mobitex™ system).

For users to access information on the Internet using wireless communications, the method in which they access the information is highly dependent on the type of wireless communications available to the user. For example on a high bandwidth network such as a wired network or a satellite system, the usual techniques for browsing data on the Internet are adequate.

An important source of Internet based data is the data accessible through the World Wide Web (referred to as the Web). The following describes the usual techniques for Web browsing. A user selects a web site associated with a URL (Uniform Resource Locator). The URL represents the address of the entry point to the web site (e.g., the home page for the web site). For example, the user may select a web site that supplies restaurant reviews. The user's computer (the client) makes an HTTP (HyperText Transport Protocol) request to the web server hosting the web site. The client typically needs to make multiple HTTP requests of the web server. For example, to load the restaurant locator home page, multiple HTTP requests are needed to download all the graphics, frame content, etc. Next, the user will typically need to browse through a number of linked pages to get to the page from which a search for restaurants can be made. Even if the user is immediately presented with the desired page, a great deal of information has had to been downloaded from the web site (e.g., graphics, advertisements, etc.). This additional information makes for a visually rich browsing experience. The user fills in the information on this page and selects a search button. The client makes another series of HTTP requests of the web server. The web server supplies the client with the requested information in an HTML formatted web page. The web page typically includes links to more graphics and advertisements that need to be accessed by the client.

For low bandwidth networks this technique does not work well. Too much bandwidth is needed to download the images. Also, low bandwidth networks typically charge per byte transmitted and can be very expensive if large amounts of data are downloaded. Thus, low bandwidth networks are desirable to use for accessing information on the Web but only if the amount of data transferred over the network is small. Specifically for packet data networks, the cost of transmitting messages increases with the number of packets transmitted. The cost of transmitting multiple packet messages is therefore a formidable obstacle for packet data network customer use.

One area in which Web access is becoming more desirable is in handheld devices. Handheld devices are emerging as important computer devices. Handheld devices typically implement a relatively small, but important function set. Examples of such handheld devices are the PalmPilot™ handheld device available from 3COM Corporation, Inc. of Santa Clara, Calif. Examples of the function set supported are address books, calendars, and task lists.

In the past, wireless communications with handheld devices have been performed using wireless modems, such as are available from Novatel Communications, Inc. of Calgary, Alberta, or wireless transceivers for dedicated wireless data access network. Essentially a wireless modem operates in the cellular phone network and supplies approximately 9600 baud bandwidth to the handheld device. This allows the user to access the web at a relatively low bandwidth.

An issue with using handheld devices to access the Web is related to their capabilities. Even if connected to a high bandwidth network, most handheld devices do not have the screen area or the processing power to display the graphics and large amounts of text in a typical web page. However, it is still desirable to support the browsing of information on the Web using handheld devices. It is further desirable that the handheld devices be able to use networks that have relatively low bandwidths.

Some of the methods by which previous systems addressed some of the issues described above are now described.

One method of reducing the amount of data transferred from the web site to the client is to cache the web site data locally on the client. For example, the Netscape Communicator™ browser application caches web pages on the client. Each cached web page is associated with a URL. Thus, when the client requests a web page, the Netscape Communicator browser attempts to use previously cached web pages before downloading the pages from the web site. Another type of caching program is NetAttache™, available from Tympany, Inc. of Mountain View, Calif. The NetAttache program downloads all the web pages from a given web site. The web pages are all cached on the client. A NetAttache server runs locally on the client. A browser can then be used to browse through the local copy of the web pages. The problem with caching is that the pages still need to be retrieved from the server before they can be reused and there can still be a significant number of connections made to the web server.

Alternatively, some programs are customized for accessing specific information from particular web sites. Examples of these programs are Java applets that reside on the client or are served to the client by a server. The applets can then be reused to access information from a web site. An example of a specialized program for accessing specific information is the RealVideo Player from Real Networks, Inc. A problem with these types of programs is that they are very specific to a particular type of content. For example, they do not use standard HTML (hypertext markup language) constructs. This means that web site developers cannot use standard web site development tools to create their sites.

SUMMARY OF THE INVENTION

The following summarizes various embodiments and aspects of the invention. A communications device provides a user with a sensory cue that informs the user of certain characteristics of a subsequent action that includes data communication. By informing the user of the data communication characteristics before the user initiates the data communication action, the sensory cue appropriately sets user expectations regarding the data communication characteristics.

For example, one embodiment of the invention is implemented in a portable communications device with a screen. The portable communications device simultaneously displays a wireless link icon next to a user interface graphic element. The user interface element is used to select a wireless transaction. The wireless link icon informs the user that the subsequent action corresponding to the user interface element requires wireless communication and the expense and time associated therewith.

One aspect of the invention provides a method of indicating to a user, via a sensory cue, characteristics of a subsequent action that includes data communications. The method is implemented in a communications device having processing resources. The communications device performs the data communications.

The sensory cue indicates what behavior will occur when a user interface element that initiates the subsequent action is invoked. The communications device processing resources provide the sensory cue to the user before the user initiates the subsequent action. The sensory cue corresponds to a set of data communication characteristics of the subsequent action. More than one sensory cue can be provided for a particular subsequent action. Each of the sensory cues informs the user of a corresponding set of data communication characteristics.

According to some embodiments of the invention, an existing operating system object, such as a button or a hyperlink or other user interface element indicates the subsequent action and can be selected to initiate the subsequent action. The user interface element is accompanied by at least one sensory cue. The sensory cue is embedded into the user interface element.

Subsequent action characteristics can correspond to any feature or combination of features of the data communications included in the subsequent action, or can correspond to any feature or combination of features of the communication path that will be used for exchanging the data. Knowledge of the features enables the user to determine whether to initiate a particular subsequent action, especially where the subsequent action is initiated by transmitting data corresponding to the user interface element from the communications device. The subsequent action characteristics can relate to the mode of transmission, the network type, security measures, the speed of the network, whether the communication is asynchronous, the cost of the subsequent action, and/or data communications message size.

The communications device can include a screen. In conjunction with the screen, the sensory cue can include an image. Each image corresponds to a user interface element. The image can comprise an icon. For some embodiments of the method, each image is disposed proximally to the corresponding user interface element.

For example, the method can be implemented in a palm-sized computer having wireless data communications capability. The screen of the computer shows a user interface graphic element that is selected to initiate the subsequent action data communication. The data communications can correspond to a request for a hyperlink document. The user interface graphic element for this example is a hyperlink corresponding to the hyperlink document. The compact representation of the hyperlink document includes a link type bit. Selection of the hyperlink initiates the data communication.

The subsequent actions corresponding to the hyperlink can include either data communications transmitted wirelessly, or only data transmitted internally within the computer, or data communications transmitted by a wireline connection. For a hyperlink document requiring transmission of wireless messages, the communications device responds to the link type bit by displaying a wireless link icon before the user selects the hyperlink. For this example the sensory cue comprises a wireless link icon. The wireless link icon is also referred to as the "over the air" icon.

The wireless link icon informs the user that selection of the corresponding hyperlink will result in wireless data communication. The wireless link icon thereby sets user expectations to provide a better user experience by reducing confusion about the characteristics of the communication system's subsequent actions.

In many situations the user can select an alternative to the wireless transaction and avoid the expense, in time and money, associated with wireless data communications. In other situations, the user can determine that the wireless data communication is desired despite the greater costs associated therewith. When the wireless communication is desired, the user makes the decision to select the wireless communication only after being informed by the wireless link icon that the time and expense of the wireless communication will be incurred.

For some embodiments, the communications device includes a client that communicates with a server. The subsequent action includes a transaction comprising one or more data communications messages between the server and the client. The data communications comprise packets of data. The packets of data can be securely exchanged between the server and the client. The client can be a wireless client and the server can be a proxy server. A method for securely exchanging the packets of data includes the wireless client encrypting a data encryption key using a proxy server public key to form an encrypted data encryption key.

The data encryption key corresponds to a specific transaction between the wireless client and the proxy server. The wireless client encrypts the data packets included in the subsequent action using the data encryption key to form an encrypted message. The wireless client transmits the encrypted message from the wireless client to the proxy server. For the method of securely exchanging messages, the user interface graphic element can be a hyperlink corresponding to a hyperlink document. The hyperlink document is disposed in a base document. The sensory cue can include a secure link icon indicating to the user security measure attributes for the data communications. The secure link icon and the wireless link icon can be simultaneously displayed proximally to the corresponding user interface element.

A second aspect of the invention provides a communications device including a client. The client includes processing resources adapted to initiate a subsequent data communications action that has characteristics. The subsequent action can include a transaction including transmitting data from the client. The client also includes processing resources adapted to provide a sensory cue to a user prior to the user initiating the subsequent action. The sensory cue corresponds to a set of the subsequent action characteristics. The sensory cue informs the user of a set of the subsequent action characteristics. The client can be a wireless client.

A third aspect of the invention provides a communications system. The communication system includes a source of data, a communications device, and a server. The communications device includes a client as described in the paragraph above. The server communicates with the source of data and the client.

BRIEF DESCRIPTION OF THE FIGURES

The figures illustrate the invention by way of example, and not limitation. Like references indicate similar elements.

THE DESCRIPTION

Table of Contents

Figure 1:
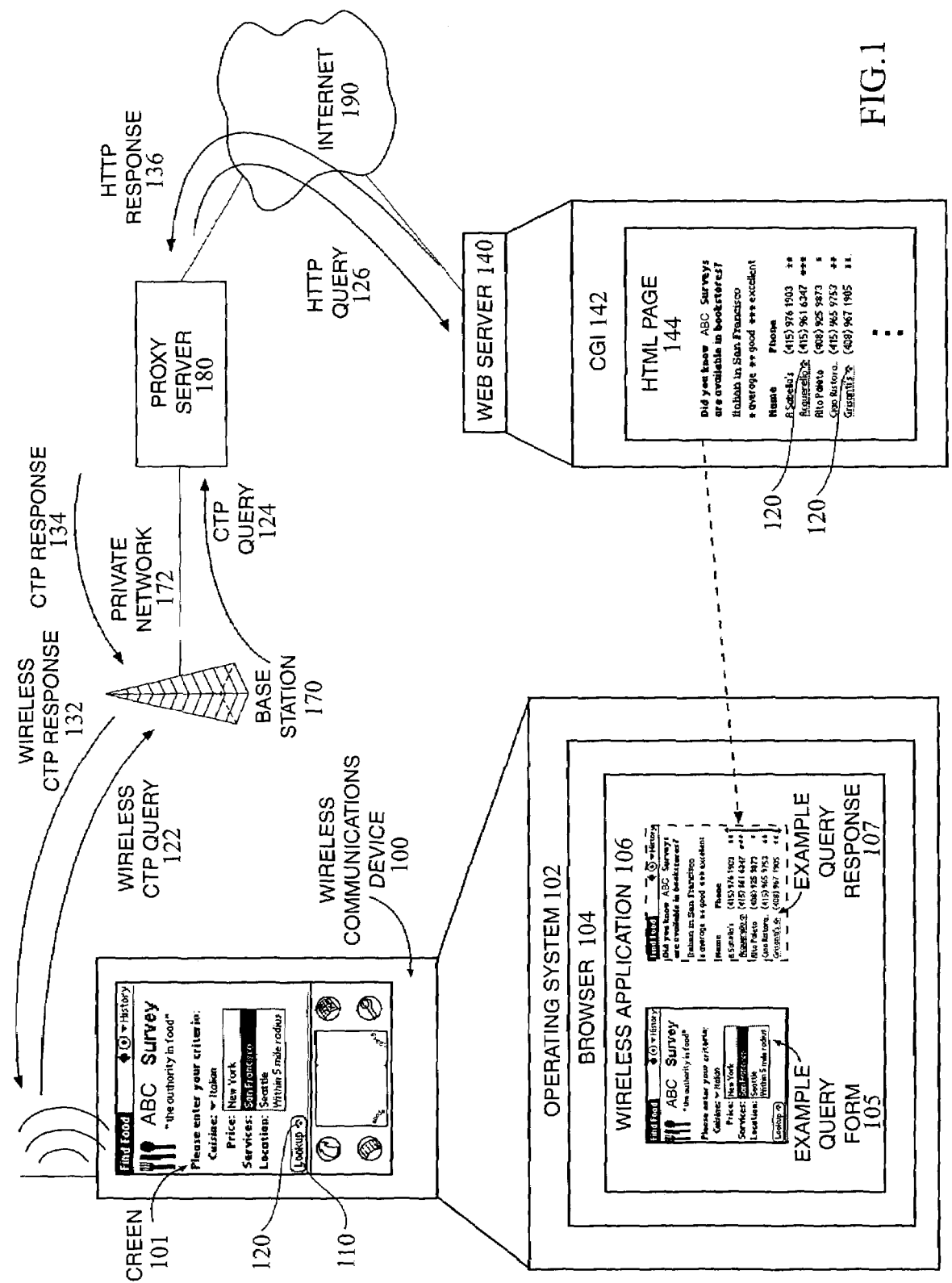
FIG. 1 illustrates a wireless communications device communicating with a web server.

METHOD, SYSTEM AND APPARATUS USING A SENSORY CUE TO INDICATE SUBSEQUENT ACTION CHARACTERISTICS FOR DATA COMMUNICATIONS
  RELATIONSHIP TO COPENDING APPLICATIONS
  COPYRIGHT NOTICE
  BACKGROUND OF THE INVENTION
  FIELD OF THE INVENTION
  SUMMARY OF THE INVENTION
  BRIEF DESCRIPTION OF THE FIGURES
THE DESCRIPTION
  TABLE OF CONTENTS
  OVERVIEW
  DEFINITIONS
  SYSTEM INTRODUCTION
    Browser
      Browser and HTML Compatability
      Example Method of Communicating Between a Wireless Communications Device and Web Server
      Example User Interface WIRELESS NETWORK TOPOLOGY
  Intranet Topology
CONTENT LAYER
  Compact Markup Language (CML)
    Compact Data Structure Notation
    CML Structure
    CML Tags
    Tag Definitions
    TagHyperlink
  HTML Element Fuctionality
    The Head Elements
    The Body
TRANSFER LAYER
  Wireless Client Software Block Diagram
  Compact Transfer Protocol
    CTP Structure
    CTP Requests
    CTP Responses
    CTP Data Types
    CTP Commands
  Hot Link Indices
    Encoding Indirect Hyperlinks
  Forms Processing
    Encoding Normal Form Submissions
    Encoding Server Dependent Form Submissions
  Secure Communications
    Security Requirements
    Security Protocol
    Strength and Possible Attacks
    Encryption Algorithms
    Administration
INDICATING SUBSEQUENT ACTION CHARACTERISTICS
  Method for Indicating Subsequent Action Characteristics
    Method for Indicating Subsequent Action Characteristics Using Compact Markup Language
    Method for Displaying Link Type Icons
  Device and System for Indicating Subsequent Action Characteristics
RELIABLE MESSAGE LAYER AND RELIABLE MESSAGE PROTOCOL
  On Wireless Networks
  The RMP Header
  The RMP Data Area
  Re-transmission of Lost Packets
  The Reliable Message Protocol
  On Wireless Networks
  Reliable Message Layer Application Program Interface (API)
  Using the Reliable Message Layer on the Wireless Communications Device
  Implementation of RMP
    Implementation of RMP on the Proxy Server
    Implementation of RMP on the Wireless Communications Device
WIRELESS NETWORK INTERFACE
  Structure of the Wireless Network Interface
  Enhancements to the Network Library
HEADER COMPRESSION
  The C-UDP Header
    The C-UDP Header for Compressed Packets
    The C-UDP Header for Generic UDP Packets
    The C-UDP Header for Other IP Packets
  PROXY SERVER DETAILS
  COMMUNICATIONS SYSTEM DETAILS
    Tunneling Support
  ALTERNATIVE SYSTEM
THE CLAIMS
  ABSTRACT Overview This overview section generally describes some of the more important features of various embodiments and then briefly reviews the material in the subsequent sections.

One goal of the invention is to provide the user with prior notice of subsequent action characteristics via a sensory cue. The portion of the detailed description providing the most concentrated discussion of the subject matter related to this goal is provided in the Indicating Subsequent Action Characteristics section of this document. The subsequent action includes data communications. By informing the user of the data communication characteristics before the user selects the data communication action, the invention appropriately sets user expectations regarding the data communication characteristics. For example, one embodiment of the invention is implemented in a portable communications device with a screen. The portable communications device simultaneously displays a wireless link icon next to a user interface graphic element. The user interface element is used to select a wireless transaction. The wireless link icon informs the user that the subsequent action corresponding to the user interface element requires wireless communication and the expense and time associated therewith.

For one embodiment, the communications device is a palm-sized computer having wireless communications capability. The user interface element is an operating system object. The sensory cue is embedded in the user interface element. The subsequent action includes a request for a hyperlink document. The compact representation of the hyperlink document includes a link type bit that causes the link type icon to be simultaneously displayed next to a corresponding hyperlink on the palm-sized computer screen.

The subsequent action can include data transmitted by the communications device over a wireless connection, or only data transmitted internally within the computer, or data transmitted over a wireline connection. Before the user initiates the subsequent action, the communications device responds to the link type bit by displaying the appropriate link type icon.

For hyperlink documents requiring wireless data transmission the link type icon is a wireless link icon. The wireless link icon informs the user that the corresponding subsequent action will result in wireless communication. The wireless link icon thereby sets user expectations to provide a better user experience by reducing confusion about the characteristics of the communication system's subsequent actions. A wireline link icon can be displayed for subsequent actions that require transmission of data over a wireline connection.

A significant challenge in creating a wireless information solution for handheld devices is providing a product that is both useful and practical given the severely limited bandwidth and high power requirements of a wireless radio. Hardware and software should be optimized to conserve battery power and to reduce the amount of traffic that is sent over the wireless link. The wireless communications device, of various embodiments of the invention, has programs for web access and two-way messaging. One of these programs can include most of the static data from a web site. The static data can be used to format a query to access the dynamic data from the web site. Each program can be for accessing a different web site. Importantly, only the amount of static data that is communicated is significantly reduced.

The wireless communications device communicates as part of a communications system. The communications system includes the wireless communications device, a server, and a source of data. The server acts as a proxy server. Typical sources of data are a web server or a mail server.

Some wireless networks, such as those provided for two-way pagers and other wireless packet data networks, provide wider coverage and lower cost than competing networks. These wireless networks typically have relatively low performance however. A single packet of 400 bytes can take eight seconds just to travel to the Internet and back when the system is lightly loaded. With such a low throughput, it could easily take minutes to download even a small web page using standard browser technology. The wireless communications system therefore employs novel methods for reducing the amount of traffic sent over the wireless link for web access.

A second goal of some aspects of the invention is to provide the user with fast access to web content. Although the wireless communications device can access generic web content, because of the wireless communications device's limited screen size, most existing content will not be as visually appealing, will be harder to navigate, and may take longer to access than specially formatted content. Thus, significantly advantages are achieved with customized content. The web content can be formatted for the small screens of most handheld communications devices. This content will download relatively quickly (because of its small size). The formatted content can be created and published using the same tools used today for desktop web publishing (i.e. HTML tools and web servers) and could even be viewed using a standard desktop browser.

A third goal of some aspects of the invention is wireless messaging. To help achieve this goal, a proxy server facilitates communications between web servers, mail servers, and other Internet data sources and the wireless communications device. The proxy server improves performance for wireless networks. Because of the high latency and low bandwidth of wireless networks, using existing Internet protocols to directly access web servers from the wireless communications device would be prohibitively expensive and slow.

Another important factor to consider with wireless networks is latency. A minimum size packet has a round trip time of approximately three seconds on the low cost wireless network. Because of the large latency, the number of packets sent over the wireless link between the wireless communications device and the proxy server should generally be kept small. Thus, some embodiments of the invention are able to fetch most web pages and send or receive messages with just one packet up (wireless client->proxy server) and one packet down (proxy server->wireless client) over the wireless network.

Thus, some of the more important features of various embodiments of the invention have been described. The following provides an overview of the sections in the detailed description.

The Definitions section provides definitions of terms used in the detailed description.

The System Introduction section provides an introduction to the various elements of the wireless communications system.

The Wireless Network Topology section introduces the protocols used to communicate between the various devices in the system.

The Content Layer section describes the markup languages used in the system.

The Transfer Layer section describes a compact transfer protocol (CTP) used for communicating between the wireless communications device and the proxy server.

The Indicating Subsequent Action Characteristics section describes how the communications device provides sensory cues to users to indicate features of data communications included in a subsequent action and/or features of paths used to communicate the data.

The Reliable Message Protocol section describes reliable and efficient variable length message delivery over the wireline and wireless networks.

The Wireless Network Interface section describes a set of programs that can be used to access the wireless network as an IP network.

The Proxy Server Details section describes how the proxy server works with the content layer, the transfer layer, and the reliable message protocol.

The Communications System Details section describes how the content layer, the transfer layer, the reliable message protocol, the network interface and the proxy server can be used together.

Definitions

The following definitions will be helpful in understanding the description.

Computer—is any computing device (e.g., PC compatible computer, Unix workstation, handheld device etc.). Generally, a computer includes a processor and a memory. A computer can include a network of computers.

Handheld Device (Palmtop or Palm-sized Computer)—a computer with a smaller form factor than a desktop computer or a laptop computer. Examples of a handheld device include the Palm III™ handheld computer and Microsoft's palm sized computers.

User—any end user who would normally wish to retrieve information from the World Wide Web.

Internet—is a collection of information stored in computers physically located throughout the world. Much of the information on the Internet is organized onto electronic pages. Users typically bring one page to their computer screen, discover its contents, and have the option of bringing more pages of information.

Client—a computer used by the user to make a query.

Server—a computer that supplies information in response to a query, or performs intermediary tasks between a client and another server.

World Wide Web (or Web or web)—is one aspect of the Internet that supports client and server computers handling multimedia pages. Clients typically use software, such as the Netscape Communicator® browser, to view pages. Server computers use server software to maintain pages for clients to access.

Program—a sequence of instructions that can be executed by a computer. A program can include other programs. A program can include only one instruction.

Application—is a program or a set of hyper-linked documents.

System Introduction

FIG. 1 illustrates a wireless communications device communicating with a web server. In this example, the wireless communications device includes a handheld computer (or portable computer) having wireless communications capabilities. The handheld computer has predefined applications that correspond to a portion of the web site being served by the web server. Using the applications, a user can use to make queries of the web server. Some embodiments of the invention provide compression techniques that enable the wireless handheld computer to complete a web based information request using only one packet up to a proxy server and only one packet back down to the wireless communications device.

Figure 2:
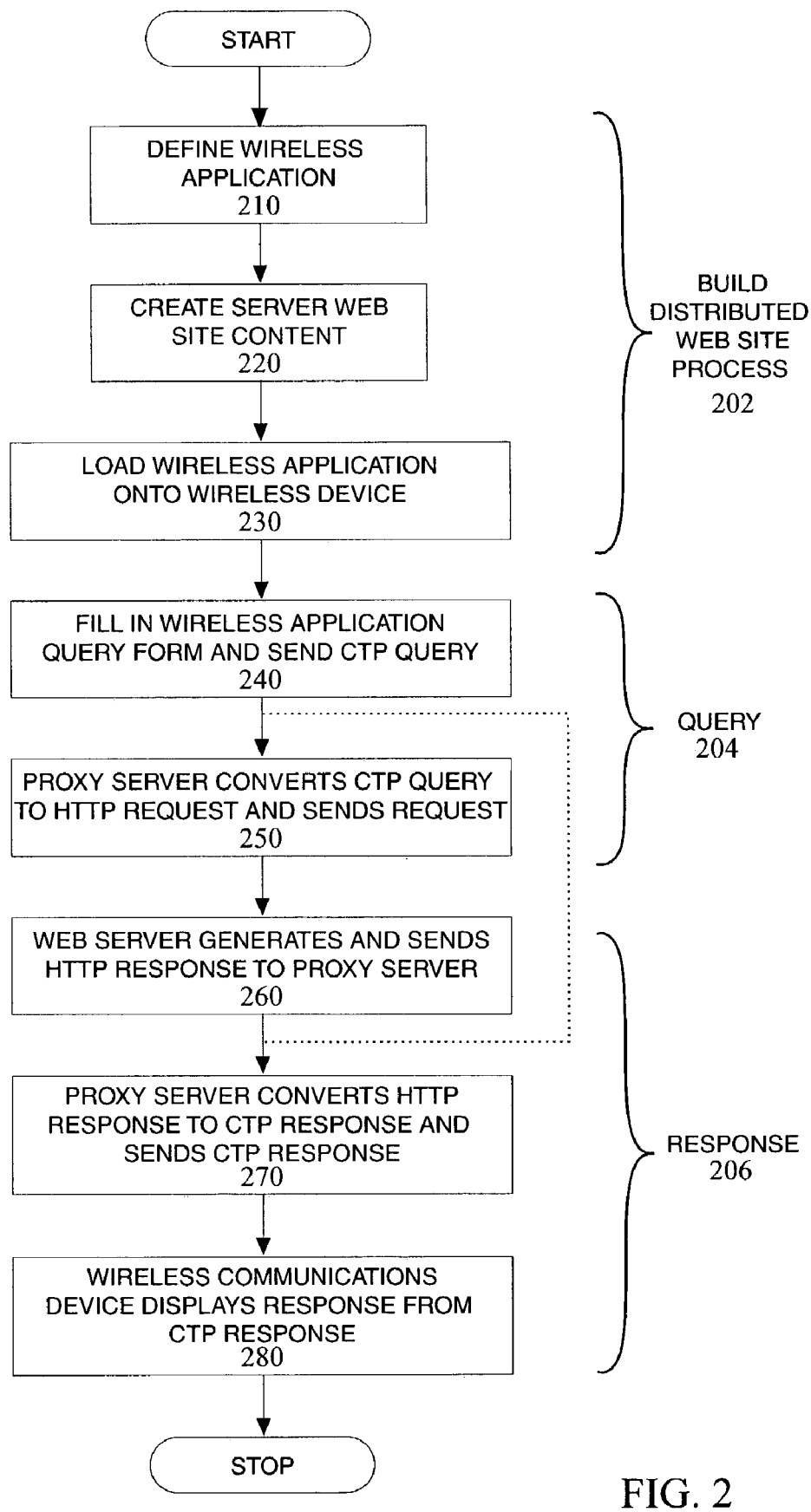
FIG. 2 illustrates a method of communicating between a wireless communications device and a web server.

The following paragraphs first list the elements of FIG. 1, then describe how the elements are coupled, and then describe the elements in detail. FIG. 2 describes the operation of the elements.

This paragraph lists the elements of FIG. 1. FIG. 1 includes a wireless communications device 100, a base station 170, a proxy server 180, the Internet 190, and a web server 140. The wireless communications device 100 includes a screen 101 and is running an operating system 102. Displayed on the screen 101 is a "Lookup" user interface graphic element 110 that is user for selecting a corresponding subsequent action. A first wireless link icon 120 is displayed on the screen 101 to the right of the "Lookup" user interface graphic element 110. The first wireless link icon 120 informs the user that the data communications that will be initiated by selecting the "Lookup" user interface graphic element 110 include wireless communications. Further discussion of the use of sensory cues, such as the first wireless link icon 120, to inform the user of subsequent action characteristic is provided in the Indicating Subsequent Action Characteristics section of this document.

The operating system supports the execution of a browser 104. The browser 104 runs with the wireless application 106 and displays an example query form 105 and an example query response 107. Between the base station 170 and the proxy server 180 is a private network 172. The web server 140 includes a CGI (Common Gateway Interface) program 142. The CGI program 142 is responsible for generating the HTML page 144. FIG. 1 also includes a number of arrows indicating queries and responses. These queries and responses include a wireless CTP (Compressed Transport Protocol) query 122, a CTP query 124, an HTTP query 126, an HTTP response 136, a CTP response 134, and a wireless CTP response 132.

The following describes how the elements of FIG. 1 are coupled. The wireless communications device 100 communicates with the base station 170 via wireless communications. The base station 170 is coupled to the proxy server 180 via the private network 172. The proxy server 180, and the web server 140 are all coupled to the Internet 190.

The following paragraphs describe the elements of FIG. 1 in greater detail.

The wireless communications device 100 represents a handheld device that has wireless communications capabilities (also referred to as a portable computer or handheld computer with wireless communications capabilities). In one example system, the wireless communications device 100 includes a Palm III™ compatible handheld device having wireless communications capabilities. The wireless communications device 100 is for communicating over the BellSouth Mobile Data (BSMD) Mobitex system. Other embodiments of the invention support other wireless communications networks. Importantly, the BSMD Mobitex system is a relatively low bandwidth network. The embodiments of the inventions support querying of web based data using such a low bandwidth network.

The operating system 102 is an example of an operating system that can run on a handheld computer. Examples of such operating systems include the Palm OS™ operating system, available from the 3COM Corporation, of Santa Clara, Calif. The operating system 102 supports the running of applications. The operating system 102 also supports low level communications protocols, user interface displays, and user input.

The browser 104 is an example of a program (or group of programs) that supports some standard browsing features (e.g., displaying markup language documents, following hyper-links). The browser 104 is for generating queries and receiving responses. The browser 104 can interface with groups of hyper-linked, marked up documents (also referred to as pages). The browser 104 can also interface with standalone programs that do not use marked up documents. In this example, the browser 104 is executing with the wireless application 106. The browser 104 is described in greater detail below.

The wireless application 106 represents one of many predefined applications that are stored locally on the wireless communications device 100. Each wireless application represents a static portion of a web site tree. That is, this information does not change significantly over time. The web site tree is the data structure representing the hyper-linked web pages of a web site. (Note that the tree is actually usually a graph.) Each predefined application is used for accessing a different web site. The predefined applications can be downloaded to the wireless communications device 100 through wireless communications, but more typically, they are downloaded through a docking cradle or through infrared communications with another wireless communications device 100.

The wireless application 106, in this example, includes a number of hyper-linked pages. One of the pages includes the example query form 105. This example query form 105 is used to generate a query that is answered as the example query response 107. Alternatively, the wireless applications can standalone applications access through the browser 104. The applications can be C programs, JAVA programs, and/or compressed markup language (CML) or HTML pages.

The query response 107 represents the dynamic data in the web site tree (the data that can change often). The query response 107 includes information retrieved from the web server 140.

The example query form 105 and the example query response 107 can be stored in a CML format. The markup language is compressed relative to HTML. This compressed markup language is described in greater detail below. What is important is that the compressed markup language is a subset and superset of HTML and is requires far fewer bytes than HTML typically requires. Additionally, the compressed markup language represents a compressed description of information to be displayed on the screen 101. The browser 104 uses the representation to generate the display on the screen 101.

The base station 170 represents a wireless communications base station. The BSMD Mobitex system includes base stations like the base station 170. The base station 170 is responsible for communicating with the wireless communications device 100 and other wireless communications devices (e.g. pagers).

The private network 172 represents the communications links between a base station 170 and a proxy server 180. The BSMD Mobitex system has such a private network. Between the base station 170 and the proxy server 180, many servers, routers, and hubs, etc. may exist. In some embodiments, the private network 172 may communicate with the proxy server 180 through the Internet 190. The proxy server 180 would then communicate with the web server 140, also through the Internet 190.

The proxy server 180 represents one or more computers that convert queries from the wireless communications device 100 into queries that are compatible with Internet protocols. The proxy server 180 communicates with the wireless network, which can include low bandwidth and high latency communications. The proxy server 180 decompresses information from the wireless network side for use on the Internet 190 side of the proxy server 180. Also, the proxy server 180 converts Internet protocols and content into a form that can be used by the wireless network and the wireless communications device 100. In some embodiments, the proxy server 180 can converts image content to a size and bit depth appropriate for display on the wireless communications device 100. In some embodiments, the proxy server 180 communicates over the Internet 190 using standard Internet protocols such as, TCP, HTTP, and SSL. This allows developers to use already existing Internet protocols in their web servers.

In some embodiments, the proxy server 180 is substantially stateless. That is, it does not keep state information about specific wireless communications device accesses. This configuration of the proxy server 180 tolerates communication and protocol errors more readily and allows for simpler scaling of the proxy server 180. Statelessness should not be confused with caching. The proxy server 180 can cache CML web pages for use by multiple wireless communications devices 100.

In order to achieve reasonable performance and cost over wireless networks, the browser 104 works in tandem with the proxy server 180. The wireless communications device 100 and proxy server 180 communicate with each other using a compressed transport protocol (CTP) built on top of IP. The goal of this protocol is to enable a user to fetch and display a web page on the wireless communications device 100 with a one packet request sent to the proxy server 180. Typically, a one packet response is returned to the wireless communications device 100.

In one embodiment of the invention, the maximum packet size (for higher protocol packets, like IP) allowed over a low cost wireless network is 512 bytes. Taking into account a compressed header (usually three bytes), the maximum raw data size is 512−3=509 bytes.

The proxy server 180 transmits a typical page of web content to the wireless communications device 100 in roughly 500 bytes. This can be challenging given that most web pages have lots of formatting information, hot links and images. Web pages are typically many Kbytes in size. A hot link reference can easily take up 100 bytes or more. Just to fill the wireless communications device screen 101 with text (11 lines of 35 characters each) would take nearly 400 bytes even if there were no formatting information included.

This is why the wireless communications device 100 and the proxy server 180 use compressed web pages.

The Internet 190 represents the Internet. However, the Internet 190 could be replaced by any communications network.

The web server 140 responds to web accesses. The web server 140 serves regular, and specially constructed, HTML pages. In this example, the wireless communications device 100 is accessing the special HTML pages (e.g., HTML page 144). The example query response 107 corresponds to the HTML page 144. In other embodiments of the invention, the same HTML page can be served in response to a query from the wireless communications device 100 as is served to other types of clients. The HTML page 144 is generated by the CGI 142. The CGI 142 represents a program that can dynamically generate HTML pages in response to HTTP requests.

Turning to the query and response elements, the wireless CTP query 122 represents a compact transfer protocol (CTP) formatted query from the wireless communications device 100. The base station 170 receives this query and forwards it to the proxy server 180. The forwarded query is represented by CTP query 124. The proxy server 180 takes the CTP query 124 and converts it into one or more HTTP queries 126. The web server 140 receives this HTTP formatted query 126 and generates an HTTP response 136 that includes the HTML page 144. The proxy server 180 receives the HTTP response 136, and generates the CTP response 134. The base station 170 generates the corresponding wireless CTP response 132. The wireless communications device 100 then generates the display on the screen 101 of the example query response 107. Before describing this process in detail, the browser 104 is described in greater detail.

Browser

The browser 104 and supporting wireless messaging programs comprise the client processing resources for some embodiments of the invention. The web browser 104 works well with both wireless and wireline connections, enabling users to seamlessly access the web whether they are connected through the phone line or not. The messaging support enables a user to send and receive wireless messages with other users that have Internet e-mail accounts.

The browser 104 support both wireless and wireline connections. An effective wireless browsing solution leverages the use of the proxy server 180 in order to deliver satisfactory performance. A solution embodied in the roles established for the wireless communications device 100 and the proxy server 180 dramatically reduces the amount of data that is sent between the wireless communications device 100 and the proxy server 180 over the slow wireless link. This form of browsing is referred to hereinafter as thin browsing.

The performance of wireline links, on the other hand, is high enough that a wireless communications device 100 can talk directly to a source of data such as a web content server using standard Internet protocols such as HTML, HTTP and TCP. This is how existing desktop browsers work and will be referred to hereinafter as standard browsing.

Thin browsing can be used over wireline links as well as wireless links. The only extra requirement is that the proxy server 180 be accessible to the wireless communications device 100 over the Internet or an intranet. Standard browsing, on the other hand, is more appropriately used over wireline links because of increased chattiness and bandwidth requirements.

The browser 104 is structured as a single user-interface that runs either a standard browser engine or a thin browser engine. With either engine, the user interface essentially appears the same, and the way original HTML web content is interpreted and displayed will be almost identical. The browser 104 relies on the proxy server 180 for reducing the amount of traffic and the number of transactions required. Although designed primarily for use over wireless networks, the browser 104 can be used over wireline networks as well.

The primary purpose of the thin browser engine is for accessing content designed specifically for the limited screen 101 size and functionality of a wireless communications device 100. For some embodiments, this layout and size are the only differences between content rendered for a wireless communications device 100 and existing desktops. Thus, content creators for desktop content can use the same tools that are used for creating and publishing desktop content when creating and publishing content for the wireless communications device 100.

Content rendered for the wireless communications device 100 can reside on standard HTML based web servers in standard HTML format (e.g., see web server 140). The proxy server 180 performs a dynamic conversion of the HTML content into the more compact CML form before transmitting the content to the wireless communications device 100.

The browser 104 will not prevent a user from accessing desktop oriented sites, but the browser 104 can behave differently when accessing them. For example, graphics can be ignored when not accessing a wireless communications device friendly site whereas the user will have the option to enable graphics for wireless communications device friendly sites. Another example of the difference is the browser 104 protects the user from unintentionally downloading a large desktop oriented site. A user option enables the user to set the maximum size desktop page that may be downloaded. If a page is encountered which exceeds this maximum size, the page is clipped by the proxy server 180 before being sent down to the wireless communications device 100. The user is able to set this maximum size on a page per page basis in the favorites list of the browser 104.

When the user first launches the browser 104, the browser 104 is able to display the user's home page without sending or receiving even a single byte over the network. This is in contrast to the standard web browser that go over the network to fetch the home page, or at least to check that the locally cached version of the home page is up to date.

The browser 104 relies much more on pre-loaded content. A transaction typically takes place over the wireless network only when necessary. For example, in some embodiments of the invention, the browser 104 assumes that the locally cached form is up to date and only submits a network request to the proxy server 180 after the user fills in a form requesting an update.

Thus, the browser 104 is particularly suited for accessing real-time data, not casual browsing. Thus, emphasis is placed on optimizing the process of filling out a form (e.g., with airline flight information) then submitting the form, and getting the real-time data back. Although, the user will still be able to casually browse any web site, the increased cost and volume of data involved with going to most standard web sites makes casual browsing relatively undesirable over a wireless network.

A typical user scenario for the browser 104 would then be as follows. The user extends, or rotates, the antenna on the wireless communications device 100 and thereby automatically power up the wireless communications device 100. The browser 104 displays the user's home page (stored in local memory). The home page has been configured by the user with a set of service icons such as weather info, traffic info, airline info, stock quotes, etc. before the browser is used. The user clicks on one of the service icons, such as the airline information. This starts the corresponding wireless application which contains a form. The browser 104 displays the form (also stored in local memory) for the user to enter the flight number or city codes. The user enters the information in the form and hits the "submit" button. Now, for the first time in this scenario, the browser 104 sends a request out over the network to fetch the airline information. When the response comes back from the proxy server 180 (three to five seconds later), the information for that flight will be displayed on the screen 101.

As just described, there are a number of significant differences between the browser 104 and a standard web browser. First, the primary usage of the browser 104 is for accessing real-time data through form submittal. Second, most forms are pre-loaded into the wireless communications device 100 local memory or present in read only memory. Third, forms are assumed to be valid, and therefore no activity will take place over the network until the user actually fills in the form and submits it.

Browser and HTML Compatibility

The following describes the HTML compatibility of one embodiment of the browser 104. Other embodiments of the invention have different features.

In order to display most content published today on the Internet 190, the browser 104 supports the most common features of HTML. However, because of the screen size and limited memory and performance of wireless communications device 100, some HTML features may be limited in functionality or not supported at all.

Because of a limited number of available fonts and font styles, the browser 104 may not render every possible text attribute in HTML. A number of font sizes and styles map to the same font on the wireless communications device 100. However, the user does not encounter significantly reduced readability or usability as a result of the mapping.

The proxy server 180, as directed by the wireless communications device 100, can filters out all images, unless the user explicitly enables images, or the content author imbeds the appropriate tag into the content indicating that this page is wireless communications device 100 specific and that the images should be downloaded to the wireless communications device 100.

All text hyperlinks can be supported. If images are downloaded, then image maps will also work.

Forms will have nearly full functionality. The only feature of HTML forms that may not be supported is the use of dialogs that let the user choose a file name by browsing the local directory structure on the wireless communications device 100.

Tables that are too wide to fit on the screen can be wrapped.

CGI (Common Gateway Interface) scripts can be supported. CGI scripts are used by the web server 140 to respond to form submissions by browsers and for customizing web content for a particular user. When the browser 104 requests a web document that corresponds to a CGI script, the browser 104 can append text parameters to the end of the base document URL. The proxy server 180 will parse the parameters out of the URL and send them to an executable program on the web server 140, as identified by the URL. Most CGI executables will then output dynamically generated HTML that is consequently returned to the browser 104 and displayed. From the browser's 104 point of view then, fetching a web document that uses CGI scripts is no different from fetching a static web document (other than having a slightly more complex URL).

Example Method of Communicating Between a Wireless Communications Device and a Web Server FIG. 2 illustrates a method of communicating between a wireless communications device and a web server. Such a method can be implemented using the system of FIG. 1.

The example method of FIG. 2 can be broken into three processes: a build a distributed web site process 202, a query process 204, and a response process 206. By using these three processes, a distributed web site can be created where static information is primarily kept on the wireless communications device 100 and dynamic information is kept on the web server 140.

At block 210, a content developer defines a wireless application. In one embodiment of the invention, this includes defining a number of HTML pages. The HTML pages represents the forms used for querying the web server 140. A program is then used to convert the HTML pages into compressed markup language pages to generate the wireless application 106. This process is discussed in greater detail below in the compressed markup language section.

At block 220, the web server 140 is created, or modified, to support reduced content HTML pages. An example of such a page is shown as HTML page 144. These pages can be generated exactly the same way as regular HTML pages. However, as a guiding principle, the amount of information should include little more than the absolute minimum of information that a user would find useful.

At block 230, a user loads the wireless application 106 onto the wireless communications device 100. This can be done as a HotSync™ operation in a manner similar to the way in which other applications are loaded onto the wireless communications device 100. The wireless communications device 100, for example, can be connected to a computer via a cradle and the wireless application 106 can be loaded from the computer. Alternatively, the wireless application 106 can be downloaded over the wireless network. However, this second method of loading the wireless application 106 is less desirable in that it will require a significant amount of bandwidth. Thus, in a preferred embodiment, the user loads the wireless application 106 over a high bandwidth network (e.g., the cradle download or by an infrared transfer from another wireless communications device 100).

Thus, some of the web site information is stored on the wireless communications device 100 and some of it is stored in the web server 140. Thus, the building of the distributed web site process 202 has been described.

The query process 204 includes the following steps. At block 240, the user fills in a query form 105 as part of the wireless application 106. In the example of FIG. 1, the user is filling out a form to find Italian restaurants in San Francisco. Once the user has completed the form, the user selects the look up button. The look up button causes the wireless communications device 100 to initiate the wireless CTP query 122. The block 240 is completed by the sending of the wireless CTP query 122 and the CTP query 124 to the proxy server 180. The wireless CTP query 122 is sent to the base station 170. The base station 170, and related hardware, perform any necessary changes to the wireless CTP query 122 to generate the CTP query 124, and send the CTP query 124 over the private network 172.

At block 250, the proxy server 180 converts the CTP query 124 to an HTTP query 126 and forwards that HTTP query 126 to the web server 140. Thus, the query process 204 is completed.

Now the response process 206 is described. At block 260, the web server 140 generates and sends an HTML page 144 to the proxy server 180. At block 260, the web server 140 generates the HTTP response 136 in response to the HTTP query 126. In this example, because the HTTP query 126 corresponds to a wireless communications device 100 query, the web server 140, and in particular the CGI 142, sends the HTML page 144 in the HTTP response 136. Returning to block 250, the conversion from the CTP query 124 to an HTTP query 126 may involve more than one HTTP request. This may occur where the web page has multiple referenced objects that need to be retrieved from the web server 140. Thus, the proxy server 180 may initiate multiple requests depending on the response in block 260. Note however, only one CTP request was needed.

At block 270, the proxy server 180 converts the HTML page 144 into the example query response 107 and sends the example query response 107 to the private network 172. The example query response 107 is inside of the CTP response 134, which is transmitted from the proxy server 180, across the private network 172, to the base station 170. The base station 170 then sends the corresponding wireless CTP response 132 to the wireless communications device 100.

The operating system 102 notifies the browser 104 that the wireless CTP response 132 has been received. The browser 104 requests the contents of the wireless CTP response 132 from the operating system 102. The contents are the example query response 107. Thus, at block 280, the browser 104 can display the example query response 107 on the screen 101.

Example User Interface

Figure 3:
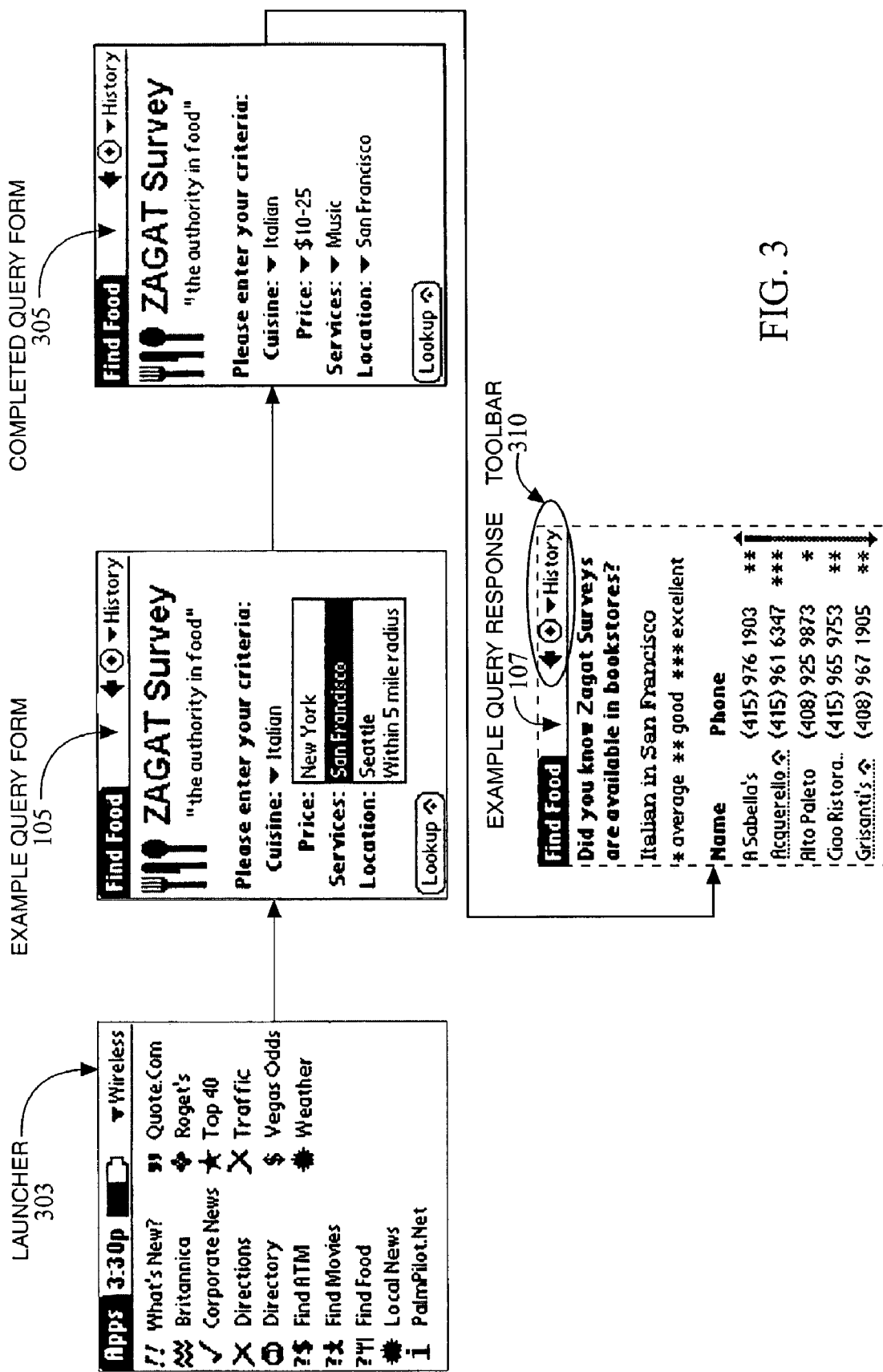
FIG. 3 illustrates an example user interface for a wireless communications device.

FIG. 3 includes a number of pictures showing an example display generated by the wireless communications device 100. These displays would be generated when a user attempts to find restaurants in San Francisco.

The wireless communications device 100 includes a launcher under which wireless applications can be grouped. The launcher interface 303 displays the list of available wireless applications. Note that the browser 104 is not specifically listed. This is because the user would typically only want to run a specific web site access application, not the browser 104 by itself. In this example, the user has selected "fine food" from the launcher interface 303.

In response to the selection, the example the browser 104 and the wireless application 106 begin executing. The browser 104 displays the example query form 105. The example query form 105 is a CML page in the wireless application 106. Then, the user can select/enter various field values for a query. In this example, the user is selecting the location field value "San Francisco".

The completed query form 305 is shown next. The user now wishes to send the query. This can be done by selecting the "look up" button. This sends the wireless CTP query 122 out through the network and to the web server 140. The wireless communications device 100 then receives the wireless CTP response 132.

The response includes the information for the example query response 107. The browser 104 displays the example query response 107 on the screen 101. Here a number of restaurant names and phone numbers are shown. The user can scroll up and down through the list.

Also presented on the screen 101 is a toolbar 310. The toolbar 310 allows the user to perform various functions within the browser 104. The toolbar 310 includes a back button, a connection indicator, and a drop down list. The back button allows the user to go back to the previous query form. The wireless communications indicator indicates whether the wireless communications device 100 is performing a wireless communications query. The drop down list indicates a history of the query results that the user has requested during past use of the browser 104.

Wireless Network Topology

Figure 4:
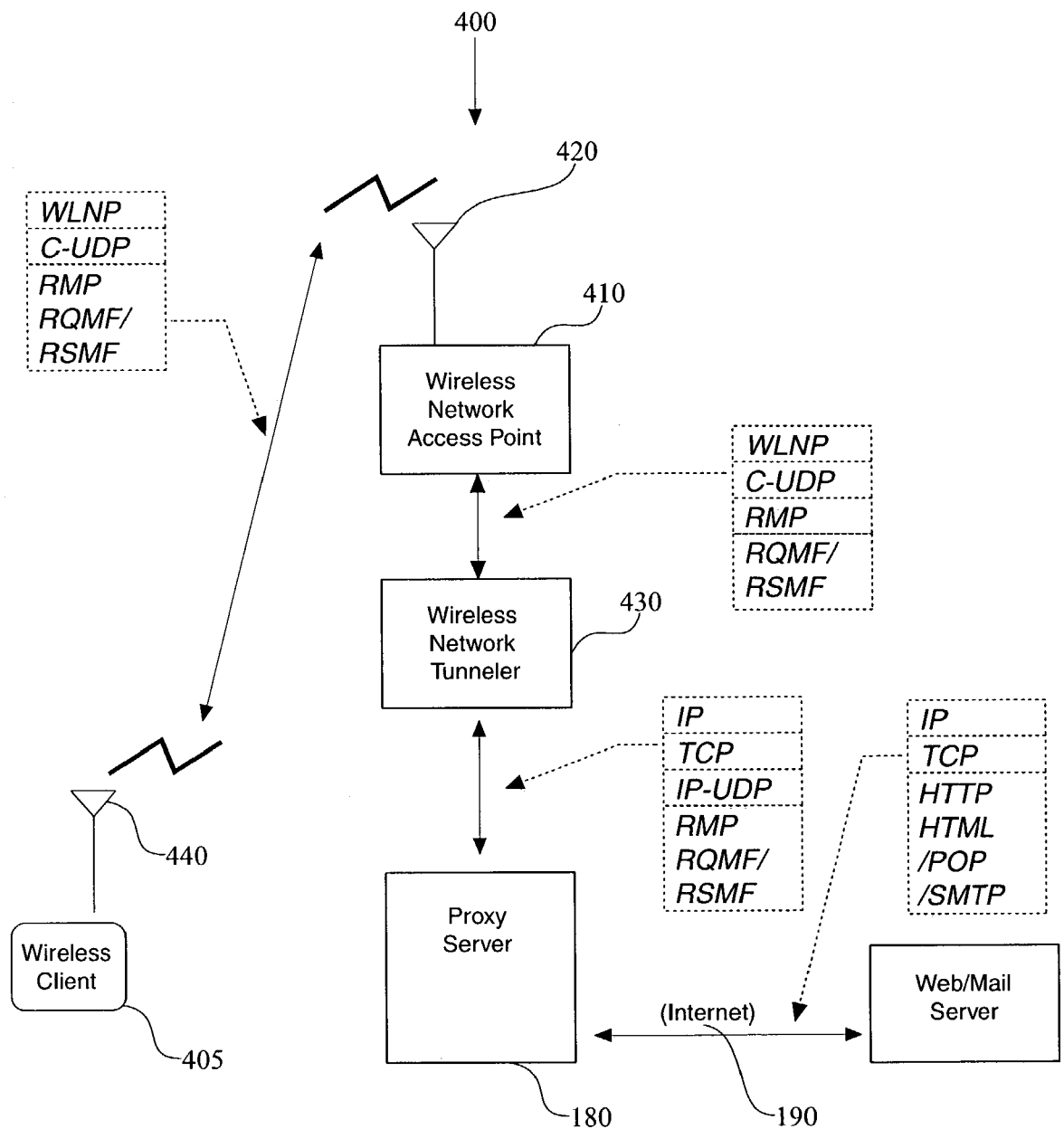
FIG. 4 illustrates a wireless network topology.

FIG. 1 and FIG. 4 show the general topology of a wireless communications network. As shown, the wireless client 405 (in FIG. 4, the wireless communications device 100 and its software have been combined into the wireless client 405) communicates directly with the proxy server 180. The wireless client 405 does not communicate directly with the actual source of data. The source of data can be a web or mail server that has content desired by the wireless client 405. FIG. 1 shows the Internet 190 as the source of data and the source of data will be referred to as the Internet 190 throughout this application. Using this scheme, the wireless client 405 and the proxy server 180 can use a much more efficient ("thin") protocol between themselves than used by Internet mail and web servers. On the other hand, the proxy server 180 uses standard Internet protocols (HTTP, TCP) when communicating with existing mail and web servers. The proxy server 180 acts as an agent. The proxy server 180 takes requests from the wireless client 405, obtains the requested information from the Internet 190, and re-formats and sends the requested information back to the wireless client 405. The proxy server 180, acting in this manner, can hide the relatively chatty and bandwidth intensive protocols used by standard Internet 190 servers from the wireless link.

The thin protocols used between the wireless client 405 and the proxy server 180 are IP based. IP based protocols are widely used and enable the wireless client 405 to communicate with many different wireless networks. Furthermore, basing wireless client 405 and proxy server 180 processing resources on IP provides a layer of isolation and independence from the actual wireless network in use.

FIG. 4 shows a wireless network topology 400 used for some embodiments of the invention. The main components of the wireless communications system are the wireless client 405, the wireless network access point 410, the tunneler 430, the proxy server 180, and the Internet 190. The wireless network access point 410 has a corresponding wireless network access point radio 420.

The wireless client 405 communicates across the wireless network using its own client radio 440 to transmit messages to and receive messages from the wireless network access point radio 420. The wireless network access point 410 is the nearest regional station in a wireless network with a connection to a proxy server 180. The wireless network is by nature not IP based, and its most basic packet type is referred to herein as wireless network protocol packet (WLNP). Consequently, the wireless client 405 encapsulates its IP packets with a WLNP header before the packets can be sent by the client radio 440.

The packets sent over the air include a number of headers in the following order: a WLNP header, followed by a compressed user datagram protocol (C-UDP) header, followed by a reliable message protocol (RMP) header. The headers encapsulate a Request/Response Message Fragment (RQMF/RSMF) of the packet. The RQMF/RSMF of each packet holds the message fragments. These fragments are commands, requests, and responses sent between a wireless client 405 and the proxy server 180 that enable a wireless client 405 to browse web pages, send and receive e-mail, and otherwise obtain access to content.

In some embodiments, the wireless network has guaranteed delivery built into it. For these embodiments, it is not necessary to incur the extra overhead of a full connection-oriented protocol such as TCP on top of the wireless network protocol. Instead, the wireless client 405 uses the Internet 190 UDP. The UDP is a simple datagram based, best effort delivery protocol. Using UDP, it is possible that a web page can be viewed from the wireless client 405 by sending just one packet up to the proxy server 180 and receiving just one packet back. The TCP protocol, on the other hand, would require a minimum of 5 packets back and forth between the proxy server 180 and the wireless client 405 to view the web page. The wireless network does not, on the other hand, guarantee order of delivery, so an RMP header is placed in front of the data area in each UDP packet. The RMP is used to detect and correct for out-of order or duplicate packet deliveries.

Instead of using raw UDP internet headers which are 28 bytes in length (20 bytes for the IP information, 8 bytes for the UDP information), the wireless client 405 uses a smaller, compressed form of the UDP header called C-UDP. A C-UDP header contains just enough information so that the actual IP/UDP header can be reconstructed at the other end of the wireless link. There are a number of fields in a standard IP/UDP header that are rarely changed and/or redundant over the wireless network and these fields can be highly compressed or left out altogether in the C-UDP header, as discussed in greater detail below.

The wireless network access point 410 receives WLNPs that have C-UDP packets imbedded in them. The WLNP header is stripped off the front of the packets by the tunneler 430 for the wireless network. The original IP header and UDP header are reconstructed, and the packets are then forwarded to the proxy server 180 through a TCP connection. Because an unreliable network (LAN or Internet) is used between the wireless network tunneler 430 and the proxy server 180, TCP is used to guarantee that the packets get transferred reliably.

The TCP stream that the proxy server 180 receives from the tunneler 430 has the imbedded IP packets. The IP packets contain request message fragments. The reliable message layer (shown in FIG. 6 as reference number 635) on the proxy server 180 reconstructs the original request message from the message fragments in the packets using the information contained in the RMP header area of each packet. The requested information (web page or e-mail) is then be fetched as a data object from the Internet 190, re-formatted, and passed back to the reliable message layer 635. Proxy server 180 processing resources operating in the reliable message layer 635 break down the data object into separate packets for transmission to the wireless client 405, and send the packets to the tunneler 430 through the TCP connection. The tunneler 430 forwards the packets back over the wireless network to the wireless client 405.

Figure 5:
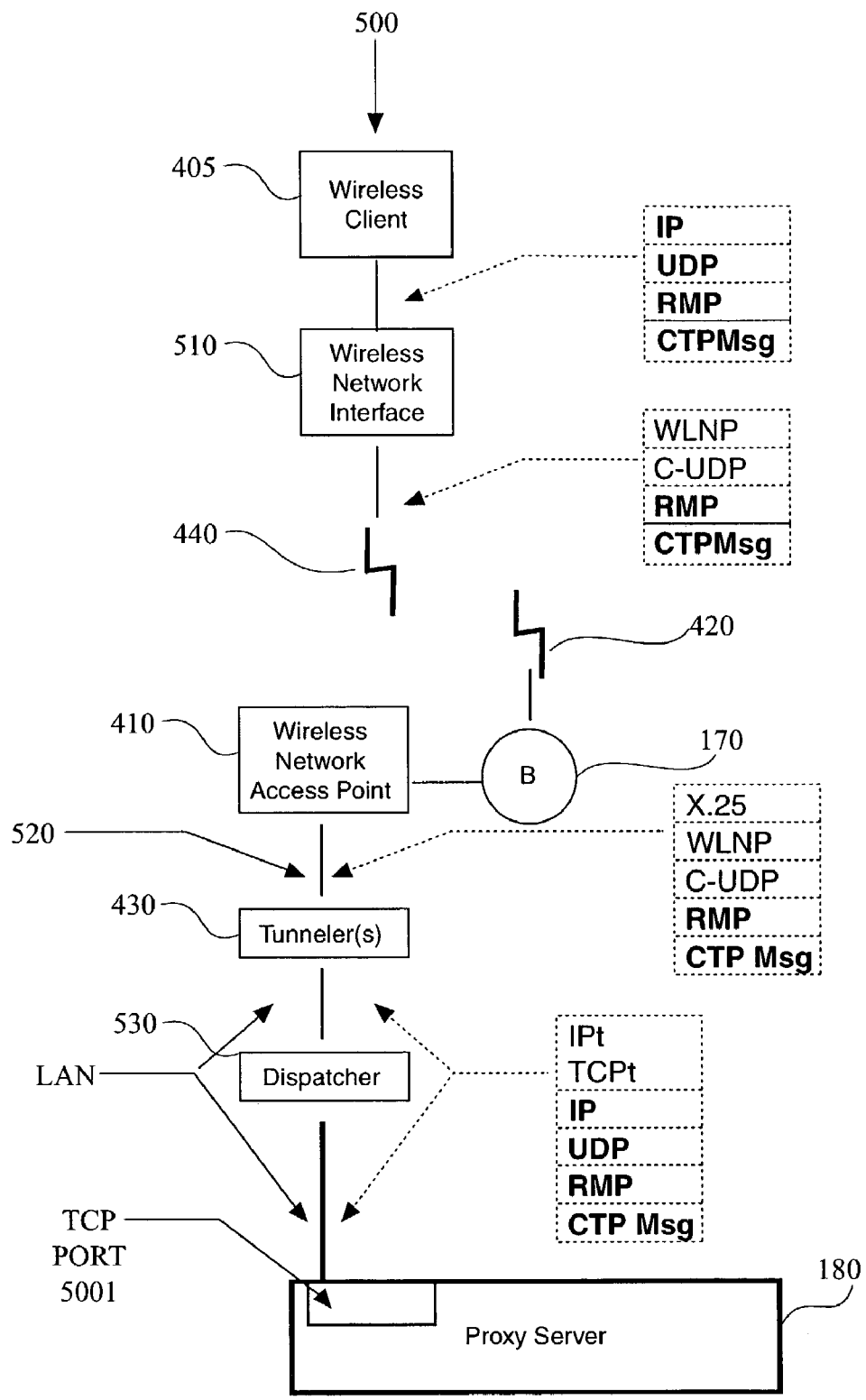
FIG. 5 illustrates a wireless network topology including a wireless network interface, a wireless network leased line, and a dispatcher.

FIG. 5 illustrates the wireless network topology including a wireless network interface 510, a wireless network leased line 520, and a dispatcher 530. FIG. 5 shows how the wireless client 405 and proxy server 180 communicate when the wireless client 405 is on a wireless network. Notice that the wireless client 405 is directly on the wireless network whereas the proxy server 180 is not. The wireless packets do not get sent directly to the proxy server 180. Instead, they first pass through the base station 170, a wireless access point 410, and tunneler 430 before they are sent to the proxy server 180 over a wireline LAN (Local Area Network) connection.

Wireless client 405 processing resources send messages through the reliable message layer 635. Since the wireless client 405 is on a wireless network, the reliable message layer 635 uses the RMP protocol to send the messages. The RMP protocol encapsulates the message fragments with an RMP header and sends them through a UDP socket in the network library (shown as 1110 in FIG. 11 and discussed below). The packets work their way through the IP stack on the wireless communications device 100, which adds UDP header and IP header. The packets are passed down to the wireless network interface 510 for transmission.

The wireless network interface 510 then compresses the IP header and UDP header of the packet into a C-UDP header, and adds the wireless network protocol (WLNP) header. FIG. 5 shows the wireless network interface 510 adding a WLNP header that is used on the wireless packet data network. Other networks will have similar headers. Much of the information in the IP and UDP headers is redundant with the WLNP header, so the C-UDP header can be significantly smaller than the sum of the IP header and UDP header.

The WLNP encapsulated packets are sent over the radio and are received by a base station 170. The base station 170 passes them to a wireless network access point 410. The wireless network access point 410 then passes the packets through a wireless network leased line X.25 link to the tunneler 430. The X.25 link can be a 56 Kbps leased line or a high speed frame relay connection. Although FIG. 5 shows only one tunneler 430, two tunnelers are typically used for the wireless packet data network. In one embodiment, the first tunneler is part of the wireless packet data network infrastructure and is referred to as the "Internet Access Server" or IAS. The IAS tunnels the WLNPs from the wireless network access point 410 into a TCP stream and sends this stream to a proxy server 180 specific tunneler. The proxy server 180 tunneler takes each WLNP from the IAS stream and converts its WLNP/C-UDP headers into normal IP/UDP packet headers. Thus, at this point in the chain of events, the packets look identical to the way they looked when the wireless client 405 first passed them to the wireless network interface 510 on the wireless communications device 100.

The tunneler 430 then sends its output stream to a dispatcher 530. The dispatcher's job is to load balance among multiple proxy servers 180. The dispatcher 530 distributes wireless client 405 requests that the dispatcher 530 receives from the tunneler 430 among a set of proxy servers 180. In order to do this, the dispatcher 530 checks the source IP address and UDP port number on each packet to determine whether the packet corresponds to a new transaction. If the packet corresponds to a new transaction, the dispatcher 530 selects the proxy server 180 with the lightest load and sends the packet to that proxy server 180. If the packet does not correspond to a new transaction (i.e. the $2^{nd}$ packet of a two packet request), the dispatcher 530 looks up the proxy server 180 used for the previous packet of this transaction and sends the packet to that same proxy server 180.

Finally, the packets are received by the proxy server 180. The proxy server 180 gathers the request packets from the dispatcher 530, reassembles them into the original CTP request message, processes the request, forms a response, breaks the response down into separate IP/UDP/RMP packets, and then sends the response packets back through the TCP socket to the dispatcher 530.

The proxy server 180 receives entire IP packets imbedded in the TCP stream that the proxy server 180 receives from the dispatcher 530. These packets are re-ordered and re-assembled into the original message before the request is processed. The IP, UDP, and RMP headers are stripped off and the information in the RMP and UDP headers used to re-construct the original request message. When a response message is formed, the response message is split into separate packets as necessary. IP, UDP and RMP headers (with source and destination machine addresses and port numbers swapped) are pre-pended to the packets before they are sent via TCP to the dispatcher 530 where the packet continues its journey back to the wireless client 405.

A few important points should be noted about this wireless setup. First, the only components that are specific to the wireless network are the wireless network interface 510 on the wireless client 405, and the tunneler 430 at the proxy server 180. The wireless client 405 application software, reliable message layer 635 and all of the software on the proxy server 180 are strictly IP based and do not have to change if a different wireless network is used.

Second, the tunneler 430 and the dispatcher 530 are not required to be placed on the same physical machine as the proxy server 180. If the tunneler 430 and the dispatcher 530 are on the same machine as the proxy server 180, the LAN link between the three system elements becomes a virtual TCP connection through the IP stack on the proxy server 180. This may seem to be preferable from a performance point of view, but, there are many more advantages to having the dispatcher 530 and proxy servers 180 on separate machines. If the dispatcher 530 is on a separate machine, the dispatcher 530 can distribute wireless client 405 transactions among multiple proxy servers 180, thereby providing both scalability and fault tolerance. If any one of the proxy servers 180 become inoperative, the dispatcher 530 can stop sending requests to the inoperative proxy server 180. Because the communications system has multiple proxy servers 180 the dispatcher 530 can distribute the load between them. The dispatcher 530 therefore becomes the most sensitive link in the chain from a fault tolerance point of view. But, from a performance point of view, the dispatcher 530 has very little work to do for each transaction compared to the proxy server 180 so it makes sense to have multiple proxy servers 180 per dispatcher 530 (and tunneler 430). If necessary, multiple tunnelers 430 and dispatchers 530 can be placed in parallel to provide even more fault tolerance and scalability.

A third important point is that the only unreliable link in the whole chain is over the wireless network, i.e., between the wireless network interface 510 on the wireless client 405 and the base station 170. In particular, the link between the base station 170 and the proxy server 180 is a reliable link all the way through. The RMP logic on both the wireless client 405 and proxy server 180 is simplified because the RMP logic only corrects for lost and unordered packets over the wireless network, not the wireline network between the base station 170 and the proxy server 180. This simplified RMP logic enables the timeout values used for re-transmission attempts to be tuned for just the wireless portion of the network.

Intranet Topology

A corporate wireless Intranet is setup in the same manner as the Internet solution just described. The only major difference is the physical location of the machines. For the Internet solution, the proxy server 180 is located at the wireless network access point 410 and has a connection to the global Internet. For a corporate Intranet solution, the proxy server 180 is located at the corporation's own private site with a leased line to the nearest wireless network access point 410. The leased line transports the WLNPs between the wireless network access point 410 and the corporation's own tunneler and proxy server 180. The proxy server 180 has a direct connection to the corporation's private Intranet.

Content Layer

This section covers the implementation of the wireless communications device 100 content layer. The content layer deals with how web content and personal messages are formatted and rendered on the wireless client 405. In particular, this section discusses the Hypertext Markup Language (HTML) and Compact Markup Language (CML) page description languages.

When using the standard browser engine, the wireless client 405 web browser application renders HTML obtained directly from the web content server. When using the browser 104 however, the wireless client 405 renders CML which has been dynamically generated from HTML by the proxy server 180.

When the wireless client 405 e-mail application sends or receives personal messages with the proxy server 180, it also uses CML to format the messages. Sending and receiving graphically formatted messages is not a specified requirement of the wireless communications device 100, but CML is used for the message format because it also provides excellent raw text compression. An added benefit is that CML provides the framework required for graphically oriented messaging applications.

There are two basic challenges in the design of the browser 104. The first is effectively rendering existing web content on a very small screen. The second challenge is minimizing the amount of data that is sent over the wireless network when using the browser 104 engine.

The HTML page description language works fine for answering the first challenge, but is not an appropriate choice for answering the second challenge. HTML was designed as an "ideal" language for creating content. HTML is human readable, human editable, and screen size and depth independent. This makes it a very good general purpose page description language, but also a very verbose language and too large to transmit wirelessly.

CML answers both challenges because CML also minimizes the amount of data that is sent over the wireless network. In order to achieve its minimal size, CML sacrifices both human readability and editability.

As a further optimization, the CML is created dynamically at run-time by the proxy server 180 using knowledge of the screen size and depth of the wireless client 405. Thus, the wireless client's 405 very limited screen 101 functionality will enable the proxy server 180 to generate a much smaller CML representation than the proxy server 180 could otherwise. For example, elements that do not fit on the wireless client 405 screen 101 could be left out altogether and images that are too deep for the wireless client 405 screen 101 are depth converted before being transmitted.

Ideally, the user is not aware of whether CML or HTML is used to render content. Therefore, both page description languages provide the same feature set. However, the implementation of the two languages is significantly different because CML provides the necessary compression to accommodate the wireless network bandwidth. To accomplish these goals, CML is optimized for small wireless clients 405. However, alternate and larger forms of representation can be used to implement the full feature set of HTML when necessary.

This following provides a description CML, followed by descriptions of HTML features, how each HTML feature is displayed and used in the browser 104, and finally how that feature is represented using CML. Keep in mind that the appearance of a HTML feature is independent of whether or not it is sent to the wireless client 405 in raw HTML format or as CML.

Compact Markup Language (CML)

In order to send web content to the wireless client 405 in a minimal number of bytes, the proxy server 180 does not use the HTML standard generally used by Internet servers. In HTML, all the tags and attributes associated with text, tables, forms, etc are text based, typically take up from 3 to 10 bytes each, and are stored both at the beginning and end of the text that they modify. For example, to display emphasized text, a web document would have to contain the following HTML sequence: <STRONG>This is emphasized text</STRONG>.

The wireless client 405 and the proxy server 180 use a special format for transferring screen 101 contents from the proxy server 180 to the wireless client 405. This format, named Compact Markup Language (CML), emphasizes compactness over readability and generally uses variable length binary bit fields instead of text to represent options and formatting information. The differences do not end there however; CML will use a host of other methods for reducing the number of bytes that is sent between the proxy server 180 and the wireless client 405.

CML compresses all text. In one embodiment, the default CML compression scheme formats text using a form of a five-bit character alphabet with escapes. This default compression scheme works best with pages that have mainly lower case alpha letters in them, but does allow for a full range of characters including characters with ASCII values greater than 128.

CML also leverages the fact that the proxy server 180 knows the screen size and bit depth of the wireless client 405 when encoding the layout of the content. HTML was designed to be screen independent—neither the server nor the content creator knows ahead of time what size or depth screen upon which the document will eventually be rendered. Besides the obvious advantage of not sending content that wouldn't fit on the wireless client 405 screen 101, there are other cases where content can be encoded in a more compact form by the proxy server 180 because it knows the size of the wireless client 405 screen 101. Since the proxy server 180 also knows the bit depth of the wireless client 405, the proxy server 180 can also reduce the data sent to the wireless client 405 by not sending color attributes such as the background color, text colors, underline colors, etc.

The major emphasis of CML is that it is optimized for size. In other words, readability and flexibility are compromised for compactness. One major design philosophy difference between HTML and CML is that CML is not designed as a content creation language. CML is merely a temporary format used to represent content as it is being transferred between a proxy server 180 and a wireless client 405. As such, CML is algorithmically generated, much like object code is generated from a compiler. The analogy to compilers is even stronger when you take into account the fact that CML is generated with the screen size and attributes of the wireless client 405 taken into account. The same HTML content can produce different CML representations for two wireless clients 405 that have different screen sizes—much like compilers for different microprocessor produce different object code from the same source code.

Essentially, CML is a stream of text and image data with imbedded formatting commands (tags). The tags are imbedded as binary data and hence are very compact. Every tag is "sticky"; that is the tag continues to have an effect until explicitly changed by another tag of the same type. For example, a tag in the front of a document that specifies bold text makes the entire document bold, unless another tag later in the document turns off the bold formatting. This is in contrast with many HTML tags, such as paragraph formatting commands, that only affect the next paragraph.

Another important difference between CML and HTML is that white space and line breaks in the text are significant. For CML, the equivalent of the HTML line break tag (<BR>) is not required in CML since line breaks are imbedded directly into the text.

The default behavior of CML is to compress all text by encoding it using a special 5-bit character alphabet discussed below in the CML Structure section. This form of compression works best for documents that are mainly comprised of lower case roman characters. Other forms of text encoding, including 8 bit ASCII, unicode, etc. are used in CML only when necessary.

Using CML and the CML structure described below combined with CTP formatting of forms, some embodiments of the invention comprise a method for transmitting a message from a wireless client 405 to a proxy server 180. The method comprises transmitting a single message from the wireless client 405 to the proxy server 180. The single message comprises a single packet of data. The single packet of data having a base document uniform resource locator followed by compressed data. The compressed data comprises references to fields in a hyperlink document and an indication of use of the hyperlink document. The hyperlink document indication includes a user interface element, and is typically a text representation of the hyperlink. The hyperlink document is in the base document. In some embodiments, the size of the single packet of data is less than one kilobyte.

In some embodiments, the references to fields comprise field values and field indices corresponding to fields in the hyperlink document. In some embodiments, the base uniform resource locator is expressed in a compact transfer protocol by a binary string. The binary string comprises a first field indicating the encoding scheme used for the single message.

Compact Data Structure Notation

Throughout the rest of this application, CML will be represented using a notation similar to that used in the C language for representing data structures. This notation will be called Compact Data Structure Notation (CDSN) and is also used later in this document when describing the CTP protocol. An example of this notation is:

| Bit | enabled = 1 |
| Bit[3] | type = typeRound |
| Int16 | length = 0x1234 |

The above structure represents the following sequence of 20 bits:

| 1 010 0001001000110100 |

The first field, enabled, is a 1 bit field that has the value 1. The second field, type, is a 3 bit field that has the value typeRound which is a constant defined to be 2. The third field, length, is a 16 bit integer with the value 0x1234.

Fields in CDSN are never padded to fall on word, or even byte boundaries. That is, each field starts off on the next free bit after the previous field. All multi-bit values are stored most-significant-bit first.

Basic Compact Data Structure Types

A number of primitive data types are used in CDSN. The basic ones are:

| Bit | a single bit |
| UInt8, Int8 | 8 bit unsigned and signed integers |
| UInt16, Int16 | 16 bit unsigned and signed integers |
| UInt32, Int32 | 32 bit unsigned and signed integers |

Other important types are the unsigned and signed variable length integer types: UIntV and IntV. These can be anywhere from 1 to 36 bits in length, depending on their value. The actual length can be determined by looking at the first 1 to 4 bits.

The types UIntV and IntV are defined as follows:

UIntV:

| 0 | | The value 0 |
| 10 | Bit[3] | The values 0 through 7 (0x07) |
| 110 | Bit[6] | The values 0 through 63 (0x3F) |
| 1110 | Bit[16] | The values 0 through 65535 (0xFFFF) |
| 1111 | Bit[32] | The values 0 through 4,294,967,295 (0xFFFFFFFF) |

IntV:

| 0 | | The value 0 |
| 0 | Bit[3] | The values −4 through 3 |
| 110 | Bit[6] | The values −32 through 31 |

-continued

| 1110 | Bit[16] | The values −32768 through 32767 |
| 1111 | Bit[32] | The values −2,147,483,648 through 2,147,483,647 |

Using the UIntV, an integer of value 0 can be represented with just 1 bit, values 1 through 7 would require 5 bits, values 8 through 63 would require 9 bits, etc.

CML Structure

A CML data stream is by default a 5-bit character text stream. Until a special character (as discussed below) appears in the stream, each sequence of 5 bits is assumed to represent a single text character. The following table lists the possible 5-bit characters:

5-bit Characters:

| Value | Special | Reset | Description |
|---|---|---|---|
| 0 | Yes | Yes | EndTag character. Used to terminate multi-parameter tags and block elements |
| 1 | Yes | Yes | StartTag character, followed by 8 or 16 bit Tag ID. |
| 2 | Yes | No | Single character escape |
| 3 | No | No | Reserved |
| 4 | No | No | Line break |
| 5 | No | No | Space character |
| 6-31 | No | No | The lowercase letters: 'a' through 'z' |

As described later, there can be sections of CML where text is encoded using alternate text encoding modes such as 8 or 16 bits per character instead of 5 bits per character. Even in these sections with larger characters, the decimal character values 0 through 2 (labeled in above table as "special") have special meaning. For example, if the endTag character (decimal 0) is encountered while an alternate text encoding mode is in effect, the text mode goes back to the default 5 bits per character.

Following is an example of how a simple section of text would be represented in CML. The text:

| abc d |
| ef | is represented as:

| Bit[5] | char = 6 | //'a' |
| Bit[5] | char = 7 | //'b' |
| Bit[5] | char = 8 | //'c' |
| Bit[5] | char = 5 | //' ' |
| Bit[5] | char = 9 | //'d' |
| Bit[5] | char = 4 | //line break |
| Bit[5] | char = 10 | //'e' |
| Bit[5] | char = 11 | //'f' | which, as a binary bit stream is:

| 00110 00111 01000 00101 01001 00100 01010 01011 |

When the text encoding mode is 5 bit characters, the single character escape (2), is followed by an 8 bit ASCII character.

This single character escape then can be used to represent characters that are not present in the 5 bit alphabet. For example, the text:

a Cow is represented in CML as the following sequence:

| | | |
|---|---|---|
| Bit[5] | char = 6 | // 'a' |
| Bit[5] | char = 5 | // ' ' |
| Bit[5] | char = 2 | //single character escape |
| Bit[8] | char = 67 | //'C' |
| Bit[5] | char = 20 | //'o' |
| Bit[5] | char = 28 | //'w' | where the 67 is the 8 bit sequence 01000011 which represents the ASCII value for 'C' (67 decimal, 0x43 hexadecimal) and all other characters are 5 bits long.

Multiple sequences of non-lower case alpha or international characters can also be included in the stream by including the appropriate text encoding tag in the stream followed by the 8 or 16 bit (unicode) character text string. CML tags are described in the next section.

CML Tags

The tag start character (1) is included in a CML stream to indicate the presence of a CML tag. The tag start character is followed by an 8 or 16 bit Tag ID structure. The 8 or 16 bit Tag ID structure can be optionally followed by other variable length bit fields, depending on the specific tag. The 8-bit Tag ID structures have the first bit clear and can have the values 0 through 127 (0 through 0x7F hexadecimal). The 16-bit Tag ID structures have the first bit set and can have the values 32768 through 65535 (0x8000 through 0xFFFF hexadecimal).

Different tags have different functions. Some tags are followed by other variable length bit fields which specify parameters for that particular tag function. Other tags have no parameters at all. In any case, because the tag start character is a reset character, the text encoding mode is set back to 5-bit characters whenever a tag is encountered (unless the tag specifically changes the text encoding mode).

For example, the Tag textBold is used to turn on bold formatting. It has no parameters. The following text:

a cow would be represented in CML as:

| | | |
|---|---|---|
| Bit[5] | char = 6 | // 'a' |
| Bit[5] | char = 5 | // ' ' |
| Bit[5] | char = 1 | // tag escape character |
| Bit[8] | tagID = textBold | // constant value for textBold |
| Bit[5] | char = 8 | // 'c' |
| Bit[5] | char = 20 | // 'o' |
| Bit[5] | char = 28 | // 'w' |

An example of a tag which has parameters is the textSize tag. This tag is followed by a IntV specifying the actual text size to use. For example, the following text:

a dog would be represented in CML as:

| | | |
|---|---|---|
| Bit[5] | char = 6 | // 'a' |
| Bit[5] | char = 5 | // ' ' |
| Bit[5] | char = 1 | // tag escape character |
| Bit[8] | tagID = textSize | // constant value for textSize |

-continued

| | | |
|---|---|---|
| UIntV | size = 4 | // the value 4, as a UIntV is // 5 bits long: 10100 |
| Bit[5] | char = 9 | // 'd' |
| Bit[5] | char = 20 | // 'o' |
| Bit[5] | char = 12 | // 'g' |

Since the size field in this case is 4, it takes 5 bits to represent as a UIntV.

Text Encoding Tags

Some CML tags are used to include strings of text that can not be encoded as 5-bit characters. Conceptually, text encoding tags are merely tags that have a variable number of parameters following them, where each "parameter" is another character in the text stream. The sequence of "parameters" ends as soon as a reset character is encountered (the endTag or startTag character).

For example, the textEncoding8Bit tag indicates a string of 8 bit characters follows. The string of 8 bit characters is assumed to continue in the stream until a reset character is encountered. However, because the stream is now built up of 8 bit characters, all special characters (which includes the reset characters and single character escape) are also now 8 bits long. For example, the endTag character becomes the 8 bit sequence 0b00000000 and the startTag character becomes the 8 bit sequence 0b00000001.

In all cases of alternate text encodings, as soon as a reset character (0 or 1 decimal) is encountered in the stream, the text mode is switched back to 5 bit characters.

In the alternate text encoding schemes, the single character escape (3 decimal) can be used to include characters in the text which are normally special characters. For example, a 16-bit unicode character of decimal value 1 could be included in the stream by inserting the 16-bit single character escape (3 decimal) in front of it.

The following is an example of how the textEncoding8Bit tag is used. The text: a BIG dog would be represented in CML as:

| | | |
|---|---|---|
| Bit[5] | char = 6 | // 'a' |
| Bit[5] | char = 5 | // ' ' |
| Bit[5] | char = 1 | // tag escape character |
| Bit[8] | tagID = textEncoding8Bit | |
| Bit[8] | char = 'B' | // 'B' |
| Bit[8] | char = 'I' | // 'I' |
| Bit[8] | char = 'G' | // 'G' |
| Bit[8] | char = 0 | // endTag, switches text encoding // back to 5-bit mode |
| Bit[5] | char = 9 | // 'd' |
| Bit[5] | char = 20 | // 'o' |
| Bit[5] | char = 12 | // 'g' |

An important thing to note is the interaction of alternate text encoding sections with the endTag character. Besides being used as a way to reset the text encoding mode, the endTag character is sometimes used in CML to separate two elements or to indicate the end of a block level element.

For example, when a list needs to be represented in CML, the list items are separated from each other by the endTag. In these instances, if a list item was represented using 8-bit encoded text, there would be 2 endTag characters in a row in the stream. The first endTag character, needed to end the 8-bit encoded text, would be 8 bits long. Then, to indicate the actual start of another list item, a 5-bit endTag character would be placed in the stream.

The Tag Data Type

Because the sequence of the tag escape character followed by Tag ID structure is used so often in the documentation, it is given it's own data type. It is defined as:

| Tag | tagID: |
|---|---|
| Char | startTag = 1 |
| Bit | longTag |
| if | (longTag == 0) |
| Bit[7] | tagID |
| else | |
| Bit[15] | tagID |

That is, it's a startTag character (decimal 1) followed by a single bit specifying the length of the tagID, followed by either a 7 or 15 bit tagID. The tag escape character is normally 5 bits long, except when an alternate text encoding mode is in effect, in which case it's length depends on the particular text encoding mode.

For example, the CML sequence:

| Tag | tag = smallTag | // smallTag = 5 |
|---|---|---| would look like this as a binary bit stream:

| 00001 0 0000101 |
|---|

Whereas the CML sequence:

| Tag | tag = bigTag | // bigTag = 512 |
|---|---|---| would look like this as a binary bit stream:

| 00001 1 000001000000000 |
|---|

The following CML sequence shows a tag after a section of 8 bit encoded text:

| Tag | tag = textEncoding8Bit | // textEncoding8Bit = 6 |
|---|---|---|
| Bit[8] | char = 'A' | // 0x41 |
| Tag | tag = smallTag | // smallTag = 5 |
| Bit[5] | char = 6 | // 'a' | it would look like this as a binary bit stream:

| 00001 | 0 | 0000110 | 01000001 | 000000010 | 0000101 | 00110 |
|---|---|---|---|---|---|---|
| tag Esc | | textEncoding | 8Bit | 'A' | tagEsc | smallTag | 'a' |

CML Text & TextZ Types

Another common data type used in CML is the Text data type. This type is used to conveniently represent a string of characters. This type is a very powerful data type because it hides the complexity of escaping special characters and the actual number of bits required to represent each character.

For example, the CML sequence used above:

| Bit[5] | char = 6 | // 'a' |
|---|---|---|
| Bit[5] | char = 5 | // ' ' |
| Bit[5] | char = 1 | // tag escape character |
| Bit[8] | tagID = textEncoding8Bit | |
| Bit[8] | char = 'B' | // 'B' |
| Bit[8] | char = 'I' | // 'I' |
| Bit[8] | char = 'G' | // 'G' |
| Bit[8] | char = 0 | // endTag character |
| | | // switches back to 5-bit mode |
| Bit[5] | char = 9 | // 'd' |
| Bit[5] | char = 20 | // 'o' |
| Bit[5] | char = 12 | // 'g' | is represented using the Text data type as:

| Text | string = "a BIG dog" |
|---|---|

The Text data type hides the complexities of escaping non-lower case alpha characters as well as the endTag character used to switch the mode back from 8-bit to 5-bit ASCII.

The combination of the Tag and Text types makes representing combinations of formatting and text sequences much easier. For example, the sequence used above that showed how bold text would be represented was:

| Bit[5] | char = 6 | // 'a' |
|---|---|---|
| Bit[5] | char = 5 | // ' ' |
| Bit[5] | char = 1 | // tag escape character |
| Bit[8] | tagID = textBold | // constant value for textBold |
| Bit[5] | char = 8 | // 'c' |
| Bit[5] | char = 20 | // 'o' |
| Bit[5] | char = 28 | // 'w' |

Using the Tag and Text types, this sequence can be represented as:

| Text | string = "a " |
|---|---|
| Tag | tag = textBold |
| Text | string = "cow" |

TextZ type

Another convenient type in CML is the TextZ type. This is basically a Text type with a terminating endTag character. This type is most often used in tag parameter lists. It can be defined simply as:

TextZ text:

| Text | text |
|------|------|
| Char | end = endTag |

As an example, the format of the meta tag is defined as:

| Tag | tag = tagMeta |
|------|------|
| TextZ | name |
| TextZ | value |

Where name and value are parameters of the meta tag and are delimited from each other and any text that might follow the tag by the endTag character at the end of each one. If a variable is defined as a TextZ type, the variable generally has an endTag character at the end of it, though the end could be implied by the presence of a following tag.

Tag Definitions

This section lists the various CML tags available. Each tag is described in detail along with its parameters, if any. This section refers to tags by name, but in the actual implementation a pre-defined constant is associated with each tag.

Background Attributes

---
TagBGColor
---

Description:
Used to set the background color.

Parameters:
Byte    red
Byte    green
Byte    blue

Examples:
Tag     tag = tagBGColor
Byte    red = 0xFF
Byte    green = 0x80
Byte    blue = 0x80

---
TagBGImage
---

Description:
Used to set the background image. This image will be tiled to fill the entire window.

Parameters:
Image   img     // [still need to define image format]

Examples:
Tag    tag = tagBGImage
Image img = ...    // [still need to define image format]

Text Attributes

---
TagTextColor
---

Description:
Used to set the text color.

Parameters:
Byte    red
Byte    green
Byte    blue

Examples:
Tag    tag = tagTextColor
Byte    red = 0xFF
Byte    green = 0x80
Byte    blue = 0x80

Text    "This text is reddish"

---
TagLinkColor
---

Description:
Used to set the color used to display visited or unvisited links

Parameters:
Bit    visited
Byte    red
Byte    green
Byte    blue

Examples:
Tag    tag = tagLinkColor
Bit    visited = 1    // set color for visited
// links
Byte    red = 0xFF
Byte    green = 0x80
Byte    blue = 0x80 tagTextColor

Description:
Used to set the text color.

Parameters:
Byte red
Byte green
Byte blue

Examples:
Tag tag = tagTextColor
Byte red = 0xFF
Byte green = 0x80
Byte blue = 0x80

Text "This text is reddish"

tagTextSize

Description:
Used to set the text size.

Parameters:
Bit relative     // relative or absolute size
UIntV size       // line height of text in pixels.

Examples:
Tag tag = tagTextSize
Bit relative = 0
UIntV size = 9 tagTextBold

Description:
Used to mark bold text style.

Parameters:
None

Examples:
// Start bold text
Tag tag = tagTextBold

Text   "This is bold text"

// End bold text
Char   end = endTag

--- tagTextItalic

---

Description:
Used mark italic text style.

Parameters:
None

Examples:
// Start italic text
Tag   tag = tagTextItalic

Text   "This is italic text"

// End italic text
Char   end = endTag

--- tagTextUnderline

---

Description:
Used to mark underlined text style.

Parameters:
None

Examples:
// Start underlined text
Tag   tag = tagTextUnderline

Text   "This is underlined text"

// End underlined text
Char   end = endTag tagTextFormat

Description:
Used to mark the font style and phrase elements.

Parameters:
Bit[4]    format                // one of monoSpaced, strike,
                                // bigger, smaller, sub, sup,
                                // definition, code, sample,
                                // keyboard, variable, cite

Examples:
Tag    tag = tagTextFormat
Bit[4]    format = code

Text    "itemP = itemP->nextItemP;"

tag8BitEncoding

Description:
Used to mark the beginning of 8-bit encoded text.

Parameters:
None

Examples:
Tag    tag = tag8BitEncoding

Text    "THIS IS 8-BIT ENCODED TEXT"

// End 8-bit encoded text
Char    end = endTag tagH1..tagH6

Description:
Used to mark document headings.

Parameters:
Bit[3]    align    // one of alignLeft, alignCenter,
                  // alignRight

Examples:
Tag    tag = tagH1
Bit[3]  align = alignCenter

Text    "This is a Heading"

Char  endTag      // end heading tag

--- tagMeta

Description:
Used to mark name/ value pairs describing document properties.

Parameters:
TextZ      name
TextZ      content

Examples:
Tag    tag = tagMeta
TextZ "History"
TextZ "Quote Results"

--- tagDatePicker

Description:
Used to specify a date value. It takes either a valid date, or if 0 is specified, the current date is assumed. The date is specified as the number of seconds since midnight, 1/1/1904 GMT. The dateLo field contains low 32 bits of this value and the dateHi field contains the upper 32 bits of this value (usually 0).

Parameters:
UIntV      dateHi
UIntV      dateLo

Examples:

Tag    tag = tagDatePicker
UIntV dateHi = 0
UIntV dateLo = 0xA1234000

--- tagTimePicker

Description:
Used to specify a time value. It takes either a valid time, or if 0 is specified, the current time is assumed. The time is specified as the number of seconds since midnight.

Parameters:

UIntV       seconds

Examples:
Tag    tag = tagTimePicker
UIntV  seconds = 3600          // 1:00 am.

Paragraph Attributes

--- tagParagraphAlign

---

Description:
Used to set paragraph alignment to either left, center, or right.

Parameters:
Bit[3]  align   // one of alignCenter, alignLeft, or
// alignRight.

Examples:
// Turn on center alignment
Tag    tag = tagParagraphAlign
Bit[3]  align = alignCenter

Text    "\nThis paragraph is centered."

// Turn off left alignment
Tag    tag = tagParagraphAlign
Bit[3]  align = alignLeft

Text    "\nThis paragraph is left aligned."

--- tagMarginIndent

---

Description:
Used to set the indent amount of the margins. The indent parameter specifies the number of pixels to indent on both the left and right margins of the window. The indenting takes effect on the next line of text, whether due to word wrap or line break.

Parameters:
UIntV indent  // number of pixels to indent

Examples:
// Indent the next paragraph by 10 pixels
Tag   tag = tagMarginIndent
UIntV indent = 10

Text   "\nThis text is indented."

// Restore indent
Tag   tag = tagMarginIndent
UIntV indent = 0

--- tagBlockQuote

Description:
Used to mark the beginning of block quotations.

Parameters:
None

Examples:
Tag   tag = tagBlockQuote

Text   "The whole problem with the world is that fools and fanatics are always so certain of themselves, but wiser people so full of doubts."
Text   "- Bertrand Russell"
Lists

--- tagListOrdered

Description:
Used to mark the beginning of an ordered (numbered) list of items. Each item in the list is ended either by a endTag character or a tagListItemCustom tag with parameters. The end of the list is indicated by the endTag character.

Parameters:
Bit[3]   type    // one of listT1, listTa, listTA,
//   listTi, or listTI
UIntV    start   // starting sequence number minus 1
Bit      compact // compact spacing between items

Examples:
// The list header
Tag    tag = tagListOrdered
Bit[3] type = listT1
UIntV start = 0
Bit    compact = 0

// The list items.
Text    "First item"
Char    itemSeparator = endTag

Text    "Second item"
// ------------    // itemSeparator not used here

Tag     tag = tagListItemCustom
Bit[3]  type = listTa
UIntV   value = 4
Text    "Third item"
Char    end = endTag  // end of 3rd item // The end of the list
Char   end = endTag// end of list

| tagListUnordered |
| --- |

Description:
Used to mark the beginning of an unordered list of items. Each item in the list is ended either by a endTag character or a tagListItemCustom tag with parameters. The end of the list is indicated by the endTag character.

Parameters:
Bit[3] type      // one of listTDisk, listTSquare, or
// listTCircle
Bit compact      // compact spacing between items

Examples:
// The list header
Tag    tag = tagListUnordered
Bit[3] type = listTDisk
Bit    compact = 0

// The list items.
Text    "First item"
Char    itemSeparator = endTag

Text    "Second item"
// -------------    // itemSeparator not used here

Tag     tag = tagListItemCustom
Bit[3]  type = listTSquare
UIntV   value = 0
Text    "Third item"
Char    itemSeparator = endTag        // end of 3rd item // The end of the list
Char   endList = endTag

--- tagListItemCustom

Description:
Used to mark the beginning of a custom list item in either an ordered or unordered list. Most items in lists are separated by endTag characters, but if the bullet style, numbering style, or sequence number of an item is not the default, the tagListItemCustom tag is used instead.

Parameters:
Bit[3]  type    // The bullet or number style
UIntV   value   // ignored for unordered lists.

Examples:
Tag     tag = tagListItemCustom
Bit[3]  type = listTSquare
UIntV   value = 0

Text    "Third item"
Char    itemSeparator = endTag

--- tagListItemDefinition

Description:
Used to mark the beginning of a definition item in a definition list.

Parameters:
None

Examples:
Tag     tag = tagListItemDefinition

Text    "This is the definition of the first item"
Forms

---
| tagForm |
---

Description:
Used to mark the start of a form. A form encloses one or more input items and ends with an endTag character.

There are essentially 2 classes of forms for the wireless communications device 100 as described in the Forms Processing section below: standalone forms (like in standard HTML) and server dependent forms. Server dependent forms can be much smaller than standard forms and are typically the only type of form received over a wireless link. Standard forms on the other hand are designed to be pre-loaded onto the wireless communications device 100 through other means (HotSync, built into ROM, etc.).

A standalone form is indicated by a 1 in the standalone attribute of the form tag. A 1 in this bit indicates that the form also has post and action attributes and that each of it's input fields have the necessary attributes (name and value) for submitting the form without making the proxy reference the original HTML form off the internet first. The encoding normal form submissions section below describes how to submit a standalone form to the proxy server 180.

A server dependent form is indicated by a 0 in the standalone attribute. A 0 in this bit indicates that the form does not have post or action attributes and that it's input fields do not have associated name or value attributes. When this type of form is sent to the proxy server 180, the proxy server 180 first references the original HTML form off the internet before it can actually submit the request to the CGI script. The Encoding Server Dependent Form Submissions section below describes how to send a server dependent form submission to the proxy server 180.

The form Index is assigned by the proxy and starts at 0 for the first form in a document.

The post attribute is 0 if the form should be submitted to the CGI script using the HTTP GET method or 1 if the form should be submitted using the HTTP POST method. Currently, only the GET method is supported.

The action attribute contains the URL of the CGI script on the server that handles the form submission.

The secure bit is only present for server-dependent forms The secure bit is set if the action URL for the form is for a secure site (i.e. uses the HTTPS scheme). The secure bit is used by the wireless client 405 to determine if the wireless client 405 should send the form submission to the proxy server 180 encrypted or not. For standalone forms, the wireless client 405 checks the scheme that is in the action URL parameter to see if the submission should be encrypted or not.

Parameters:
```
UIntV  formIndex          // assigned by proxy server
Bit           standalone
if (standalone)
Bit    post               // if 1, use POST instead of GET
TextZ action              // URL of the CGI-script
else
Bit    secure             // true if URL is HTTPS scheme
```

Examples:
Tag    tag = tagForm
UIntV formIndex = 0
Bit            standalone = 1
Bit            post = 0
TextZ action = "http://www.server.com/cgi-bin/submit"

```
// The form input items
Text   "Age 0-12:"

Tag tag =      tagInputRadio
Bit checked = 0
UIntV          group = 0
Bit            hasName = 1
Bit            hasValue = 1
TextZ          name = "age"
TextZ          value = "0-12"

Text   "Age 13-17:"

Tag tag =      tagInputRadio
Bit checked = 1
UIntV  group = 0
Bit            hasName = 1
Bit            hasValue = 1
TextZ          name = "age"
TextZ  value = "13-17"
```

```
Tag tag =    tagInputSubmit
Bit          hasName = 0
Bit          hasValue = 1
TextZ        value = "OK"
```

Char endForm = endTag

---

TagInputRadio

Description:

Used to represent radio buttons in a form. The checked parameter indicates the initial state of the control. The group parameter is assigned by the proxy server 180 and allows the wireless client 405 to perform mutual exclusion selecting.

The hasName and hasValue are normally only set in standalone forms and indicate the presence of following text fields that contain the control's name and value.

Parameters:

```
Bit checked
UIntV        group
Bit          hasName
Bit          hasValue
if (hasName)
TextZ name
if (hasValue)
   TextZ value
```

Examples:

```
Tag    tag = tagInputRadio
Bit    checked = 0
UIntV  group = 0
Bit    hasName = 1
Bit    hasValue = 1
TextZ  name = "age"
TextZ  value = "13-17"
```

Text    "Age 13-17:"

| TagInputCheckbox |
|---|

Description:
Used to represent checkboxes in a form. The checked parameter indicates the initial state of the control.

The hasName and hasValue parameters are normally only set in standalone forms and indicate the presence of following text fields that contain the control name and value.

Parameters:
Bit    checked
Bit        hasName
Bit        hasValue
if (hasName)
TextZ        name
if (hasValue)
TextZ        value

Examples:
Tag    tag = tagForm

Tag    tag = tagInputCheckbox
Bit    checked = 0
Bit    hasName = 0
Bit    hasValue = 0

| tagInputTextLine |
|---|

Description:
Used to represent single line input text fields within a form. A maxLength parameter of 0 means no limit on the number of characters entered.

The hasName parameter is normally only set in standalone forms. The hasValue parameter may be set in either type of form and indicates the initial default text for the input item.

Parameters:
UIntV  size    // visible width of field in
// characters
UIntV  maxLength    // maximum number of allowed
// characters
Bit        hasName
Bit        hasValue
if (hasName)

TextZ name
if (hasValue)
TextZ value

Examples:

Tag     tag = tagForm
Text    "Enter Name:"

| | |
|---|---|
| Tag tag = | tagInputTextLine |
| UIntV | size = 20 |
| UIntV | maxLength = 0 |
| Bit | hasName = 0 |
| Bit | hasValue = 1 |
| TextZ | value = "your name here..." |

---
TagInputTextArea
---

Description:

Used to represent a multi-line input text field within a form. The text element immediately following this tag is the initial text for the input field. The end of the initial text is indicated by an endTag character.

The hasName parameter is normally only set in standalone forms. The hasValue parameter may be set in either type of form and indicates the initial default text for the input item.

Parameters:

UIntV rows    // number of rows
UIntV cols     // number of columns
Bit           hasName
Bit           hasValue
if (hasName)
   TextZ name
if (hasValue)
   TextZ value

Examples:

Text    "Enter Address:"

| | |
|---|---|
| Tag tag = | tagInputTextArea |
| UIntV | rows = 2 |
| UIntV | cols = 20 |
| Bit | hasName = 1 |
| Bit | hasValue = 1 |
| TextZ | name = "address" |
| TextZ | value = "your address here..." | tagInputPassword

Description:

Used to represent single line password input fields within a form. A maxLength parameter of 0 means no limit on the number of characters entered.

The hasName and hasValue parameters are normally only set in standalone forms and indicate the presence of following text fields that contain the field's name and value.

Parameters:

```
UIntV  size         // visible width of field in
                    // characters
UIntV  maxLength    // maximum number of allowed
                    // characters
Bit    hasName
Bit    hasValue
if (hasName)
  TextZ name
if (hasValue)
  TextZ value
```

Examples:

Text    "Enter Password:"

```
Tag    tag = tagInputPassword
UIntV  size = 20
UIntV  maxLength = 0
Bit    hasName = 0
Bit    hasValue = 0
```

TagInputSubmit

Description:

Used to represent submit buttons in a form. The label parameter is the button's label. An endTag character marks the end of the label.

The hasName parameter is normally only set in standalone forms. The hasValue parameter may be set in either type of form and indicates the text that should appear inside the button. If the hasValue parameter is omitted, the default text of "submit" will be placed in the button.

Parameters:

Bit            hasName
Bit            hasValue
if (hasName)
    TextZ name
if (hasValue)
         TextZ value

Examples:

Tag          tag = tagInputSubmit
Bit           hasName = 0
Bit           hasValue = 1
TextZ value = "OK"

--- tagInputSubmitImage

Description:

Used to represent graphical submit buttons in a form.

Parameters:

Bit[3] align    // one of alignTop, alignMiddle,
                  // alignBottom, alignLeft,
                  // alignRight'
Bit            hasName
if (hasName)
    TextZ name
Image image  // *[format TBD...]*

Examples:

Tag    tag = tagInputSubmitImage
Bit[3] align = alignBottom
Bit    hasName = 1
TextZ name = "map"
Image *[TBD...]*

--- tagInputReset

Description:

Used to represent reset buttons in a form.

The hasValue parameter may be set to indicate the text that should appear inside the button. If the hasValue parameter is omitted, the default text of "reset" will be placed in the button.

Parameters:

Bit          hasValue
if (hasValue)
   TextZ value;

Examples:

| | |
|---|---|
| Tag tag = | tagInputReset |
| Bit | hasValue = 1 |
| TextZ | value = "Reset" |
| Char | endTag |
| | |
| Text | "Some random text" |

---

TagInputSelect

Description:

Used to represent select menus in a form. The multiple parameter should be set if multiple items are allowed to be selected at once. If multiple is set, then the size parameter indicates how many visible choices appear at once in the menu.

The hasName parameters is normally only set in standalone forms.

This element is followed by 1 or more Text elements representing the menu options that are separated by endTag characters or tagSelectItemCustom tags. The tagSelectItemCustom tag only needs to be used for pre-selected items. An additional endTag character follows the last item and indicates the end of the select menu.

Parameters:

| | |
|---|---|
| Bit   multiple | // set if multiple choices allowed |
| UIntV size | // number of visible items at once |
| Bit   hasName | |
| if (hasName) | |
|   TextZ name | |

Examples:

Tag tag = tagInputSelect
Bit multiple = false
UIntV      size = 0
Bit        hasName = 1
TextZ     name = "choice"

// The select items.
Text        "First choice"
Char        itemSeparator = endTag

| | |
|---|---|
| Text | "Second choice" |
| Char | itemSeparator = endTag |ു

| | |
|---|---|
| Text | "Third choice" |
| Char | itemSeparator = endTag |

| | |
|---|---|
| Char | endSelect = endTag |

--- tagSelectItemCustom

---

Description:

Used to mark the beginning of a custom select item. Most items in select lists are separated by endTag characters, but if an item is marked as pre-selected, the tagSelectItemCustom tag is used instead.

The hasValue parameter is normally only set in standalone forms. It can be used to indicate the text that should be included as the value of this item during the form submission. If this parameter is omitted, then the text that follows the tagSelectItemCustom tag is used instead.

Parameters:

Bit selected         // non-zero of pre-selected
Bit hasValue
if       (hasValue)
TextZ  value

Examples:

| Tag | tag = tagSelectItemCustom |
|---|---|
| Bit | selected = 1 |
| Bit | hasValue = 1 |
| TextZ | value = "3" |

| | |
|---|---|
| Text | "Third item" |
| Char | itemSeparator = endTag |

Tables

---

TagTable

---

Description:

Used to mark the start of a table. If the width parameter is 0, the width of the table will be calculated from the contents. The border parameter can be 0 to suppress the border. If cellspacing is non-zero, then borders will be draw around every cell. The cellPadding sets the padding in pixels between the border around each cell and the cell's contents - default is 0.

Each row in the table starts out with a tagTableRow tag that has optional parameters for the horizontal and vertical alignment of the cells in that row.

The cells within a table row are separated by endTag's, or tagTableColumn tags. The tagTableColumn tags mark header cells, or permit attributes to be set for the next cell. The first cell in each row can have a tagTableColumn tag preceding it if necessary in order to change its attributes.

Parameters:
Bit[3] hAlign // one of alignLeft, alignCenter,
 // alignRight
UIntV width // table width in pixels
UIntV border // border width in pixels
UIntV cellSpacing // cell spacing in pixels
UIntV cellPadding // cell padding in pixels

Examples:
Bit[3] hAlign = alignCenter
UIntV width = 0
UIntV border = 0
UIntV cellSpacing = 0
UIntV cellPadding = 0

Tag   tag = tagTableRow
Bit   hasAlign = 0
Text  "row1, col1"
Char  endTag

Text  "row1, col2"
Char  endTag

Tag   tag = tagTableRow
Bit   hasAlign = 0

Text  "row2, col1"
Char  endTag

Text  "row2, col2"
Char  endTag

Char   endTag          // end of table

TagCaption

Description:

Used to mark the caption to be placed above the top or below the bottom of a table.

Parameters:

| | | |
|---|---|---|
| Bit | captionAtTop | // if 0, caption at bottom |
| Text | caption | // table caption |
| Char | endCaption = endTag | // end of caption |

Examples:

| | |
|---|---|
| Tag | tag = tagCaption |
| Bit | captionAtTop = 1 |
| Text | "Table Title" |
| Char | endTag     // end of caption |

TagTableRow

Description:

Used to separate rows of a table. Has 2 optional parameters to set the vertical and horizontal alignment of cells within the row.

Each row in the table starts out with a tagTableRow tag that has optional parameters for the horizontal and vertical alignment of the cells in that row.

Parameters:

Bit    hasAlign
if (hasAlign == 1)
        Bit[3] hAlign       // one of alignLeft, alignCenter,
            // alignRight
        Bit[3] vAlign       // one of alignTop, alignMiddle,
            // alignBottom

Examples:

Tag tag = tagTableRow
Bit    hasAlign = 0

| | |
|---|---|
| Text | "row1, col1" |
| Char | endTag |

Tag tag = tagTableRow
Bit hasAlign = 1

Bit[3] hAlign = alignRight
Bit[3] vAlign = alignTop

Text "row2, col1"
Char endTag

--- tagTableColumn

---

Description:
Used to mark a header or data cell in a table.

All cells within a table row are separated by either endTag's or tagTableColumn tags. The tagTableColumn tags denote whether the next cell is a header cell or a data cell. In addition, the tagTableColumn tags permit attributes to be set for the next cell. The first cell in each row can have a tagTableColumn tag preceding it if necessary in order to change its attributes.

The rowSpan and colSpan parameters are 0-based, which means that a value of 0 in these fields means 1 row and 1 column respectively. The width and height parameters can be 0 to make them automatically determined by the cell contents.

Parameters:

| | | |
|---|---|---|
| Bit | headerCell | // 1 for header cell, // 0 for data cell |
| Bit | hasAttribute | |
| if (hasAttribute == 1) | | |
| Bit | noWrap | // suppress word wrap |
| UIntV | rowSpan | // number of rows spanned by // cell minus 1 |
| UIntV | colSpan | // number of columns spanned // by cell minus 1 |
| Bit[3] | hAlign | // horizontal alignment |
| Bit[3] | vAlign | // vertical alignment |
| UIntV | width | // width of cell in pixels |
| UIntV | height | // height of cell in pixels. |

Examples:

Tag tag = tagTableColumn
Bit headerCell = 0
Bit hasAttribute = 1
Bit noWrap = 0
UIntV rowSpan = 0
UIntV colSpan = 0

Bit[3] hAlign = alignRight
Bit[3] vAlign = alignTop
UIntV width = 0
UIntV height = 0

Text "row2, col2"
Char endTag

Hyperlinks

TagHyperlink

---

TagHyperlink

---

Description:

Used to represent hyperlinks. All text enclosed between the tagAnchor tag and the terminating endTag are part of the hyperlink.

Unlike the <a> tag in HTML which can be used to define hyperlinks or local anchors (i.e. fragment identifiers), the tagHyperlink tag is only used to define hyperlinks. The tagAnchor tag, defined below, is used exclusively to define local anchors.

The hasTitle bit can be set if a title is included. Normally, documents sent wirelessly will not include a title in order to conserve space.

If this hyperlink is to another location within the same document (i.e. a link to a tagAnchor), then the internal bit will be set to 1 and the anchorIndex parameter indicates the index of a local tagAnchor to jump to. The internal bit is also referred to herein as the "link type bit", especially in the "Indicating Subsequent Action Characteristics" section.

The first tagAnchor in the document is index 0; the next one is index 1, etc. The recordIndex parameter indicates which web resource to go to, 0 means the current web resource. A non-zero value represents the database record ID of the new web resource and is only used for wireless communications device 100 PQP databases that have multiple web resources stored in them - each in its own record.

Otherwise, if this hyperlink is to another document, then the internal bit will be 0 and hasHRef will be set if the URL of the document is included. Normally documents obtained wirelessly will not include href URLs and hyperlinks are followed by sending an indirect hyperlink URL request to the proxy server 180. Documents designed to be installed onto the wireless communications device 100 through HotSync or other wireline means however will generally include an href URL and these kinds of hyperlinks can be jumped to by sending a normal URL request to the proxy server 180.

Parameters:
```
Bit     hasTitle
if (hasTitle)
    TextZ      title
Bit     internal
if (internal)
    UIntV      recordIndex
    UIntV      anchorIndex
else
   Bit  hasHRef
   if (hasHRef)
TextZ  href
```

Examples:

Here is an example of an external explicit link which would typically be used by a document designed to be loaded onto the wireless communications device 100 through HotSync or some non-wireless means:

| | |
|---|---|
| Tag | tag = tagHyperlink |
| Bit | hasTitle = 1 |
| TextZ | title = "3Com home page" |
| Bit | internal = 0 |
| Bit | hasHRef = 1 |
| TextZ | href = http://www.3com.com/ |

Text    "Click on this text"

Char endTag // terminates tagAnchor

Here is an example of an external indexed link that would typically be used by a document that was obtained wirelessly. Notice that it does not include a URL or a title in order to conserve space.

| | |
|---|---|
| Tag | tag = tagHyperlink |
| Bit | hasTitle = 0 |
| Bit | internal = 0 |
| Bit | hasHRef = 0 |

Text    "Click on this text"

Char   endTag        // terminates tagAnchor

Here is an example of an internal link that is used to jump to another location within the same document. It indicates to jump to anchor #4, which is the 5$^{th}$ tagAnchor tag in the current document (the first tagAnchor is given index #0).

| | | |
|---|---|---|
| Tag | tag = tagHyperlink | |
| Bit | hasTitle = 0 | |
| Bit | internal = 1 | |
| UIntV | recordIndex = 1 | // stay in this current resource |
| UIntV | anchorIndex = 4 | // go to the 5th tagAnchor tag |

Text    "Click on this text"

Char   endTag        // terminates tagAnchor

---

TagAnchor

---

Description:

Used to represent local document anchors, or fragment identifiers within a document.

Unlike the <a> tag in HTML which can be used to define hyperlinks or local anchors (i.e. fragment indentifiers), the tagAnchor tag is only used to define local anchors. The tagHyperlink tag, defined above, is used exclusively to define hyperlinks.

Normally, tagAnchors don't need an associated name since the tagHyperlink tag jumps to tagAnchors by index. The first tagAnchor in a document is index #0, the second is index #1, etc. However, documents designed to be installed onto the Handheld computer through HotSync or wireline means might include the anchor names so that other documents could include hyperlinks that jump to that location using a fragment identifier URL (something like http://www.mine.com/#anchorName).

Parameters:
    Bit     hasName
    if (hasName)
        TextZ     name

Examples:
    Tag     tag = tagAnchor
    Bit     hasName = 0

Graphic Elements

---

TagImage

Description:
    Used to represent inline images. Any of the UIntV parameters to the tagImage tag can be set to nil to generate default behavior.

Parameters:

| | | |
|---|---|---|
| Text | alternateText | // alternate text |
| Char | endTag | // marks end of alternate text |
| Bit[3] | align | // one of alignTop, alignMiddle, |
| | | // alignBottom, alignLeft, alignRight |
| UIntV | height | // suggested height |
| UIntV | width | // suggested width |
| UIntV | border | // suggested border width |
| UIntV | hspace | // suggested horizontal gutter |
| UIntV | vspace | // suggested vertical gutter |
| Bit | ismap | // true if hyperlink |
| Image | imageData | // image data [TBD...] |

Examples:
    Text    "This is some text"

Tag tag =    tagImage
    Text     "This is an image of a PalmPilot"
    Char     endTag
    Bit[3]     align = alignBottom
    UIntV     height = 0

| | |
|---|---|
| UIntV | width = 0 |
| UIntV | border = 0 |
| UIntV | hspace = 0 |
| UIntV | vspace = 0 |
| Bit ismap = 1 | |
| Image | image = *[TBD...]* |

---

TagHorizontalRule

Description:

Used to place a horizontal rule graphic in the page. If the custom parameter is 0, then no other parameters follow and the rule is placed with a default width, height, and color.

Parameters:

```
Bit custom
if (custom == 1)
Bit[3]    align        // one of alignLeft, alignCenter, or
//alignRight
Bit    noShade       // render in solid color
UIntV  size    // height in pixels
UIntV  width   // width in pixels
```

Examples:

```
// A default rule

Tag    tag = tagHorizontalRule
Bit    custom = 0

Text   "Some random text"

// A custom rule
Tag    tag = tagHorizontalRule
Bit    custom = 1
Bit[3] align = alignCenter
Bit    noShade = 0
UIntV size = 3
UIntV width = 50
```

Some embodiments of the invention include a method of converting an HTML message into a second message. The method comprises translating the HTML message into a compact markup language (CML). The HTML message comprises HTML constructs. CML representation of HTML constructs comprises a stream of data with embedded tags. The embedded tags comprise binary data corresponding to the HTML constructs. In some embodiments, the stream of data comprises text and image data. The text data comprises multi-bit character representation for selected characters, eight bit representations for a first set of unselected characters, and sixteen bit representations for a second set of unselected characters. The second message typically contains information requested by the wireless client 405. The second message is often referred to herein as the response message, but could be any message that requires formatting of an HTML message in CML prior to communication to a requesting host.

HTML Element Functionality

The following sections outline features of HTML version 3.2 and their level of functionality on the wireless client 405. When using the browser 104 engine, the data sent to the wireless client 405 from the proxy server 180 is in CML that is generated dynamically from the original HTML document. When the standard browser engine is used however, the wireless client 405 gets the HTML source directly from the web server.

The Head Elements

HEAD

| Element | End Tag | Level |
|---------|---------|-------|
| HEAD    | yes     | N/A   |

Description:
The head start and end tags enclose the document head and are optional.

Examples:
<HEAD>

CML Representation:

Not needed. Every CML document starts with a title string terminated by an endTag character, which is the implied "head" portion.

TITLE

| Element | End Tag | Level |
|---------|---------|-------|
| TITLE   | yes     | N/A   |

Description:

The title of the document. Usually displayed in the window's title bar.

Examples:

<TITLE>A study of population dynamics</TITLE>

CML Representation:

No tag needed. Every CML document is defined to start with a title string terminated by an endTag character.

STYLE

| Element | End Tag | Level |
|---------|---------|-------|
| STYLE   | yes     | N/A   |

Description:

A place holder for future versions of HTML which may support style sheets.

Examples:

<STYLE>some random text</STYLE>

CML Representation:

The tagStyle tag and associated endTag character.

SCRIPT

| Element | End Tag | Level |
|---------|---------|-------|
| SCRIPT  | yes     | N/A   |

Description:

A place holder for future versions of HTML which may support client-side scripts.

Examples:

<SCRIPT>some random text</SCRIPT>

CML Representation:

The tagScript tag and associated endTag character.

---

ISINDEX

| Element | End Tag | Level |
|---------|---------|-------|
| ISINDEX | no | N/A |

ISINDEX Attributes:

| Attribute | Type | |
|-----------|------|---|
| Prompt | Text | The prompt string |

Description:

The ISINDEX element is a simple way to implement a single line text input field. The same behavior can be accomplished through use of a single field FORM element in the body.

Examples:

<ISINDEX PROMPT="Search Phrase">

CML Representation:

ISINDEX elements are translated into CML representations for a form in the body portion - there is no dedicated CML tag for ISINDEX.

---

BASE

| Element | End Tag | Level |
|---------|---------|-------|
| BASE | No | N/A |

BASE Attributes:

| Attribute | Type | Description |
|-----------|------|-------------|
| Href | url | the base URL |

Description:

The BASE element gives the base URL for dereferencing relative URLs.

Examples:

<BASE HREF="http://www.acme.com">

CML Representation:

CML documents do not contain hotlink URLs so no equivalent to this field is necessary. The wireless client 405 simply tells the proxy server 180 when the user clicks on a hotlink by passing the hotlink's index to the proxy server 180. The proxy server 180 then looks up the appropriate URL using the original document.

META

| Element | End Tag | Level |
|---------|---------|-------|
| META    | no      | N/A   |

META Attributes:

| Attribute  | Type | Description          |
|------------|------|----------------------|
| Http-equiv | Text | HTTP response header name |
| name       | Text | Property name        |
| Content    | Text | Property value       |

Description:

The META element can be used to include name/value pairs describing properties of a document such as author, expiration date, etc. The NAME attribute specifies the property name while the CONTENT attribute specifies the property value.

Examples:

<META NAME="Author" CONTENT="Dave Raggett">

CML Representation:

META elements are represented by tagMeta CML tags.

LINK

| Element | End Tag | Level |
|---------|---------|-------|
| LINK    | No      | N/A   |

| Attribute | Type | Description |
|-----------|------|-------------|

| | | |
|---|---|---|
| href | url | A URL specifying the linked resource |
| rel | text | forward link types |
| rev. | text | reverse link types |
| title | text | advisory title string |

Description:
The LINK element provides a media independent method for defining relationships with other documents and resources. Very few browsers take advantage of it.

Examples:
<LINK REL=Contents HREF=toc.html>
<LINK REL=Previous HREF=doc32.html>
<LINK REL=Next HREF=doc33.html>

CML Representation:
None.

The Body

BODY

| Element | End Tag | Level |
|---|---|---|
| BODY | Yes | N/A |

Body Attributes:

| Attribute | Type | Description |
|---|---|---|
| Bgcolor | color | The background color for the document. |
| Text | color | The text color. |
| Link | color | The color to use for unvisited hypertext links. |
| Vlink | color | The color to use for visited hypertext links |
| Background | url | The URL for an image to tile the background with |

Description:
The body start and end tags enclose the document body and may be omitted.

Examples:
<BODY BGCOLOR=white TEXT=black LINK=red VLINK="#C0FFC0">

CML Representation:

The body section starts immediately after the endTag-character terminated title in a CML document and does not have an associated tag. The TEXT, BGCOLOR, LINK, VLINK, and BACKGROUND attributes are represented by the standalone CML tags tagTextColor, tagBGColor, tagLinkColor, tagLinkColor, and tagBGImage respectively.

Headings

H1, H2, H3, H4, H5, H6

| Element | End Tag | Level |
|---|---|---|
| H1 | yes | Block |
| H2 | yes | Block |
| H3 | yes | Block |
| H4 | yes | Block |
| H5 | yes | Block |
| H6 | yes | Block |

H1, H2, H3, H4, H5, H6 Attributes:

| Attribute | Type | Description |
|---|---|---|
| Align | enum | Can be any one of LEFT, CENTER, or RIGHT |

Description:
The H1 through H6 tags are used for document headings. Start and end tags are required. H1 elements are more important than H2 elements, and so on.

Examples:
<H1 ALIGN=CENTER>This is the Heading Text</H1>

CML Representation:
Heading elements are represented by the corresponding tagH1..tagH6 CML tags.

Paragraph Breaks and Formatting

BR

| Element | End Tag | Level |
|---|---|---|
| BR | No | Text |

BR Attributes:

| Attribute | Type | Description |
|---|---|---|
| clear | enum | Used to move down past floating images on either margin. |

Description:

The BR element forces a line break. The CLEAR attribute can be used to move down past floating images on either margin.

Examples:

<BR CLEAR=ALL>

CML Representation:

BR elements are represented in CML as 1 or more imbedded linebreak characters in the text.

P

| Element | End Tag | Level |
|---|---|---|
| P | Optional | Block |

P Attributes:

| Attribute | Type | Description |
|---|---|---|
| Align | enum | Can be any one of LEFT, CENTER, or RIGHT |

Description:

The P tag signifies a paragraph break and is typically rendered as a line break followed by a blank line (i.e. another line break). The end tag is optional because it can be inferred by the parser.

Examples:

<P>This is the first paragraph.
<P>This is the second paragraph.

CML Representation:

The P tag will be replaced with 1 or more imbedded linebreak characters in the text. If the align attribute is specified, then a tagParagraphAlign CML tag will also be placed at the beginning (and possibly end) of the paragraph.

DIV, CENTER

| Element | End Tag | Level |
|---|---|---|
| DIV | Yes | Block |

| | | |
|---|---|---|
| CENTER | Yes | Block |

DIV Attributes:

| Attribute | Type | Description |
|---|---|---|
| align | Enum | Can be any one of LEFT, CENTER, or RIGHT |

Description:
The DIV element can be used to structure an HTML document as a hierarchy of divisions. The CENTER element is equivalent to DIV with an ALIGN attribute of CENTER. This element differs from the P element in that it doesn't generate 2 line breaks (with the accompanying blank line).

Examples:
<DIV ALIGN=CENTER>
This section of text is centered.
</DIV>

CML Representation:
The DIV or CENTER section will be replaced with a linebreak character in the text and the appropriate imbedded tagParagraphAlign CML tag.

HR

| Element | End Tag | Level |
|---|---|---|
| HR | No | Block |

| Attribute | Type | Description |
|---|---|---|
| Align | enum | One of LEFT, CENTER, or RIGHT |
| Noshade | void | Render as solid color instead of a 2 color groove |
| Size | number | Height of the rule in pixels |
| Width | number | Width of the rule in pixels (WIDTH=100) or as a percentage (WIDTH="50%") |

Description:
The HR element renders a horizontal line across the page and is used to indicate a change in topic.

Examples:
<HR ALIGN=center>

CML Representation:
This element is represented by the tagHorizontalRule CML tag.

Lists

UL

| Element | End Tag | Level |
|---|---|---|
| UL | Yes | Block |

UL Attributes:

| Attribute | Type | Description |
|---|---|---|
| type | enum | Can be any one of DISC, SQUARE, or CIRCLE |
| compact | void | Render list in a more compact style |

Description:
The UL tag is used for unordered lists. The LI element is used for individual list items within the list.

Examples:
<UL>
 <LI>The first item
 <LI>The second item
</UL>

CML Representation:
The UL tag will be replaced with the tagListUnordered CML tag. List items are separated from each other by endTag characters and the entire list is terminated by an endTag character. For example:

| | |
|---|---|
| Tag | tag=tagListUnordered |
| Bit[3] | type = listTCircle |
| Bit | compact = 0 |
| | |
| Text | item="The first item" |
| Char | itemSeparator = endTag |
| | |
| Text | item="The second item" |
| Char | itemSeparator = endTag |
| | |
| Char | endList = endTag |

OL

| Element | End Tag | Level |
|---|---|---|

| Element | End Tag | Level |
|---|---|---|
| OL | Yes | Block |

| Attribute | Type | Description |
|---|---|---|
| Type | enum | Can be any one of 1, a, A, I, or I |
| Start | number | Specifies the starting sequence number |
| Compact | void | Render list in a more compact style |

Description:
The OL tag is used for ordered (numbered) lists. The LI element is used for individual list items.

Examples:
<OL START=4>
<LI>The first item
<LI>The second item
</OL>

CML Representation:
The OL tag will be replaced with the tagListOrdered CML tag. List items are separated from each other by endTag characters and the entire list is terminated by an endTag character. For example:

```
Tag   tag=tagListOrdered
Bit[3]      type = listT1
UIntV       start = 0
Bit compact = 0

Text        item="The first item"
Char        itemSeparator = endTag

Text        item="The second item"
Char        itemSeparator = endTag

Char        endList = endTag
```

MENU, DIR

| Element | End Tag | Level |
|---|---|---|
| MENU | Yes | Block |
| DIR | Yes | Block |

| Attribute | Type | Description |
|---|---|---|

| Compact | void | Render list in a more compact style |

Description:
The MENU and DIR elements are essentially the same as UL elements.

Examples:
```
<MENU>
 <LI>The first choice
 <LI>The second choice
</MENU>
```

CML Representation:
See the UL tag description.

LI

| Element | End Tag | Level |
|---------|---------|-------|
| LI | No | Block |

LI Attributes within UL:

| Attribute | Type | Description |
|-----------|------|-------------|
| Type | enum | Can be any one of DISC, SQUARE, or CIRCLE |

LI Attributes within OL:

| Attribute | Type | Description |
|-----------|------|-------------|
| Type | enum | Can be any one of 1, a, A, I, or I |
| Value | number | Sequence number for this list item |

Description:
The LI element is used within ordered (OL) or unorder (UL) lists.

Examples:
```
<OL START=4>
 <LI>The first item
 <LI>The second item
</OL>
```

CML Representation:
By default, list items are separated from each other by the endTag character. List items which do not have default attributes start with the tagListItemCustom tag which allows the TYPE and VALUE attributes to be specified.

For example:

```
Text       item="The first item"
Char       itemSeparator = endTag

Text       item="The second item"
// - item separator not used here

Tag        tag = tagListItemCustom
Bit[3]     type = listTSquare
UIntV      value = 0
Text       "Third item"
Char       itemSeparator = endTag
```

DL, DT, DD

| Element | End Tag | Level |
|---------|---------|-------|
| DL | Yes | Block |
| DT | Yes | Block |
| DD | Yes | Block |

DL Attributes:

| Attribute | Type | Description |
|-----------|------|-------------|
| Compact | Void | Render list in a more compact style |

Description:

The DL element is used to enclose 1 or more DT (definition term) and DD (definition) elements.

Examples:

```
<DL>
<DT>PalmPilot<DD>A killer PDA
<DT>WinCE<DD>Ouch!
</DL>
```

CML Representation:

The required formatting for displaying the definition list is accomplished by replacing the DL and DT tags with linebreaks. The DD tags are represented by tagListItemDefinition CML tags.

Formatted Blocks

ADDRESS

| Element | End Tag | Level |
|---------|---------|-------|

| ADDRESS | yes | Block |

Description:

The ADDRESS start and end tags can be used to enclose authorship and contact details for the current document.

Examples:

<ADDRESS>
Newsletter editor<BR>
J.R. Brown<BR>
8723 Buena Vista, Smallville, CT 01234<BR>
Tel: +1 (123) 456 7890
</ADDRESS>

CML Representation:

The ADDRESS start tag will be replaced with the appropriate tagTextSize, tagTextFont, etc. CML tags as necessary in order to represent the address section in a proportional, normal size, italic font.

PRE, XMP, LISTING

| Element | End Tag | Level |
|---|---|---|
| PRE | Yes | Block |
| XMP | Yes | Block |
| LISTING | Yes | Block |
| PLAINTEXT | Yes | Block |

PRE Attributes:

| Attribute | Type | Description |
|---|---|---|
| Width | Number | Hint of required width in characters |

Description:

The PRE element can be used to include pre-formatted text. Text within this element is rendered in a fixed pitch font preserving white space. The PLAINTEXT, XMP and LISTING elements are obsolete tags that behave the same as PRE.

Examples:
<PRE>
 Higher still and higher
  From the earth thou springest

</PRE>

CML Representation:

The text enclosed by PRE elements will be prepended with the CML tagTextFont, tagTextSize etc. elements as needed in order to render it in a normal size, fixed pitch font. The WIDTH attribute is only used by the proxy server 180 (to pick an appropriate font size) and is not present in the CML.

BLOCKQUOTE

| Element | End Tag | Level |
|---|---|---|
| BLOCKQUOTE | Yes | Block |

Description:

The BLOCKQUOTE element is typically rendered as an indented paragraph.

Examples:

<BLOCKQUOTE>They went in single file</BLOCKQUOTE>

CML Representation:

The BLOCKQUOTE start and end tags will be represented by the tagBlockQuote CML tag.

Forms

FORM

| Element | End Tag | Level |
|---|---|---|
| FORM | Yes | Block |

FORM Attributes:

| Attribute | Type | Description |
|---|---|---|
| Action | Url | Which URL to submit the form results to |
| Method | Enum | Either "GET" or "POST" |
| Enctype | MIME | Typically "application/x-www-form-urlencoded" |

Description:

The FORM element is used to enclose a set of form input elements where users can enter information, select check boxes and radio buttons, select choices, etc.

Examples:

```
<FORM METHOD=POST
ACTION="http://www.cc.ukans.edu/cgi-bin/post-query">

Please help us by filling this out:
<P>organization: <INPUT NAME="org" TYPE=TEXT
SIZE="48">
<P>Commercial? <INPUT NAME="commerce"
TYPE=checkbox>
How many users? <INPUT NAME="users" TYPE=int>
<P><INPUT TYPE=submit> <INPUT TYPE=reset>

</FORM>
```

CML Representation:

This element is represented by the tagForm CML tag. The attributes of the FORM element (action, method, enctype} are not applicable on the client and hence are not included in the CML representation. When the user hits the submit button for a form, the wireless client 405 tells the proxy server 180 which form's submit button was pressed along with the values of the various input fields, and relies on the proxy server 180 to take the appropriate action using the FORM information from the original HTML document.

INPUT

| Element | End Tag | Level |
|---------|---------|-------|
| INPUT   | No      | Text  |

INPUT Attributes:

| Attribute | Type | Description |
|-----------|------|-------------|
| Type | enum | One of TEXT, PASSWORD, CHECKBOX, RADIO, SUBMIT, RESET, FILE, HIDDEN, or IMAGE. |
| name | text | The property name that this input represents |
| value | text | The initial property value, or the label for submit and reset buttons |
| checked | void | Used to initialize checkboxes and radio buttons to their checked state |
| size | number | Used to set the visible size of text fields to the given number of characters |
| maxlength | number | Used to set the maximum number of characters permitted in a text field |

| | | |
|---|---|---|
| src | url | Specifies a URL for the image to associate with a graphical submit button |
| align | enum | Used to specify image alignment for graphical submit buttons. Can be any one of TOP, MIDDLE, BOTTOM, LEFT, or RIGHT. Default is bottom. |

Description:
The INPUT element is used within FORM elements to specify input fields within a form.

Examples:
```
<INPUT TYPE=radio NAME=age VALUE="0-12">
<INPUT TYPE=submit VALUE="Party on...">
<INPUT TYPE=image NAME=point src="map.gif">
<INPUT TYPE=reset value="Start over...">
```

CML Representation:
Each of the various input element types is represented by one of the following CML tags: tagInputTextLine, tagInputPassword, tagInputCheckbox, tagInputRadio, tagInputSubmit, tagInputSubmitImage, and tagInputReset.

In the CML representation, the NAME attribute is not required for any of the input tags. Instead, the client references input items by index where the first input item in a form is item number 0. The proxy server 180 is responsible for formatting the correct FORM "GET" or "POST" command using the input item names from the original HTML document.

Also, the CHECKBOX and RADIO elements do not have associated VALUE attributes in CML. Instead, when the user hits the submit button, the wireless client 405 tells the proxy server 180 whether radio and checkbox controls were checked or not. The proxy server 180 then uses the VALUE parameters from the original HTML when submitting the actual request to the web server.

For radio input items, the CML representation will also associate a group number for each radio input. The group number enables the wireless client 405 to automatically de-select the appropriate radio buttons in mutually exclusive groups.

The tagInputSubmitImage does not have the equivalent to the SRC attribute. Instead, the image data is included as part of the parameters to the tag.

For example, the HTML sequence:

```
<P>Age 0-12: <INPUT TYPE=radio NAME=age CHECKED VALUE="0-12">
<P>Age 13-17: <INPUT TYPE=radio NAME=age VALUE="13-17">
``` is represented in CML as:

| | |
|---|---|
| Text | text = "\r\rAge 0-12:" |
| | |
| Tag | tag = inputRadio |
| Bit | checked = 1 |
| UIntV | group = 0 |
| | |
| Text | text = "\r\rAge 13-17:" |
| | |
| Tag | tag = inputRadio |
| Bit | checked = 0 |
| UintV | group = 0 |

TEXTAREA

| Element | End Tag | Level |
|---|---|---|
| TEXTAREA | Yes | Text |

| Attribute | Type | Description |
|---|---|---|
| name | Text | The property name that this input represents |
| rows | number | The number of visible text lines |
| cols | number | The visible width in average character widths |

Description:
The TEXTAREA element represents a multi-line input text field for forms.

Examples:
```
<TEXTAREA NAME=address ROWS=4 COLS=40>
Your address here ...
</TEXTAREA>
```

CML Representation:
This entity is represented by the CML tagInputTextArea tag. This tag is followed by two UintV's that specify the width and height of the text area along with the initial text terminated by an endTag character. The NAME attribute is not included in the CML representation since all input elements in forms on the wireless client 405 are referenced by index.

SELECT, OPTION

| Element | End Tag | Level |
|---|---|---|
| SELECT | Yes | Text |
| OPTION | Yes | Text |

Select Attributes:

| Attribute | Type | Description |
|---|---|---|
| name | Text | The property name that this select choice represents |
| size | Number | The number of visible choices at once |
| multiple | Void | Enables user to select more than 1 choice |

Option Attributes:

| Attribute | Type | Description |
|---|---|---|
| selected | void | If present, this option is initially selected |
| value | text | The property value to use when submitting the form. |

Description:

The SELECT element is used to represent multiple choice selections within a form. This usually gets rendered on the screen as a pop-up menu. The items in the menu are each represented by the OPTION element.

Examples:

```
<SELECT NAME="flavor">
<OPTION VALUE=a> Vanilla
<OPTION VALUE=b SELECTED> Strawberry
<OPTION VALUE=c> Chocolate
</SELECT>
```

CML Representation:

The SELECT element is represented by the tagInputSelect CML tag. There is no associated NAME attribute since the wireless client 405 references all input elements in a form by index. The tagInputSelect tag is followed by a single bit which specifies whether multiple selections are allowed followed by a UIntV containing the value of the SIZE attribute.

The select items are separated from each other by endTag characters or by selectItemCustom tags that specify pre-selected items.

There is no equivalent to the VALUE attribute because the wireless client 405 simply tells the proxy server 180 which items were selected by index and relies on the proxy server 180 to format the correct FORM submission from the original HTML document info.

For example, the above HTML would be represented in CML as:

| | | |
|---|---|---|
| Tag | tag = inputSelect | |
| Bit | multiple = 0 | |
| UIntV | size = 0 | // default |
| | | |
| Text | option = "Vanilla" | |
| | | |
| Tag | tag = tagSelectItemCustom | |
| Bit | selected = 1 | |
| Text | option = "Strawberry" | |
| | | |
| Char | itemSeparator = endTag | |
| Text | option = "Chocolate" | |
| | | |
| Char | endSelect = endTag | |

Tables

TABLE, TR, TD

| Element | End Tag | Level |
|---|---|---|
| TABLE | Yes | Block |
| TR | Yes | Block |
| TD | Yes | Block |
| TH | Yes | Block |

TABLE attributes:

| Attribute | Type | Description |
|---|---|---|
| Align | enum | One of LEFT, CENTER, or RIGHT |
| Width | int | Table width relative to window |
| Border | number | Width of border around table in pixels |
| Cellspacing | number | Spacing between cells |
| Cellpadding | number | Spacing within cells |

TR attributes:

| Attribute | Type | Description |
|---|---|---|
| Align | Enum | One of LEFT, CENTER, or RIGHT |
| Valign | Enum | One of TOP, MIDDLE, or BOTTOM |

TH/TD attributes:

| Attribute | Type | Description |
|---|---|---|
| Align | enum | One of LEFT, CENTER, or RIGHT |
| Valign | enum | One of TOP, MIDDLE, or BOTTOM |
| Nowrap | void | suppress word wrap |
| Rowspan | number | number of rows spanned by cell |
| Colspan | number | number of columns spanned by cell |
| Width | number | suggested width of cell in pixels |
| Height | number | suggested height of cell in pixels |

Description:

By default, tables are rendered without a surrounding border. The table is generally sized automatically to fit the contents, but you can also set the table width using the WIDTH attribute. The BORDER, CELLSPACING, and CELLPADDING attributes provide further control over the table's appearance. A caption can be placed at the top or bottom of a table by following the TABLE element with a CAPTION element.

The TR element is used to delineate rows of the table. The TD element is used to mark data cells. The TH element is used to mark header cells, which may be rendered in a different font than data cells.

Examples:

```
<TABLE BORDER=3 CELLSPACING=2 CELLPADDING=2
WIDTH="80%">
<CAPTION>Table title</CAPTION>
<TR><TH>first cell<TD> second cell
<TR><TH>2nd row, first cell<TD>2nd row, second cell
</TABLE>
```

CML Representation:

Tables are represented by the tagTable CML tag. It has the following format in CML. Notice that the tagTableColumn tag is only placed in front of header cells, and in front of data cells that do not have default attributes.

| | |
|---|---|
| Tag | tag = tagTable |
| Bit[2] | hAlign = alignCenter |
| UIntV | width = 0 |
| UIntV | border = 0 |
| UIntV | cellSpacing = 0 |
| UIntV | cellPadding = 0 |
| | |
| Tag | tag = tagCaption |
| Bit | captionAtTop = 1 |
| Text | caption = "Table Title" |
| Char | endCaption = endTag |
| | |
| Tag | tag = tagTableRow |

```
Bit          hasAlign = 0

Tag          tag = tagTableColumn
Bit          headerCell = 1
Bit          hasAttribute = 0
Text         "row1, col1"
Char         endTag Text         "row1, col2"
Char         endTag Tag          tag = tagTableRow
Bit          hasAlign = 0

Tag          tag = tagTableColumn
Bit          headerCell = 1
Bit          hasAttribute = 0
Text         "row2, col1"
// endTag not used here // Custom cell attributes
Tag          tag = tagTableColumn
Bit          headerCell = 0
Bit          hasAttribute = 1
Bit          noWrap = 0
UIntV        rowSpan = 0
UIntV        colSpan = 0
Bit[2]       hAlign = alignRight
Bit[2]       vAlign = alignTop
UIntV        width = 0
UIntV        height = 0

Text         "row2, col2"
Char         endTag

Char         endTag       // end of table
```

As seen, the table tag is followed by the table attributes.

If a row is too long to fit in the window, the client is responsible for performing row wrapping. For example, a table with 4 rows and 3 columns might be drawn as 4 rows of 2 columns, then 4 more rows of 2 columns where the second set of 4 rows would have a copy of the first column. The following diagram illustrates this:

An HTML table with 4 rows and 3 columns:

| A1 | B1 | C1 |
|----|----|----|
| A2 | B2 | C2 |
| A3 | B3 | C3 |
| A4 | B4 | C4 |

Gets rendered on the client as:

| A1 | B1 |
|----|----|
| A2 | B2 |
| A3 | B3 |
| A4 | B4 |

| A1 | C1 |
|----|----|
| A2 | C2 |
| A3 | C3 |
| A4 | C4 |

Text Formatting

TT, I, B, U, STRIKE, BIG, SMALL, SUB, SUP

| Element | End Tag | Level |
|---------|---------|-------|
| TT | Yes | Text |
| I | Yes | Text |
| B | Yes | Text |
| U | Yes | Text |
| STRIKE | Yes | Text |
| BIG | Yes | Text |
| SMALL | Yes | Text |
| SUB | Yes | Text |
| SUP | Yes | Text |

Description:
These text level elements affect the text font and style used to display text. They all require start and end tags:

| | |
|---|---|
| TT | - monospaced text |
| I | - italic text style |
| B | - bold text style |
| U | - underlined text style |
| STRIKE | - strike-through text style |
| BIG | - larger font size |
| SMALL | - smaller font size |
| SUB | - subscript text |

SUP     - superscript text.

Examples:

This has some <B>bold and <I>italic text</I></B>.

CML Representation:

The I tag is represented by the tagTextItalic tag. The B tag is represented by the tagTextBold tag. The U tag is represented by the tagTextUnderline tag. The TT, STRIKE, BIG, SMALL, SUB and SUP tags are represented by the tagTextFormat tag.

EM, STRONG, DFN, CODE, SAMP, KBD, VAR, CITE

| Element | End Tag | Level |
|---|---|---|
| EM | Yes | Text |
| STRONG | Yes | Text |
| DFN | Yes | Text |
| CODE | Yes | Text |
| SAMP | Yes | Text |
| KBD | Yes | Text |
| VAR | Yes | Text |
| CITE | Yes | Text |

Description:

These text level elements affect the text font and style used to display text. They all require start and end tags:

EM     - emphasis, typically in italic font
STRONG     - strong emphasis, typically in bold font
DFN     - definition
CODE     - used for extracts of program code
SAMP     - used for sample output from programs
KBD     - used for text to be typed by the user
VAR     - used for variables or arguments to commands
CITE     - used for citations or references to other sources.

Examples:

<EM> This is emphasized text </EM>.

CML Representation:

The EM tag is represented by the tagTextItalic tag. The STRONG tag is represented by the tagTextBold tag. The DFN, CODE, SAMP, KBD, VAR, and CITE tags are represented by the tagTextFormat tag.

FONT

| Element | End Tag | Level |
|---|---|---|
| FONT | Yes | Text |

FONT Attributes:

| Attribute | Type | Description |
|---|---|---|
| Size | Text | Font size. Can be specified as an integer ranging from 1 to 7 or as a signed integer relative to the current base font size as set by the BASEFONT element |
| Color | Text | Use to set the color of the text. Given as RGB in hexadecimal notation or as one of 16 widely understood color names. |

Description:
The FONT element can be used to specify a specific font size and color for the enclosed text.

Examples:
<FONT SIZE="+1">
This is size +1
</FONT>

<FONT SIZE=4>
This is absolute size 4
</FONT>

CML Representation:
The FONT tag does not have a corresponding CML representation. The attributes of the FONT tag are represented using the tagTextSize and tagTextColor CML tags.

BASEFONT

| Element | End Tag | Level |
|---|---|---|
| BASEFONT | No | Text |

BASEFONT Attributes:

| Attribute | Type | Description |
|---|---|---|
| Size | number | Used to set the base font size for use with the FONT element. |

Description:

The BASEFONT element is used to specify the base font size for a document. The FONT element can then reference font sizes relative to the BASEFONT.

Examples:

<BASEFONT SIZE=4>

CML Representation:

Not required. Each FONT element in the original source will be converted to the appropriate absolute font size in the CML representation.

Hyperlinks

A

| Element | End Tag | Level |
|---|---|---|
| A | Yes | Text |

A Attributes:

| Attribute | Type | Description |
|---|---|---|
| Name | text | Used to indicated named links within a document |
| Href | url | URL for linked resource |
| Rel | text | The forward relationship, also known as the "link type". |
| rev | text | The reverse relationship. |
| title | text | The advisory title for the linked resource. |

Description:

The A (anchor) element represents a hyperlink.

Examples:

<A HREF="hands-on.html"> happiness </a>
<A NAME=mit> 545 Tech Square – Hacker's Paradise </a>

CML Representation:

This element is represented by the tagAnchor CML tag. There is no need for any of the attributes in the CML form because the wireless client 405 refers to links by index. Hence, it simply has to tell the proxy server 180 the index of which hyperlink was pressed and rely on the proxy server 180 to fetch the correct URL.

IMG

| Element | End Tag | Level |
|---|---|---|
| IMG | No | Text |

| Attribute | Type | Description |
|---|---|---|
| src | url | URL of the image |
| alt | text | Text to display in place of image |
| align | enum | Alignment of image, either TOP, MIDDLE, BOTTOM, LEFT, or RIGHT |
| height | number | suggested height of image |
| width | number | suggested width of image |
| border | number | suggested border width |
| hspace | number | suggested horizontal gutter |
| vspace | number | suggested vertical gutter |
| usemap | url | use client side image map |
| ismap | void | use server image map |

Description:

The IMG element is used to insert images into a document.

Examples:

<IMG SRC="canyon.gif" ALT="Grand Canyon">

CML Representation:

Unlike in HTML, where images are fetched independently of the source document, CML imbeds image data directly inline with the rest of the document using tagImage tags.

MAP, AREA

| Element | End Tag | Level |
|---|---|---|
| MAP | Yes | Text |
| AREA | No | Text |

MAP attributes:

| Attribute | Type | Description |
|---|---|---|
| Name | text | Used to associate a name with a map |

AREA attributes:

| Attribute | Type | Description |
|---|---|---|
| shape | enum | One of RECT, CIRCLE, or POLY |
| coords | text | Comma separated list of coordinates. |
| href | url | The URL to jump to when this region is selected |
| Nohref | void | This region has to action |
| Alt | text | Alternate text to display if no image. |

Description:
The MAP element is used in conjunction with the IMG element to specify wireless client 405 side image maps. The NAME attribute of the MAP is used by the USEMAP attribute on the IMG element to reference the MAP.

Examples:
<IMG SRC="navbar.gif" BORDER=0 USEMAP="#map1">

<MAP NAME="map1">
 <AREA HREF=guide.html alt="Access Guide" SHAPE=RECT coords="0,0,118,28">
 <AREA HREF=search.html alt="Search" SHAPE=RECT coords="184,0,276,28">
</MAP>

CML Representation:
The proxy server 180 is responsible for mapping user actions into URLs, so the MAP element is not represented in CML. The wireless client 405 just tells the proxy server 180 when the user clicks on an active image (tagImage tag with the ismap parameter set to 1) and passes the x-y coordinates of the hit to the proxy server 180. The proxy server 180 will then look up the appropriate URL using the original document's IMG and MAP elements.

Applets

APPLET, PARAM

| Element | End Tag | Level |
|---|---|---|
| APPLET | Yes | Text |
| PARAM | Yes | Text |

APPLET Attributes:

| Attribute | Type | Description |
|---|---|---|
| codebase | url | code base |
| code | text | class file |
| alt | text | for display in place of applet |
| name | text | applet name |
| width | number | suggested width in pixels |
| height | number | suggested height in pixels |
| align | enum | Vertical or horizontal alignment. One of TOP, MIDDLE, BOTTOM, LEFT or RIGHT. |
| Hspace | number | Suggested horizontal gutter |
| Vspace | number | Suggested vertical gutter |
| Ismap | void | Use server image map |

PARAM Attributes:

| Attribute | Type | Description |
|---|---|---|
| Name | text | the name of the parameter |
| Value | text | the value of the parameter |

Description:

The APPLET element is used to enclose a Java applet.

Examples:

<APPLET CODE="AudioItem" WIDTH=15 HEIGHT=15">
<PARAM NAME=snd VALUE="Hello.au|Welcome.au">
Java applet that plays a welcoming sound.
</APPLET>

CML Representation:

None

PalmOS HTML Extensions

DATEPICKER

| Element | End Tag | Level |
|---|---|---|
| DATEPICKR | No | Text |

DATEPICKER Attributes:

| Attribute | Type | Description |
|---|---|---|
| Value | Text | the value of the parameter |

Description:

The DATEPICKER element takes a value of a valid date in MM/DD/YY format. If no value is specified, the current date is displayed.

Examples:

DATEPICKER VALUE="11/15/96">

CML Representation:

This element is represented by the tagDatePicker CML tag.

TIMEPICKER

| Element | End Tag | Level |
|---|---|---|
| TIMEPICKER | No | Text |

TIMEPICKER Attributes:

| Attribute | Type | Description |
|---|---|---|
| Value | Text | the value of the parameter |

Description:

The TIMEPICKER element takes a value of a valid time in hh:mm:ss format. If no value is specified, the current time is displayed.

Examples:

<TIMEPICKER VALUE="11:45:30">

CML Representation:

This element is represented by the tagTimePicker CML tag.

Transfer Layer

Wireless Client Software Block Diagram

Figure 6:
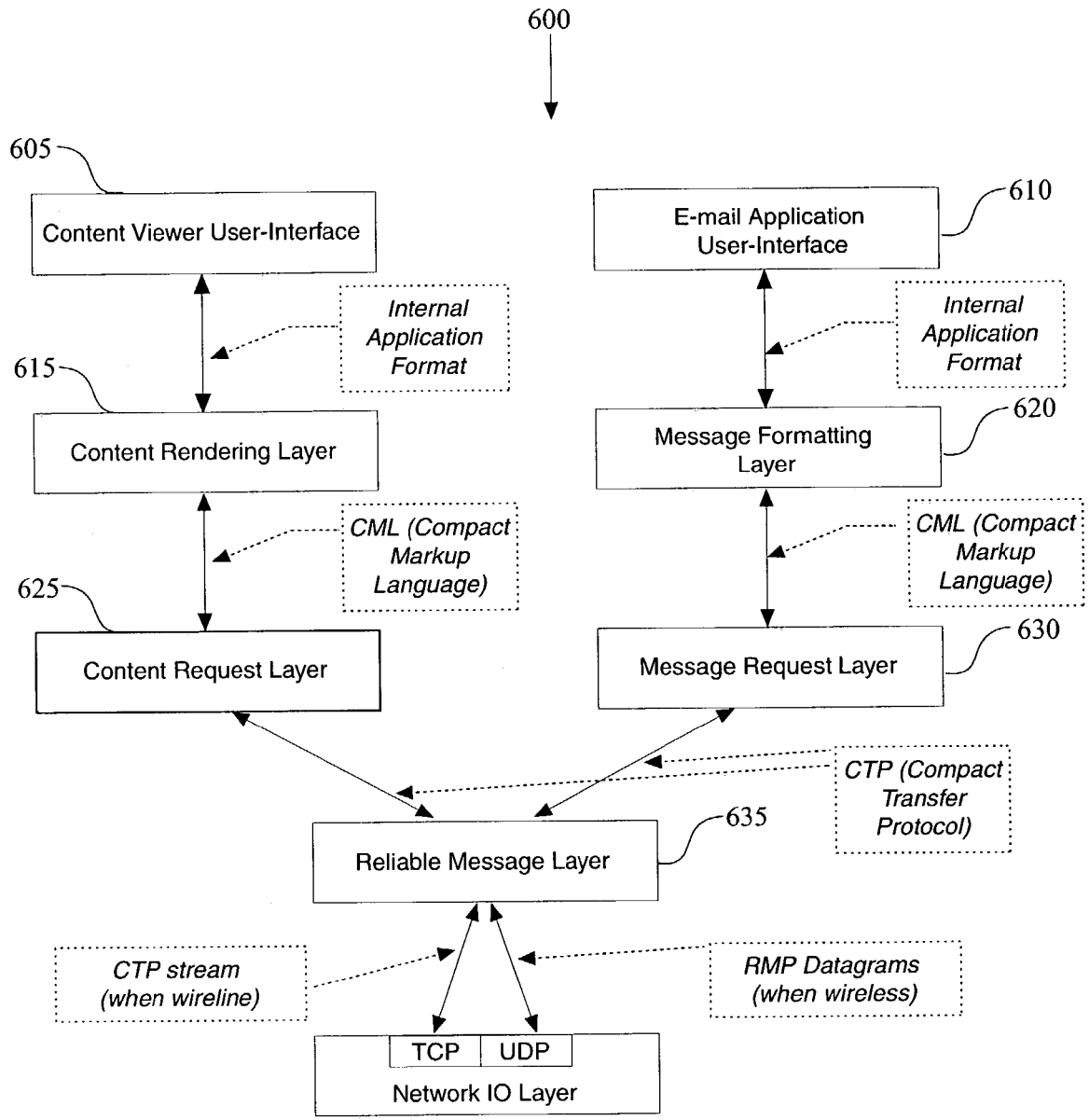
FIG. 6 illustrates an example of a wireless communications device exchanging messages in a communications system.

FIG. 6 shows a wireless client 405 processing resources (software) flow diagram 600. The boxes shown with solid lines are the actual software layers present on the wireless client 405. The annotated boxes shown in dotted lines indicate the format of the data passed between each of the software layers.

The content user interface 605 and e-mail application user interface 610 layers are part of the browser 104.

The content rendering layer 615 and message formatting layer 620 are also wireless client 405 processing resources. The content rendering layer 615 converts CML into the wireless communications device 100 operating system 102 drawing commands. The message formatting layer 620 converts CML messages from the network into a format compatible with the wireless communications device 100 e-mail application. The CML language is discussed in depth above including the binary format of CML, how it is created from HTML, and how it should be rendered on the wireless client 405.

The content request layer 625 and the message request layer 630 are responsible for fetching CML content from the proxy server 180. The content request layer 625 and the message request layer 630 use the compact transfer protocol (CTP) described below. These layers format request messages and accept response messages using the reliable message layer 635.

The reliable message layer 635 is responsible for reliably delivering request and response messages between the wireless client 405 and the proxy server 180. When operating over a wireless network, the reliable message layer 635 breaks up large messages into datagrams that fit into the wireless network. The reliable message layer 635 also guarantees order of delivery. When operating over a wireline network, the reliable message layer 635 passes control directly to the TCP stack of the network library (shown in FIG. 11 as the "Net Library", reference number 1110). The reliable message layer 635 is described in greater detail below.

Some embodiments of the invention include a method of using a computer for receiving an HTML data object (otherwise referred to as an HTML message) from a source of data. The receiving method comprises fetching the HTML data object, compressing the HTML data object, passing representations of the data object to a content rendering layer 615, and rendering the representations for viewing. These embodiments combine the standard browser engine with CML and CTP to enable a wireless client 405 to fetch HTML data objects using a wireline connection to the Internet 190. Fetching, compressing, passing, and rendering are performed by processing resources. The processing resources can be located at the wireless client 405 or elsewhere in the wireline network. The HTML data object is compressed by representing selected portions of the HTML data object in CML. In some embodiments, CML embeds image data directly in line with the rest of the HTML data object.

Some embodiments of the invention comprise a method for receiving a first message (otherwise referred to as a data object) from a source of data. These embodiments employ the thin browser engine, and use the proxy server 180 and the wireless packet data network to fetch data objects from the Internet 190. The method comprises the six steps discussed below. A proxy server 180 fetches the data object from the source of data. The proxy server 180 converts the data object into a second message comprising data in CML. The proxy server 180 transmits the second message to the wireless client 405. The wireless client 405 extracts CML data from the second message. The wireless client 405 passes CML data to a content rendering layer 615. The wireless client 405 renders CML data for viewing on a wireless communications device 100 screen 101. The second message comprises packets of data. In some embodiments, only a single packet is required and the packet is smaller than five hundred fifty bytes.

In some embodiments, the CML representations of the data object comprise temporary compressed formats adapted for single packet transfer between the proxy server 180 and the wireless client 405. The temporary compressed formats are tailored for wireless client 405 attributes. In some embodiments, wireless client 405 attributes comprise viewer screen 101 size and viewer image bit-depth. In some embodiments, CML embeds image data directly in line with the rest of the second message.

Some embodiments of the invention include a method for requesting HTML messages from a source of data. The requesting method comprises the following four steps. Submitting compressed representations of field values and field indices. Transmitting a first message in packets of data from a wireless client 405 to a proxy server 180. Transforming the first message into an HTML request. Transmitting the HTML request to the source of data. Some embodiments further comprise formatting the first message according to a compact transfer protocol using variable length binary fields to communication commands, options, parameters, and attributes.

Compact Transfer Protocol

This section discusses the implementation of the wireless communications device 100 transfer layer. Instead of the Internet standard HTTP, this layer uses the Compact Transfer Protocol (CTP) to structure requests and responses between the wireless client 405 and associated proxy server 180. In terms of functionality, the transfer layer is situated below the Content Layer (described above) and above the reliable message layer 635 (described below). CTP is designed with an emphasis on compactness over readability. Instead of using text to communicate commands, options, and attributes, CTP will use variable length binary fields.

An example of an HTTP request from a standard browser to a server would be:

GET/catalog/ip/ip.htm HTTP/1.0
Accept: text/plain
Accept: text/html
Accept: */*
If-Modified-Since Tue, Aug. 08, 1996 06:17:33 GMT
Referer: http://www.jamsa.com/catalog/catalog.htm
User-Agent: Mozilla/2.0

Some of the header information included in a typical HTTP request, as seen above, is used to convey information about the standard browser features to the server such as version numbers, and accepted return data types. CTP saves additional bytes by simply sending the proxy server 180 an enumerated type that is understood by the proxy server 180 to represent a certain combination of features. For example, the wireless client 405 could send a CTP request that tells the proxy server 180 that the wireless client 405 is a particular wireless communications device 100. This would automatically indicate a set of attributes to the proxy server 180 including the screen size, bit depth, and accepted return data types.

To draw an analogy with Internet 190 standards, CTP has roughly the same functionality as HTTP when accessing web content and POP3 and SMTP when sending or retrieving messages. CTP was designed to replace these Internet 190 protocols because they are verbose and wasteful of network bandwidth and hence impractical to use over a wireless network.

CTP is designed to minimize the amount of data that is sent over the network between the wireless client 405 and proxy server 180. In order to achieve its minimal size, it uses binary fields to represent request and response parameters, instead of text like most Internet 190 protocols do. Hence, CTP is not human readable like HTTP, but it is very compact.

FIG. 6 shows the wireless client 405 processing resources flow diagram 600 and illustrates how CTP is used on a wireless client 405 communicating with the proxy server 180.

This diagram illustrates how CTP is used to transport the high level content of both the browser 104 and the messaging applications to and from the network. Each of these applications uses CTP to send their requests to the proxy server 180 and to receive the responses. A CTP request tells the proxy server 180 what data the wireless client 405 wants. A CTP response has a success code along with the actual data requested in CML format.

The content request layer 625 formats CTP requests on behalf of the browser 104 application. When it gets a response from the proxy server 180, the content request layer 625 extracts the CML content and passes it on up to the content rendering layer 615.

The message request layer 630 creates CTP requests on behalf of the messaging application. When the CTP response arrives back from the proxy server 180, the message request layer 630 will extract the message data from the CTP response and pass it on up to the message formatting layer 620. Messages are also sent and received in CML format.

The lower software layers shown in FIG. 6 deal with reliably sending CTP request and response messages over the network. These layers are fully described below in the "reliable message layer" 635 section below.

The notation used to represent CTP requests and responses is the same notation used to document CML. This notation was introduced and described above in the "Compact Data Structure Notation" section.

CTP Structure

CTP requests and responses are structures built up out of variable length bit fields. They are generated and parsed programatically because of the variable size nature of each field. Every CTP request starts out with a set of common request header fields followed by zero or more request specific fields. Each CTP response also starts out with a set of common header fields and may or may not also include a data payload such as the returned content from a URL request.

Even though the header fields of a CTP request or response can be any number of bits long, the data portion starts on a byte boundary and the total CTP request or response, including the optional data payload, is an even number of bytes long. In order to meet these constraints, anywhere from 0 to 7 extra pad bits are appended to the CTP header before the data section starts and the data section is always an even number of bytes long (possibly zero). The extra pad bits and even byte CTP requirements are necessary because CTP requests and responses can be sent using the TCP protocol which sends data in quanta of bytes. The even byte restriction is enforced whether the CTP request is sent wirelessly using RMP or wireline using TCP.

The data payload (e.g., part of an email message or part of web page) that is part of a CTP request or response, such as the content returned from a CTP URL request, is always an even number of bytes long. As an example, a CTP web content response that has a 4 bit CTP response header and 100 bytes of content payload would require 4 bits of padding between the response header and the payload section in order to bring the total size of the response to 101 bytes long. If instead the CTP response header had been 8, 16, or any other multiple of 8 bits long, then no pad bits would be inserted between the header and the data.

CTP Requests

All CTP requests start out with the following common fields:

---

CTPReqCommon:

UIntV   headerVersion
UIntV   command
UIntV   contentVersion
Bit                                           encrypted
if (encrypted == 1)
UIntV   encryptionScheme
[other encryption parameters]

---

The headerVersion field is 0 for this version of CTP. The command field indicates the type of request—which could be either a request to fetch a URL, to get messages, or to send messages. The contentVersion field indicates the requested format of the returned data. Because a UIntV of value 0 is encoded using just 1 bit, both the headerVersion and contentVersion fields each take up only 1 bit in this header.

The CTP commands are pre-defined:

ctpCmdReqURL=0 ctpCmdReqMail=1 ctpCmdEcho=2 ctpCmdMsgGen=3 ctpCmdDiscard=4

The ctpCmdEcho, ctpCmdMsgGen, and ctpCmdDiscard commands are provided for testing proxy server 180 connectivity and are described in more detail below in the CTP Commands section along with the commands for fetching a URL (ctpCmdReqURL) and processing mail requests (ctpCmdReqMail).

When the encrypted bit is set to one, a UIntV specifying the encryption scheme follows along with encryption scheme dependent parameters. When the proxy server 180 receives an encrypted request, it returns the response in encrypted form using the same scheme as used in the request.

Depending on the value of the command and encryption fields, one or more other fields follow the common fields. The following sections describe the structure of the fields for each possible command.

CTP Responses

All CTP responses start out with the following common fields:

---

CTPRespCommon:

UIntV   responseSize
UIntV   result

---

The result field indicates success (0) or failure (non-zero error code) in responding to the request. The responseSize field indicates the size in bytes of the response data that immediately follows the result field and any necessary pad bits required to place the response data on a byte boundary.

Depending on the particular command that was requested, one or more other fields follow the common fields. The additional response fields for each command are described in the "CTP commands" section.

The following CTP codes are pre-defined possible values for the result field:

| | | |
|---|---|---|
| ctpErrNone= 0 | // no error | |
| ctpErrMalformedRequest = 1 | // CTP request invalid format | |
| ctpErrUnknownCmd = 2 | // unrecognized command value | |
| ctpErrProxy = 3 | // Proxy encountered an error while<br>// processing request | |
| ctpErrServer = 4 | // Content or Mail server returned an<br>// an error while processing request | |
| ctpWarnTruncated = 0x8000<br>// otherwise error free | // CTP response is truncated but | |

Whenever a CTP error result is returned (non-zero result less than 0x8000), the proxy server 180 can optionally provide extended error information in the data payload area of the CTP. This extended error information is formatted as a 4 byte extended error code optionally followed by a zero-terminated 8-bit ASCII string describing that error code. For example, if the proxy server 180 can not find the server for a particular web site, the proxy server 180 can return the following CTP response:

| | | |
|---|---|---|
| UIntV | responseSize = 19 | // 4 byte error code + 15 byte text |
| UIntV | result = 3 | // proxy error |
| Bit | padding[...] | // 0->7 bits if necessary to place<br>// following data on a byte<br>// boundary |
| UInt32 proxyErr = 0xC1000011 | | // proxy specific error code |
| Char[ ] | "Host not found" | // corresponding text |

CTP Data Types

CTP defines a number of unique data types in its various requests and responses.

DocumentAddr Type

The DocumentAddr data type is used to specify the URL when fetching a web document. This data type allows most URLs to be encoded much more compactly than their text equivalents would be. It even allows a pre-determined set of URLs to be specified by index—which is even more compact and useful for fetching common wireless communications device 100 specific pages.

DocumentAddr:

| | | |
|---|---|---|
| Bit | byName | // 0 if by land, 1 if by sea |
| if(byName == 0) | | |
| UIntV<br>else | siteNumber | // site number |
| Bit[3] | scheme | // which scheme to use (http, ftp,<br>// etc.) |
| Bit | pathEncoding | // if true, 5-bit encoding of path<br>//    else, ascii encoding |
| Text | path | // URL specified in either ascii<br>// or 5-bit encoding |

The byName field can be either 0 or 1. If the byName field is a 0, then it is followed by a UIntV specifying the URL by number. There is a pre-determined set of URLs defined by number that is known by all wireless clients 405. For example, site #0 could be the 3COM home page.

If the byName field is 1, then a scheme and path follows. The scheme field is a 3 bit field specifying one of the following 8 possible scheme strings that are prepended to the path:

| Scheme# | Text |
|---|---|
| 0 | http:// |
| 1 | https:// |
| 2 | Ftp:// |
| 3 | <reserved> |
| 4 | <reserved> |
| 5 | <reserved> |
| 6 | <reserved> |
| 7 | <empty> |

The pathEncoding field indicates the text encoding format of the path field. If it is 0, then the path is normal 8-bit ASCII. If it's 1, then the path is encoded using a special 5-bit alphabet which is similar, but not identical, to the 5-bit alphabet used CML text encoding:

| | Document Path 5-bit Alphabet |
|---|---|
| Value | Description |
| 0 | End of path |
| 1 | Escape next 8 bit ascii character |
| 2 | "com " |
| 3 | "www. " |
| 4 | "/ " |
| 5 | "  " |
| 6-31 | The lowercase letters: "a " through "z " |

Characters in a URL which are not in the 5-bit alphabet can be included by preceding the 8-bit ASCII value of the character by the 5-bit escape character (decimal value 1).

So, using the DocumentAddr type, the entire URL: "http://www.usr.com" can be represented as:

| | | |
|---|---|---|
| Bit | type = 1 | // site by name |
| Bit[3] | scheme = schemeHTTP | // "http://" |
| Bit | encoding = 1 | // 5-bit alphabet encoding |
| Bit[5] | char = 3 | // "www." |
| Bit[5] | char = 26 | // "u" |
| Bit[5] | char = 18 | // "s" |
| Bit[5] | char = 17 | // "r" |
| Bit[5] | char = 2 | // ".com" |
| Bit[5] | endChar = 0 | | which is altogether 35 bits, or just slightly more than 4 bytes long.

Extensions Data Type

The Extensions data type is used to include optional parameters in CTP requests and responses. For example, authentication and encryption parameters can be included in the extensions area of a CTP request so that most requests are not burdened with the overhead of the security fields.

The format of the Extensions data type is as follows:

| | | |
|---|---|---|
| Extensions: | | |
| UInt8 | id | // extension ID, 0 marks last one |
| if(id == 0) | | // no more extensions |
| else if(id < 128) | | // ID is a boolean extension with no<br>// parameters |
| else if(id < 254) | | |
| UInt8    length | | // number of bytes of parameters |
| UInt8[length] | data | // extension parameters |

-continued

```
else if(id == 255)
UInt16   extID              // 16-bit extension ID
UInt16   length             // length of extension data
UInt8[length]      data     // extension parameters.
```

Basically, the extension type is a list of extensions terminated by a 0 byte. Some extensions are boolean extensions that simply change the default value of a feature. For example, a boolean extension can tell the proxy server 180 to include all images instead of ignoring them.

Other extensions have associated parameters with them. Extension IDs 128 through 254 can have up to 255 bytes of parameter data following them. Finally, extension ID #255 is for adding 16-bit extension IDs.

CTP Commands

This section lists the possible CTP commands and their request and response formats. The entire request structure, including the common fields, is shown for each type of request. Requests are sent from the wireless client 405 to the proxy server 180 and are used to request certain web pages or to send or receive messages.

Requests

Request URL Command

Summary:

Used to fetch a URL. The command field in the common fields of the request header is set to ctpReqURL which has a value of 0.

Request Structure

The entire request, including the common fields has the following structure:

```
CTPReqCommon:

UIntV    headerVersion=0
UIntV    command=0             // ctpCmdReqURL (=0)
UIntV    contentVersion=0
Bit               encrypted
if (encrypted == 1)
UIntV encryptionScheme
[other encryption parameters]
CTPReqURLParams:

UIntV    maxResponse           // 0=1024, 1=2048, etc.
UIntV    part                  // which part of the response to
// fetch
UIntV    screenDepth           // log2 of bits/pixel of client
IntV     contentWidth          // if 0: pixels=160
                               // else pixels=contentWidth16+160
DocumentAddr docAddr           // which "URL" to fetch
Bit       hasExtensions        // true if extensions present
if (hasExtensions)
Extensions extensions          // optional extensions
UIntV    checkNewMailIDHi      // Hi 2 bytes of 6 byte mail ID
UIntV    checkNewMailIDLo      // Lo 4 bytes of 6 byte mail ID
Bit       post                 // true if using the HTTP POST method
// instead of the GET method
UIntV    dataSize              // # of bytes of data that follow
```

Request Description

The maxresponse parameter encodes the maximum size response that the wireless client 405 is willing to receive. The maximum size in bytes is represented by (maxResponse+1) *1024. The proxy server 180 truncates the response to this number of bytes. When a response has to be truncated, the result field in the CTP response will contain the non-fatal error code: ctpWarnTruncated.

The part parameter is used along with the maxResponse parameter to enable the wireless client 405 to request portions of a response that were previously truncated. Normally it is set to 0 to fetch the beginning of a response. If a wireless client 405 sets the truncation size to 1024 bytes (by setting the maxResponse field to 0), it could fetch the second 1024 bytes of the response by setting the part field to 1.

The screenDepth parameter contains the bit depth of the wireless client 405 screen 101 and is used by the proxy server 180 to determine the maximum bit-depth to render images at.

The contentWidth parameter contains the rough window width of the wireless client 405 and can be used by the proxy server 180 for formatting of the return content data. The default value of this parameter is zero, which yields a window width of 160. The maximum granularity of this field is 16 pixels at a time, so the actual width of the wireless client 405 window may be smaller than the specified size.

The docAddr field specifies the document address (URL) to fetch. This field is of type DocumentAddr and was described above.

The extensions field is used to specify seldom used options. This variable length field is used to indicate changes to the default behavior, such as inclusion or exclusion of images, authentication and encryption options, etc.

The following extensions are defined for this CTP request:

| Name | Value | Description |
|---|---|---|
| ctpExt1ncHTTPResponse | 1 | Boolean extension flag. If present, include HTTP response header along with data. Not applicable unless ctpExtNoContentConversion is also present |
| CtpExtNetID | 128 | Followed by length byte of 4 and a 4 byte mail network ID. Assumed to be 0 (Mobitex Network) if not present. |
| cptExtUserID | 129 | Followed by length byte of 4 and a 4 byte user ID. |
| ctpExUserPassword | 130 | Followed by length byte of 4 and a 4 byte user ID. |
| CtpExtUserName | 131 | Followed by length byte and a 0 terminated 8-bit ascii user name string. Must be specified if checking for new mail over a wireline network. |
| ctpExtServer | 132 | Followed by a length byte of 1 and 8 bits (1 byte) of server behavior flags. |
| ctpExtConverTo | 133 | Followed by length byte of 1 and a 1 byte conversion identifier ctpConvXXX. If not present then ctpConvCML is assumed. The available conversion identifiers are: CtpConvCML = 0, CML CtpConvCML8Bit = 1, CML in 8-bit debug form ctpConvCMLLZSS = 2, CML with LZSS ctpConvNone = 3 Return in native web format. When this is specified, then the response will include the ctpRspExtContenType and ctpRspExtContentEncoding extensions |

The 6 byte checkNewMailID tells the proxy server 180 whether or not to check for new mail along with fetching the given web resource. If this ID is 0, new mail is not checked. If this ID is 1, then the proxy server 180 will check for any new mail that has arrived since the last successful mail read operation. If this ID is greater than 1, then it indicates a mail message ID and the proxy will check for any new mail that has arrived after that given mail message.

Note that for wireless packet data network users, the user name can be determined from a corresponding wireless packet data unique address number which is part of the wireless network protocol headers. Consequently, when a user sends requests over the wireless network, the user does not have to include their user name in the extensions area of the CTP request. However, when using wireline networks, the user includes their user name in the CTP request itself using the ctpExtUserName extension since the wireless network is bypassed and the wireless network protocol header is not available. If a request is sent with a non-zero checkNew-MailID over the wireline network without a ctpExtUserName present, the checkNewMailID is treated as if it were 0.

The post field is generally set when submitting standalone forms designed for the HTTP POST method. The post data is generally included in the data portion of the CTP request and the number of bytes of data included should be set in the dataSize field. Note that the post field only needs to be used for standalone forms. Server dependent forms are submitted in the same manner to the proxy server 180 (through the "?*" sequence in the URL) for both GET and POST methods.

Responses
Response Structure

```
CTPRspCommon:

UIntV     responseSize
UIntV     result
CTPRspURLData:

Bit       hasDocAddr              // true if docAddr included
if (hasDocAddr)
DocumentAddr docAddr              // the URL of the return document
Bit       hasExtensions           // true if extensions present
if (hasExtensions)
Extensions     extensions         // optional extensions
Bit[ . . . ]   cmlContent         // content in CML format.
```

Reponse Description

The entire response, including the common fields has the following structure:

```
CTPRspCommon common
CTPRspURLData data                // response data
```

The hasDocAddr bit will be set if the document address is included in the response. The proxy server 180 will generally include the docAddr only if the document was requested using a hot link index relative to another URL.

The hasExtensions bit will be set if extension data is included in the response. Extension data could include things like expiration date of the content, security info, etc.

Finally, the content itself follows the extension data. The content is returned in CML format and can be any number of bytes long.

Response Examples

The following is a request to fetch the first screen full of data from the U.S. Robotics home page:

```
UIntV    headerVersion = 0
UIntV    command = ctpReqURL        // ctpReqURL = 0
UIntV    contentVersion = 0
Bit            encrypted = 0
UIntV    maxResponse=0              // 0=1024 bytes
UIntV    part=0                     // which part of the
                                    // response to fetch
```

-continued

```
UIntV    screenDepth=0              // 1 bit/pixel
IntV     contentWidth=0             // 0 means 160 pixels wide
DocumentAddr docAddr =              // which "URL" to fetch
Bit            type = 1             // site by name
Bit[3]         scheme = schemeHTTP  // "http://"
Bit            encoding = 1         // 5-bit alphabet encoding
Bit[5]         char = 3             // "www."
Bit[5]         char = 26            // "u"
Bit[5]         char = 18            // "s"
Bit[5]         char = 17            // "r"
Bit[5]         char = 2             // ".com"
Bit[5]         endChar = 0
Bit            hasExtensions=0      // no extensions
UIntV    checkNewMailIDHi = 0       // Hi 2 bytes
UIntV    checkNewMailIDLo = 0       // Check for new mail
```

In total, this request takes 46 bits to represent (7.5 bytes). Notice that most of the space is needed to represent the document address by name (35 bits), so requests for sites by index will be even shorter (typically 26 bits, or slightly more than 3 bytes).

The following is a response to a request to fetch the 4th hot link on the USR home page.

```
UIntV    responseSize = 403         // takes 20 bits to
                                    // represent
UIntV    result = 0                 // 1 bit
Bit            has DocAddr = 1
DocumentAddr docAddr =              // the actual "URL"
Bit            type = 1             // site by name
Bit[3]         scheme = schemeHTTP  // "http://"
Bit            encoding = 1         // 5-bit alphabet encoding
Bit[5]         char = 3             // "www."
Bit[5]         char = 26            // "u"
Bit[5]         char = 18            // "s"
Bit[5]         char = 17            // "r"
Bit[5]         char = 2             // ".com"
Bit[5]         char = 4             // "/"
Bit[5]         char = 21            // "p"
Bit[5]         char = 6             // "a"
Bit[5]         char = 17            // "l"
Bit[5]         char = 18            // "m"
Bit[5]         endChar = 0
Bit            hasExtensions = 0    // no extensions
Byte[ ]  cmlContent . . .           // content is always an even
                                    // # of bytes.
```

In total, this response is 403 bytes long. Of that, 83 bits (approximately 10 bytes) is part of the response header and roughly 393 bytes is the content itself.

Echo Command

Used for testing connectivity. This command will cause the proxy server 180 to echo back the data included in the CTP request.

The entire request, including the common fields has the following structure:

```
CTPReqCommon common                 // command field = ctpCmdEcho (2)
CTPEchoParams params                // request params.
```

Echo Structure
CTPEchoParams:

```
UIntV    dataSize                   // size in bytes of echo data that
                                    // follows
```

The dataSize parameter indicates the size of the data in bytes that immediately follows the CTPEchoParams structure. When the proxy server 180 receives this command, it will send a response back that contains this data.

Echo Examples

The following is a request to echo back the word "Hello"

| UIntV | headerVersion = 0 | |
|---|---|---|
| UIntV | command = ctpCmdEcho | // ctpCmdEcho = 2 |
| UIntV | contentVersion = 0 | |
| Bit | encrypted = 0 | |
| UIntV | dataSize = 5 | |
| Bit[ ... ] | padding | // 0 to 7 bits |
| Byte[5] | "Hello" | |

The response will look as follows:

| UIntV | responseSize = 5 | |
|---|---|---|
| UIntV | result = 0 | |
| Bit[..] | padding | // 0 to 7 bits of padding |
| Byte[5] | "Hello" | |

Message Generation Command

Used for testing connectivity. This command will cause the proxy server 180 to return the requested number of pre-initialized bytes of dat. The first byte in the response data will have the value 0 and all other bytes will be incremented by 1.

The entire request, including the common fields has the following structure:

| CTPReqCommon | common | // command field = ctpCmdMsgGen (3) |
|---|---|---|
| CTPMsgGenParams | params | // request params. |

Message Generation Command Structure
CTPMsgGenParams:

| UIntV | dataSize | // # of requested bytes of data. |
|---|---|---|

The dataSize parameter indicates the size of the data in bytes that will be returned by the proxy server 180.

Message Generation Command Examples

The following is a request to return 10 bytes from the proxy server 180:

| UIntV | headerVersion = 0 | |
|---|---|---|
| UIntV | command = ctpCmdMsgGen | // ctpCmdMsgGen = 3 |
| UIntV | contentVersion = 0 | |
| Bit | encrypted = 0 | |
| UIntV | dataSize = 5 | |
| Bit[ ... ] | padding | // 0 to 7 bits of padding | the response will look as follows:

| UintV | responseSize = 5 | |
|---|---|---|
| UIntV | result = 0 | |
| Bit[..] | padding | // 0 to 7 bits of padding |
| Byte[5] | 0,1,2,3,4 | |

Discard Command

Used for testing connectivity. This command will cause the proxy server 180 to return a simple response with no data.

The entire request, including the common fields has the following structure:

| CTPReqCommon | common | // command field = ctpCmdDiscard (4) |
|---|---|---|
| CTPDiscardParams | params | // request params. |

Discard Structure

| CTPDiscardParams: | | |
|---|---|---|
| UIntV | dataSize | // # of bytes of data follow |

The dataSize parameter indicates the size of the data in bytes that immediately follow the CTP request header.

Discard Examples

The following is a request to return discard 5 bytes to the proxy server 180:

| UIntV | headerVersion = 0 | |
|---|---|---|
| UIntV | command = ctpCmdDiscard | // ctpCmdDiscard = 4 |
| UIntV | contentVersion = 0 | |
| Bit | encrypted = 0 | |
| UIntV | dataSize = 5 | |
| Bit[ ... ] | padding | // 0 to 7 bits of padding |
| Byte[5] | 0,0,0,0,0 | |

The response will look as follows:

| UintV | responseSize = 0 |
|---|---|
| UIntV | result = 0 |

Hot Link Indices

Some embodiments of the invention include a method for requesting a hyperlink document. The method uses hot link indices to compress a request message sent from the wireless client 405 to the proxy server 180. The request is for access to a hyperlink document that is in a base document. The hyperlink document is indicated by a hyperlink in a base document. The method for requesting the hyperlink document comprises sending a compact representation of the hyperlink document to a proxy server 180. The compact representation of the hyperlink document comprises a base document uniform resource locator followed by a compact representation of the hyperlink and a compact representation of a hash value corresponding to the hyperlink. The representations of the hyperlink document and the hash value are in CML. In some embodiments, the compact representation of the hyperlink comprises a character sequence indication of an indirect hyperlink followed by a hyperlink index. In some embodiments the hyperlink index is one or more letters in a base 26 number system. In some embodiments, the hash value is represented by one or more letters in a base 26 number system.

Some embodiments of the invention include a method of receiving a compressed hyperlink request represented by a hyperlink tag. The hyperlink tag comprises a compact place holder for a hyperlink and the hyperlink is in a hyperlink document. The method of receiving comprises submitting a compressed representation of a URL, indicating tag representation of the hyperlink, and determining whether the hyperlink tag corresponds to a hyperlink document version used by the proxy server 180. The compressed representation of the URL comprises the hyperlink tag and a wireless client 405 hash value corresponding to the hyperlink. Tag representation of the hyperlink is indicated by placing a first character string before the hyperlink tag. The proxy server 180 determines whether the hyperlink tag corresponds to a hyperlink document version used by the proxy server 180 by comparing the wireless client 405 hash value with a proxy server 180 hash value.

A typical web document has numerous hot links that can be clicked on to bring the user to another document on the web, or to another scroll position within the same document. Each hot link, especially the ones that bring the user to another document on the web, can easily take up 100 bytes or more in the web document. For example, a link that brings a user to the Palm section of the US Robotics web server would be stored in a base HTML document as <LINK HREF="http://www.usr.com/palm">'. With some of the longer path names that are present on the web, it is easy to see how large these hot link references can become.

In order to reduce the amount of data sent over the radio, the proxy server 180 tells the wireless client 405 where the hot links should appear in the base document on the screen 101, but leave out the actual web addresses of the hot links. When the user presses a hot link, the wireless client 405 tells the proxy server 180 the index corresponding to the pressed hot link. The proxy server 180 determines which document to fetch by looking up the link information for the pressed hot link from the base HTML document. Using this hot link indices approach, the user is not able to view the URL of a hotlink before activating the hotlink.

In order for the proxy server 180 to determine which information to retrieve, the proxy server 180 knows the name of the base document as well as the hot link index. Because the proxy server 180 design is stateless, the wireless client 405 includes the base document address as well as the hot link index in the request. When the requested content is returned to the wireless client 405, the actual web address of the new content will be returned as well, allowing the wireless client 405 to follow subsequent hot links. This is an area where maximum compression of data is traded off for the increased reliability of a stateless server design. Both the requests and the responses include a document address. Document addresses are highly compressed to minimize the number of packets required to complete a transaction.

Encoding Indirect Hyperlinks

As mentioned above, documents that are sent wirelessly to the wireless communications device 100 do not include URLs for each hyperlink. Instead, the formatted documents include tags that are placeholders for each hyperlink in the document. Consequently, when the user clicks on a hyperlink, the browser 104 cannot simply ask the proxy server 180 for that hyperlinked document directly. Instead, the browser 104 tells the proxy server 180 to fetch the n'th hyperlink of the current document (the browser 104 knows the URL of the current document). For example, if the user clicks on the $4^{th}$ hyperlink in the document "www.3com.com/palm.html", the browser 104 sends a request to the proxy server 180 to return the document referenced by the $4^{th}$ hyperlink in the base URL "www.3com.com/palm.htm". In order to process this request, the proxy server 180 fetches the base document, looks up the URL of the $4^{th}$ hyperlink in that document, fetches the document corresponding to the $4^{th}$ hyperlink, and returns it to the wireless client 405.

This form of hyperlinking is called indirect hyperlinking and in one embodiment of the invention is indicated in a URL by a pound sign (#) sign followed by an asterisk (*). A pound sign followed by a section name is the Internet standard method of indicating a particular section in a document to go to. The wireless communications device 100 builds upon this metaphor by defining #* as an indirect hyperlink to go to. The text following the #* sequence indicates the index of the indirect hyperlink to follow.

As an example, the following URL tells the proxy server 180 to return the document referenced in the $1^{st}$ hyperlink of the document www.3com.com/palm.htm.

http://www.3com.com/palm.htm#*a

The '#*' sequence indicates an indirect hyperlink and the 'a' following it indicates the hyperlink index. The hyperlink indices are represented by one or more lower case letters using a base 26 number system. The first hyperlink is represented by the letter 'a', the second by the letter 'b', the $27^{th}$ by the sequence 'ba', the $28^{th}$ by the sequence 'bb', etc.

The character '*' is not normally considered an unsafe or reserved character in URLs. But, because of its special significance in the browser 104 and proxy server 180, it is escaped (using the sequence %2a) if being sent as a normal text character in a path name, variable name, or any other portion of a URL.

Forms Processing

There will be a new class of form designed for the wireless communications device 100 called a server dependent form. Server dependent forms are much smaller than standard forms because information is generally not included in the form that can be provided by the proxy server 180. When forms are sent wirelessly to the wireless communications device 100, the forms will normally be sent as server dependent forms in order to save wireless network bandwidth. The compact markup language and compact transfer protocol techniques are also applied to forms that are not server dependent forms. But, the number of packets to transmit these forms would be substantially greater than for a server dependent form.

A server dependent form contains a list of input fields for the form and corresponding field types (radio button, checkbox, etc.). The server dependent form does not contain the field names or selection values for each field in the form. With the field type information, the wireless client 405 is able collect the necessary input values from the user for each field in the form. The wireless client 405 does not have all the information required for actually submitting the form request to a CGI script. The proxy server 180 comes in combines the input information obtained from the wireless client 405 along with information from the original HTML form (which has all the field names and selection values) in order to format the request according to the CGI script.

When the wireless client 405 needs to submit a server dependent form, the wireless client 405 transmits only the index of each field in the form and its user input value (true/false for checkboxes and radio buttons, typed in text for input items) to the proxy server 180. The proxy server 180 looks up the actual field names and values from original HTML form, formats a standard form submittal request from that information, sends the request to the CGI script on the web server, and forwards the appropriately formatted response back to the wireless client 405.

The server dependent form submittal process requires that the original HTML form be available to the proxy server 180 when the form is submitted. For forms that were recently sent down to the wireless client 405 wirelessly, this is not a serious restriction since the form has been obtained from the Internet in the first place. The form availability to the proxy server 180 restriction could be a problem however for forms that are pre-loaded into the wireless communications device 100 ROM or installed using HotSync. Therefore, forms designed to be pre-loaded into the wireless communications device 100 are built as standard forms and contain all of the field names and selection values in them. Since they will generally be loaded onto the wireless communications device 100 using non-wireless means, the bigger size of these forms is acceptable.

Encoding Normal Form Submissions

Some embodiments of the invention include a method for transmitting a first message in packets of data to the proxy server 180. The first message corresponds to a hypertext document and can be a request message submitted from the wireless client 405 to the proxy server 180. The hypertext document has fields. The method for transmitting the message comprises submitting compressed representations of data corresponding to the fields to wireless client 405 processing resources, and transmitting the compressed representations in packets of data from the wireless client 405 to the proxy server 180. The compressed representations are formatted according to a compact transport protocol. In some embodiments, the fields comprise input fields, control fields, and select fields. The control fields comprise radio buttons and check boxes. The input fields use text input. The radio buttons and check boxes use toggle on indications of activation by the sending wireless client 405. Select fields use toggle on indications of selection by the sending wireless client 405. The compressed representations comprise CTP representations of text and name attributes corresponding to input fields and CTP representations of values and value attributes corresponding to control fields and select fields. The CTP representations are temporary formats representing data for transfer between wireless client 405 processing resources and proxy server 180 processing resources.

Normal forms on the wireless communications device 100 have nearly as much information as standard HTML forms, including name and value attributes for each of the fields, but are still encoded using CML and hence are much more compact than their HTML equivalents. Normal forms are larger than server dependent forms and are usually only loaded onto the wireless communications device 100 using HotSync or other wireline means, or are built into the ROM itself.

In one embodiment, a normal form in CML format is indicated through a "1" in the standalone attribute bit of the form tag. A "1" in the standalone field indicates the presence of two more attributes in the form: a post attribute and an action attribute. The post attribute is "1" for forms that are submitted using the HTTP POST method and 0 for forms that are submitted through an HTTP GET method. The action attribute is the URL of the CGI-script on the web server that processes the form input.

```
Tag     tag = tagForm
UIntV   formIndex = 0
Bit     standalone = 1
Bit     post = 0        // if 1, use POST instead of GET
Text    action = "http://www.server.com/cgi-bin/submit"
```

In addition, all the input fields that are enclosed within a normal form have a name attribute and all control (radio, checkbox, select, etc.) fields also have value attributes assigned to them as well. For example, the form used in the previous section would appear as follows if it were in normal CML form format:

```
Tag     tag = tagForm
UIntV   formIndex = 0
Bit     standalone = 1
Bit     post = 0        // if 1, use POST instead of GET
Text    action = "http://www.server.com/cgi-bin/submit"
Text    "Name:"
Tag     tag = tagInputTextLine
UIntV   size = 0
UIntV   maxLength = 0
Bit     hasName = 1
Bit     hasValue = 0
Text    name = "name"
Text    "Sex:"
Tag     tag = tagInputRadio
Bit     checked = false
UIntV   group = 0
Bit     hasName = 1
Bit     hasValue = 1
Text    name = "sex"
Text    value = "m"
Text    "Male"
Tag     tag = tagInputRadio
Bit     checked = false
UIntV   group = 0
Bit     hasName = 1
Bit     hasValue = 1
Text    name = "sex"
Text    value = "f"
Text    "Female"
Tag     tag = tagInputSubmit
Bit     hasName = 1
Bit     hasValue = 1
Text    name = "ship"
Text    value = "overnite"
Tag     tag = tagInputSubmit
Bit     hasName = 1
Bit     hasValue = 1
Text    name = "ship"
Text    value = "1 week"
Char    endForm = endTag
```

The URL for submitting a normal CML form is identical to that used for submitting an HTML form. For this example, it would be:

http://www.server.com/cgi-bin/
submit?name=deb&sex=f&ship=1week

Note that the field names and values are sent as-is in the URL. Thus, any forms designed to be installed onto the wireless communications device 100 as normal forms, should be written such that the field names and values are as short as possible and defined with lower case letters (which can be encoded with just 5 bits each) in order to conserve as much network bandwidth as possible when the form is submitted.

If the form was designed for POST submission, then the wireless client 405 sets the post bit in the CTP request structure, set the dataSize field appropriately, and include the form submission data in the data portion of the CTP request.

Encoding Server Dependent Form Submissions

In some embodiments, the hypertext document comprises a server dependent form. An index is used to identify which server dependent form is used by the wireless client 405. The server dependent form can include field input types and initial default values for the input fields. The server dependent form is selected from a plurality of server dependent forms. Input field types comprise input fields, select fields, and control fields. Compressed text representations are provided by the wireless client 405 for input fields. Compressed text representations are also provided by the wireless client 405 for control fields that have values different than the corresponding server form default value, and select fields that have been selected. Control fields that have the corresponding server dependent form default values are omitted from the first message sent to the proxy server 180. Select fields that have not been selected are also omitted from the first message.

Server dependent forms are basically forms that are missing field names and selection values in order to make them as small as possible. The only information present in a server dependent form is the field input types (radio button, checkbox, etc.) and the initial default values.

When a server dependent form is submitted by the wireless client 405, the client sends the inputted values of each field up to the proxy server 180 along with the field index. It is then up to the proxy server 180 to fetch the original HTML form from the Internet, lookup the actual field names and selection values for each of the fields in the form, and send a standard form submittal to the CGI script on the server.

When the wireless client 405 submits a server dependent form, a '*' is placed in the URL immediately after the '?' character (which is used to indicate the start of the field parameters in the URL). This extends the metaphor first introduced for indirect hyperlinks by using the "character to represent indirect form submissions as well. An example will help explain the syntax.

Normally, form submissions are accomplished through URLs such as:

http://www.server.com/cgi-bin/submit?name=deb&sex=f&ship=1week

This URL sends the form parameter info "name=deb&sex=f&ship=1week" to the CGI script called "submit" which is in the CGI-bin directory of the server www.server.com. The form parameter information indicates that the name field was filled in with the text "deb" and the radio button with a name attribute of "sex" and a value attribute of "f" was selected and that the submit button with a value of "1 week" was pressed. An HTML representation of a form called "http://www.server.com/forms/myform.html") is:

```
<form method=GET action=http://www.server.com/CGI-bin/submit>
Name: <input type=text name=name>
<p>
Sex: <input type=radio name=sex value="m"> Male
<input type=radio name=sex value="f"> Female
<p>
<input type=submit value="overnite" name="ship">
<input type=submit value="1week" name="ship">
</form>
```

Translating the form into a CML server dependent form would result in the following format:

| | |
|---|---|
| Tag | tag = tagForm |
| UIntV | formIndex = 0 |
| Bit | standalone = 0 |
| Text | "Name:" |
| Tag | tag = tagInputTextLine |
| UIntV | size = 0 |
| UIntV | maxLength = 0 |
| Bit | hasName = 0 |
| Bit | hasValue = 0 |
| Text | "Sex:" |
| Tag | tag = tagInput Radio |
| Bit | checked = false |

-continued

| | |
|---|---|
| UIntV | group = 0 |
| Bit | hasName = 0 |
| Bit | hasValue = 0 |
| Text | "Male" |
| Tag | tag = tagInputRadio |
| Bit | checked = false |
| UIntV | group = 0 |
| Bit | hasName = 0 |
| Bit | hasValue = 0 |
| Text | "Female" |
| Tag | tag = tagInputSubmit |
| Bit | hasName = 0 |
| Bit | hasValue = 0 |
| Tag | tag = tagInputSubmit |
| Bit | hasName = 0 |
| Bit | hasValue = 0 |
| Char | endForm = endTag |

In the server dependent CML form, there is no URL for the web server and CGI script (the action attribute of the HTML <form> tag). Also, there are no field name attributes (like "name" or "sex"), nor are there any value attributes for the radio buttons (like "m" or "f") in the server dependent form. The only information the wireless client 405 has about the form is its field input types and their relative order in the form. The standalone attribute of the form tag is set to 0 to indicate that this is a server dependent form. In order to submit this form, the wireless client 405 sends the following URL to the proxy server 180:

http://www.server.com/forms/myform.html?a/a=deb/c/e

Notice that http://www.server.com/forms/myform.html is the name of the form itself that is being submitted (not the CGI-script that processes it). In the parameter list, the first "a" is the form index (obtained from the formIndex attribute of the tagForm tag) the next "a" is the index of the first field in the form (using the base 26 number system introduced above in the Encoding Indirect Hyperlinks section). The next item in the list is the inputted value corresponding to the first field, "deb". The "c" is the index of the third field in the form and because the third field is a simple radio control, it does not have an associated value. The "e" is the index of the submit button that was pressed (e.g., the button with the value of "1 week"). The submit button index is included even if the form only has 1 submit button. Also, between each of the field entries in the parameter list is a '/' character.

In general, the rules for creating a server dependent form submittal are:

1) The base URL is the URL of the document that contains the form itself.

2) An asterisk (*) immediately follows the '?'.

3) Immediately after the "?*" is the base 26 form index.

4) The fields are represented by sequences of:

<fieldIndex>[=<fieldValue>] where fieldIndex is the base 26 index of the field and fieldValue is only included for text line or text area fields. The only characters that need to be escaped in a fieldValue are the following: /=%.

5) The field entries are separated from each other and the form index by a '/' character.

6) Only checked radio buttons, checkboxes, and select options are included in the parameter list. Thus, the simple presence of a field index for a radio button or checkbox indicates that it is checked. Radio buttons, checkboxes, or select options which are not checked by the user are left out altogether.

7) The <select> element is treated conceptually as a set of checkboxes —each <option> in the select element gets its own field index. For example, in a form that had a single radio button followed by a 3 item select element, the three items in the select element would be identified by the field indices 'b', 'c', and 'd'. The next field in the form after the select element would have the index 'e'.

8) The index of the submit button that was pressed to submit the form is included even if there is only 1 submit button in the form.

9) Any '/' or '*' character which appears in an input text line or text area field is escaped using the sequence %2f or %2a respectively.

Secure Communications

Security support for the wireless communication system is implemented at the transfer layer. Implementing security at the transfer layer provides encryption of the actual request parameters, i.e., the requested uniform resource locator (URL), thereby hiding the request parameters from prying eyes. The common request header field corresponding to the transfer layer is a convenient place to include security parameters. By implementing security at the transfer layer, the lower level reliable message layer 635 is not burdened with being security "aware".

When an encrypted request is sent to the proxy server 180, the encrypted bit is set in the common fields of the request header and is immediately followed by an encryption scheme field and encryption scheme specific parameters. In some embodiments, everything in the request message after the encryption scheme parameters is encrypted, including the actual request parameters. The following is an example of an encrypted request according to one embodiment of the invention:

```
// Common Header
UIntV     headerVersion = 0
UIntV     command = ctpReqURL    // ctpReqURL = 0
UIntV     contentVersion = 0
Bit            encrypted = 1
UIntV     encryptionScheme = 0    // scheme number 0
// Encryption parameters
UInt32    dateTime                // current date and time in seconds
UInt32    serverID                // server's ID
UIntV     serverPublicKeyID       // server's public key identifier.
UInt8     encDEK[16]              // public key encrypted DEK
UInt8     encMIC[16]              // DEK encrypted message integrity
                                  // check
// Encrypted request
UInt8     encCTPReqParams [ ]     // DEK encoded CTPReqParams
```

The primary encryption scheme is indicated by a scheme ID of 0 in the encryptionScheme field of the request header. Other schemes also have corresponding unique encryption scheme ID numbers.

Security Requirements

The security provided for sensitive wireless communications satisfies a number of requirements in order to gain trust for use in consumer commerce (i.e., transmitting credit card information) and private corporate communications (i.e., sending confidential sales forecasts, product plans, etc.).

The wireless communications system provides a level of security equal to, and in some circumstances better than, that provided by the Secure Sockets Layer (SSL) protocol widely used by Internet 190 browsers and servers. The SSL protocol is the most common security protocol used by web browsers and servers, and is generally believed to provide a satisfactory level of protection for confidential information and transactions. Rather than providing the specific encryption algorithms to use, SSL defines a protocol that is used to negotiate the encryption algorithms. The SSL protocol supports a number of different encryption algorithms of varying strengths. Nonetheless, most SSL implementations have settled on one of two different algorithms commonly known as 128-bit (for domestic use) and 40-bit (for export).

Unfortunately, SSL is a very chatty protocol that requires multiple messages per request. Therefore, SSL is not well adapted for networks characterized by very high latency and low bandwidth, such as the wireless packet data network. The wireless client 405 will instead uses its own secure communications protocol. However, the wireless client 405 security protocol uses encryption algorithms that are equivalent in strength to those used by "128-bit" SSL implementations.

An ideal secure protocol has the following properties:

1) Confidentiality: An eavesdropper must be unable to interpret the data sent between two private parties.
2) Authentication: The receiver of a message must be able to ascertain the origin of the message. An intruder should not be able to masquerade as someone else.
3) Integrity: The receiver of a message must be able to verify that the message has not been modified in transit. An intruder should not be able to substitute a false message for a legitimate one.
4) Nonrepudiation: A sender should not be able to falsely deny later that he sent a message.

The wireless communications system provides full confidentiality, proxy server 180 authentication, and integrity. However, the wireless communications system provides neither wireless client 405 authentication, nor nonrepudiation. Some level of wireless client 405 authentication and nonrepudiation is provided by the application layer. When the wireless client 405 is forced to enter a password when submitting a form using a browser 104, a reasonable measure of wireless client 405 authentication is provided. Because, the wireless client 405 password should be private, the wireless client 405 can not claim that someone else other than the wireless client 405 sent the message.

Security Protocol

The security protocol used in the wireless client 405 is optimized for use over wireless networks. As such, the security protocol is designed to minimize the number of transactions, or messages, sent between the wireless client 405 and proxy server 180. The number of messages is minimized to avoid exacerbating the latency problem inherent in wireless packet data networks. Latency is generally the most critical wireless packet data network performance bottleneck. One security scheme implemented on the wireless client 405 (scheme #0) can perform a secure transaction with just a single request message sent from the wireless client 405 to the proxy server 180; and a single response message returned from the proxy server 180 to the wireless client 405. Each message comprises at least one packet of data. The messages provide the basis of a transaction where the transaction comprises response messages and request messages exchanged between a wireless client 405 and a proxy server 180. Because of the extra parameters required for encrypted data, it is less likely that secure messages will fit in a single packet, but sending multiple packet messages has less of an impact on performance than performing multiple transactions (or sending multiple messages in either direction).

The following is a step by step description of a secure transaction between the wireless client 405 and the proxy server 180. Each secure transaction (i.e. submitting a form, and getting a response) follows these steps, including generating a new random data encryption key.

1. The wireless client 405 generates a new 128 bit data encryption key (DEK) using the following algorithm:

DEK=MD5(SHA (penStrokeQueue+hardwareTimer-
   Register+tickCount+timeInSeconds+
   lowMemoryChecksum))

MD5 is the MD5 message digest function that accepts an arbitrary length string of bytes and outputs a 128-bit hash of the input. The secure hash algorithm (SHA) accepts an arbitrary length string of bytes and outputs a 160-bit hash of the input. The '+' signs in the above equation represent concatenation, not addition. A random number generator uses input from a pen stroke queue. The pen stroke queue depends on user interaction with the pen in order to be as completely unpredictable as possible when generating the DEK. Both the MD5 and SHA functions are used in order to minimize the impact of a weakness in either one of these hash functions.

2. The wireless client 405 encrypts the DEK using the stored public key of the proxy server 180 $[E_{SPUB}(DEK)]$.

$encDEK=E_{SPUB}(DEK)$

By encrypting the DEK using the public key of the proxy server 180, the wireless client 405 insures that only the proxy server 180 (using its private key) will be able to recover the DEK. The DEK is randomly generated (see step number one above) because public/private key encryption algorithms are particularly susceptible to known-plain text attacks and hence should only be used to encrypt random data. Examples of public/private key algorithms that can be used for the communications system encryption scheme include ElGamal and Elliptic Curves.

3. The wireless client 405 forms a 128 bit message integrity check (MIC) using the following algorithm:

MIC=MD5 (SHA (ctpReqParams+
   dateTime+serverID))

The ctpReqParams is the CTP request parameters block that would normally follow the CTP common request header fields in an unencrypted request (as described above in the CTP Requests and CTP Commands sections). The dateTime is the current time (32-bit value) on the wireless client 405 measured in seconds since a given reference time (such as 12:00 am on Jan. 1, 1997) and matches the dateTime field included in the encryption parameters area of the request. Both the wireless client 405 and the proxy server 180 know the reference time. The serverID is the proxy server 32-bit network address. The serverID comprises a byte of zeroes followed by a 24-bit unique proxy server 180 account number when using the wireless packet data network, or a 32-bit IP address when using the Internet 190. In either case, the serverID used to create the MIC must match the serverID field included in the encryption parameters area of the request.

Including all three of these elements in the MIC insures that an imposter will be unable to modify any part of the request, timeOfDay, or serverID without invalidating the MIC. The proxy server 180 uses the timeOfDay and serverID fields to detect and ignore replay attacks (i.e., where an attacker sends a copy of a request that was generated earlier by a valid wireless client 405).

4. The wireless client 405 encrypts the MIC via a symmetric encryption algorithm, such as triple-DES, using the DEK generated in step number 1.

$encMIC=E_{DEK}(MIC)$

5. The wireless client 405 encrypts the CTP request parameters via a symmetric encryption algorithm using the DEK generated in step number one.

$encCTPReqParams=E_{DEK}(ctpReqParams)$

6. The wireless client 405 sends entire request, including encryption parameters, timeOfDay, serverID, encrypted DEK, encrypted MIC, and encrypted CTP request parameters to the proxy server 180. In some embodiments, the dateTime encryption parameter is replaced by a sequence identification number corresponding to a specific encrypted message sent by the wireless client 405. Subsequent messages from the wireless client 405 have sequence identification numbers assigned by the wireless client 405 according to a predetermined pattern.

```
// Common Header
UIntV    headerVersion
UIntV    command
UIntV    contentVersion
Bit              encrypted = 1
UIntV    encryptionScheme = 0       // scheme number 0
// Encryption parameters
UInt32   dateTime                   // current date and time in seconds
UInt32   serverID                   // server's ID
UIntV    serverPublicKeyID          // server's public key identifier.
UInt8    encDEK[16]                 // public key encrypted DEK
UInt8    encMIC[16]                 // DEK encrypted message integrity
                                    // check
// Encrypted request
UInt8    encCTPReqParams[ ]         // DEK encoded CTPReqParams
```

7. The proxy server 180 checks message validity. If serverID does not match the ID of the proxy server 180, the request is thrown out. If the dateTime is more than 24 hours away from the current date and time, the request is thrown away. If the dateTime is less than or equal to the last encrypted request received from this wireless client 405, the request is thrown out and the event is logged as an attempted security breach. The dateTime checks insure against a replay attack to the same proxy server 180, allowing a 24 hour slack for differences in time zones. The serverID check insures that a request sent to one proxy server 180 can not be copied and replayed back to another proxy server 180. If the request is invalid, an error response is returned to the wireless client 405 explaining the reason for the rejection. In some embodiments the proxy server 180 retains the message sequence identification number for the most recent successful transaction from the wireless client 405. In these embodiments, the sequence identification number of an incoming message is compared to the message sequence identification number for the most recent successful transaction. If the sequence identification number of the incoming message matches the predetermined pattern relative to the message sequence identification number for the most recent successful transaction, then the proxy server 180 processes the incoming message. If not, the proxy server 180 throws away the incoming message.

A request can also be rejected if the public key for the proxy server 180 (identified by the serverPublicKeyID field) is no longer valid. The proxy server 180 administrator may choose to no longer recognize a public key if the corresponding private key has been compromised. In this case, the proxy server 180 will throw out the request and send back an error response message to the wireless client 405 containing a new public key and key ID. When this happens (very rarely, if ever) a dialog will appear on the wireless client 405 screen 101 asking if the wireless client 405 wants to accept the new public key. If the user accepts the new public key, the original request must be re-submitted using the new public key. The response that the proxy server 180 returns when the server private key has been changes has the following structure:

| | |
|---|---|
| UIntV | responseSize |
| UIntV | result = invalidPublicKey |
| UInt8 | encPublicKeyInfo[ ] | where encPublicKeyInfo is the following structure encrypted using the DEK from the request message:

| | |
|---|---|
| UInt8 | newPublicKeyMIC[16] |
| UInt32 | serverPublicKeyID |
| UInt8 | serverPublicKey[...] | and newPublicKeyMIC is the following:

newPublicKeyMIC=MD5 (SHA(serverPublicKeyID+ serverPublicKey))

8. The proxy server 180 recovers the DEK by running encDEK through the public/private key decryption algorithm using the proxy server 180 stored private key.
9. The proxy server 180 recovers the MIC by running encMIC through the symmetric decryption algorithm using the DEK as the key.
10. The proxy server 180 recovers ctpReqParams by running encCTPReqParams through the symmetric decryption algorithm using the DEK as the key.
11. The proxy server 180 computes the MIC from ctpReqParams, dateTime, and serverID using same algorithm the wireless client 405 used in step number 3 and compares the computed MIC to the MIC recovered in step number 9. If the two MICs do not match, the request is thrown away, an error response is returned to the wireless client 405, and the event is logged as an attempted security breach.
12. The proxy server 180 processes the request and forms an unencrypted response, ctpRspData.
13. The proxy server 180 computes the MIC for the response and encrypts the response MIC and the response data using the symmetric encryption algorithm with the DEK supplied by the wireless client 405. By using the same DEK to encrypt the response message and the request message, the secure communications methods uses symmetric encryption.

| |
|---|
| MICrsp = MD5 (SHA (ctpRspData)) |
| encMICrsp = $E_{DEK}$ (MICrsp) |
| encCTPRspData = $E_{DEK}$ (ctpRspData) |

14. The proxy server 180 sends the response back to wireless client 405:

| | |
|---|---|
| UIntV | responseSize |
| UIntV | result |
| UInt8 | encMICrsp[16] |
| UInt8 | encCTPRspData[...] |

15. The wireless client 405 receives the encrypted response, decodes the MIC and CTPRspData using the saved DEK for this transaction, and verifies the MIC.

Some embodiments of the invention comprise a method for securely transmitting a message from a wireless client 405. The method for securely transmitting comprises encrypting a data encryption key, encrypting the message using the data encryption key, and transmitting the encrypted message to the proxy server 180. The wireless client encrypts the data encryption key using a proxy server 180 public key to form the encrypted data encryption key. The data encryption key corresponds to a specific transaction between the wireless client 405 and the proxy server 180. The wireless client encrypts the message using the data encryption key to form an encrypted message. The wireless client 405 transmits the encrypted message to the proxy server. The encrypted message comprises at least one packet of data. In some embodiments, each packet of data is formatted according to a compact transfer protocol.

In some embodiments, prior to encrypting the data encryption key, the method further comprises the step of generating the data encryption key. The data encryption key is generated by the wireless client 405 for a specific transaction between the wireless client 405 and the proxy server 180. Generating the data encryption key comprises applying a secure hash to a first input to form a first multibit hash, and applying a message digest function to the first multibit hash to form the data encryption key. The first input comprises a concatenation of an output from a random number generator and at least one other character string.

In some embodiments, the message comprises a request message corresponding to a hypertext document. The encrypted request message further comprises encrypted request parameters, an encrypted bit, an encryption scheme identifier, a proxy server public key identifier, a proxy server identifier, a wireless client generated indication of current date and time, an encrypted request message integrity check, and the encrypted data encryption key. The encrypted request parameters are created from request parameters using the data encryption key. The request parameters comprise compressed representations of data corresponding to fields in the hypertext document. The compressed representations are formatted according to a compact transfer protocol. The encrypted request message integrity check is encrypted using the data encryption key.

In some embodiments the method for securely transmitting the message from the wireless client further comprises validating the encrypted request message after transmitting the encrypted request message. Validating comprises comparing the wireless client generated indication of current date and time with a proxy server indication of current date and time. If the difference in these times is greater than a predetermined value (such as twenty-four hours), the proxy server 180 throws away the encrypted request message. If the difference in these times is smaller than the predetermined value, the proxy server 180 processes the encrypted request message and forms a response message.

In some embodiments, the proxy server 180 retains wireless client 405 generated indications of current date and time corresponding to each encrypted message received by the proxy server from the wireless client 405 prior to the wireless client 405 transmitting the encrypted request for a predetermined time. The method for securely transmitting the message from the wireless client 405 further comprises validating the encrypted single request message after transmitting the encrypted request message. Validating the encrypted request message comprises determining whether the wireless client 405 generated indication of current date and time submitted with the encrypted request message is less than or equal to any of the retained wireless client generated indications of current date and time. If the wireless client generated indication of current date and time submitted with the encrypted request message is less than or equal to any of the retained wireless client generated indications of current date and time, the proxy server throws away the encrypted request message. If the wireless client 405 generated indication of current date and time for the request message is greater than all of the retained wireless client 405 generated indications of current data and time, the proxy server 180 processes the encrypted request message and forms a response message.

In some embodiments, the specific transaction comprises a single request message and each packet of data is less than one kilobyte.

Some embodiments of the invention comprise a method for securely transmitting a message from a proxy server 180 to a wireless client 405. The method for securely transmitting comprises the following steps. The wireless client 405 encrypting a data encryption key using a proxy server public key to form an encrypted data encryption key. The proxy server receiving the encrypted data encryption key. The proxy server recovering the data encryption key. The proxy server encrypting the message using the data encryption key. The proxy server transmits the encrypted message to the wireless client. The data encryption key corresponds to a specific transaction between the proxy server and the wireless client. The proxy server recovers the data encryption key by decrypting the encrypted data encryption key using the proxy server private key. The proxy server encrypts the message using the data encryption key to form an encrypted message. The encrypted message comprises at least one packet of data. In some embodiments, the message comprises compressed data in a compact markup language. In some embodiments, the specific transaction comprises a single response message, and each packet of data is less than one kilobyte.

In some embodiments the method for securely transmitting a message from the proxy server 180 further comprises the following steps prior to recovering the data encryption key. The proxy server 180 receives an encrypted request message comprising encrypted request parameters, a wireless client 405 generated indication of current data and time, and a proxy server 180 identifier. The proxy server 180 receives an encrypted wireless client 405 generated request message integrity check. The encrypted request parameters are formed by encrypting request parameters using the data encryption key. The encrypted request message integrity check is formed by encrypting a wireless client generated request message integrity check using the data encryption key. The client generated request message integrity check is formed from a concatenation of the request message parameters, the wireless client generated indication of current data and time, and the proxy server identifier.

In some embodiments, the message transmitted from the proxy server 180 to the wireless client 405 comprises a response message. The method for securely transmitting a message from the proxy server further comprises the following steps before the transmitting step. The proxy server computing a response message integrity check. The proxy server encrypting the response message integrity check using the data encryption key to form an encrypted response message integrity check. The encrypted response message further comprises the encrypted response message integrity check.

Some embodiments of the invention comprise a system for secure communications. The system for secure communications comprises a source of data, a wireless client 405, and a proxy server 180. The source of data comprises means for transmitting HTML messages to the proxy server 180. The wireless client 405 comprises means for exchanging encrypted messages with the proxy server 180. The encrypted messages comprise encrypted request messages and encrypted response messages. Each encrypted message comprises at least one packet of data. Each encrypted request message comprises encrypted request parameters and an encrypted data encryption key. The request parameters corresponding to fields in a hypertext document. The HTML messages corresponding to the encrypted request messages. The proxy server 180 is in communication with the wireless client 405 and the source of data. The proxy server 180 comprises means for exchanging encrypted messages with the wireless client, means for fetching HTML messages from the source of data, and means for recovering the data encryption key.

Strength and Possible Attacks

The strength of the wireless communications system security is roughly equivalent to that provided by 128-bit versions of SSL. However, there are possible attacks and this section provides an overview of the possible attacks and counter measures employed to prevent them.

Attackers can be broadly classified into one of two categories: passive and active. Passive attackers are eavesdroppers who can listen in on a conversation and glean useful information from either one of the parties but otherwise do not take an active part in the conversation. Active attackers can actually take part in the conversation by impersonating one of the parties by modifying messages sent between the two parties, or by interjecting extra messages into the conversation.

Wireless networks are considered particularly susceptible to passive attacks because all that is required is a radio receiver, and there is nearly zero-chance of being detected. Active attacks on the other hand are easier to detect since most wireless networks have mechanisms for detecting and shutting down invalid transmitters (through Electronic Serial Numbers).

Passive Attacks

The wireless communication system resistance to passive attack is provided through a combination of encryption algorithms. The wireless communication system uses two encryption techniques: public key (public/private) and symmetric. Public key encryption is used to send a symmetric encryption key from the wireless client 405 to proxy server 180 and symmetric encryption is used to encrypt the actual message data. This combined approach leverages the strengths of the two encryption techniques while providing maximum security.

Public key encryption has the unique quality that data encrypted with the public key can only be decrypted with the private key. This is ideal for wireless communications system because the proxy server 180 private key can remain secret on the proxy server 180 and each wireless client 405 only needs the proxy server 180 public key. Therefore, any of the wireless clients 405 can encrypt data for transmittal to the proxy server 180. No one (including the sender) other than the proxy server 180 can decrypt the data once the data has been encrypted.

On the other hand, public key algorithms are much (i.e., orders of magnitude) slower than symmetric algorithms and are particularly susceptible to chosen plaintext attacks. The chosen plaintext attacks are conducted by a malicious party who selects chosen data to be encrypted with the private key. The malicious party is then able to deduce the private key from the resulting cyphertext.

In order to work around the slower performance and weakness to chosen plaintext attacks of public key encryption, the message data is encrypted using a symmetric algorithm and the slower public key algorithm is only used to encrypt the symmetric key. The symmetric data encryption key (DEK) is randomly generated so that chosen plaintext attacks can not be mounted.

Active Attacks

The wireless communication systems resistance to active attack is provided by inclusion of the message integrity check (MIC), dateTime stamp, and proxy server 180 ID fields. The combination of these elements insures that an active attacker will not be able to modify, or replay a message without being detected. If any portion of the message data is modified, the MIC will be invalid. Furthermore, because the MIC is encrypted, the MIC can not be re-generated by an active attacker without knowledge of the DEK or the proxy server (180) private key.

Resistance to replay attacks is provided by inclusion of the dateTime and serverID stamps. The proxy server 180 keeps a record of the last dateTime stamp received from each wireless client 405 within the last 24 hours. If a duplicate dateTime stamp is detected by the proxy server 180, the proxy server rejects the request by the attacker. The proxy server 180 also performs a bounds check on the dateTime stamp and rejects the request if the dateTime stamp is off by more than 24 hours in either direction. Thereby, the proxy server 180 can safely dispose wireless client 405 dateTime stamps once the dateTime stamps become more than 24 hours old. The serverID stamp is included to foil replay attacks to a different proxy server 180. If an attacker tries to replay a request sent to proxy server A by sending it to proxy server B, proxy server B will reject the request since the serverID will not match.

Another possible attack is for someone to impersonate the base station 170 and proxy server 180. The attacking rogue server would attempt to force the wireless client 405 to accept a new public key as part of the public key rejection mechanism outlined above in step number 7 above. In order for this attack to be successful, however, the rogue server must know the private key of the real proxy server 180. Furthermore, the rogue server must be able to receive and transmit messages using the unique identification number of the real proxy server 180. Thus, although an attack premised on impersonation of a base station 170 and a proxy server is possible, such an attack would be very difficult to mount. To further reduce the risk of this attack, the wireless client 405 software asks user permission through a dialog before accepting a new public key from the proxy server 180. Users are forewarned, through means other than the wireless network (e.g., wireline e-mail, or hard copy delivery) when a proxy server 180 public key is changed so that "legal" changes to the proxy server 180 public key do not come as a surprise to a user. Because the user knows of any legal change to the proxy server 180 public key before the change is made, base station 170 and proxy server 180 impersonation attacks can be defeated by user denial of permission to use new public keys that are not accompanied by appropriate user notification.

Encryption Algorithms

Algorithms that provide adequate protection using the wireless communications system encryption scheme include ElGamal or Elliptic Curve for the public key algorithm, and 3-way or Triple-DES for the symmetric algorithm. These algorithms are attractive because they provide high levels of security.

Administration

To ensure that the wireless communications system security is effective, the proxy server(s) 180 are located in a secure site. Because the proxy server 180 decrypts data before using SSL to transfer it to the content server, the unencrypted content reside in the proxy server 180 memory for short periods of time.

Furthermore, knowledge of the proxy server 180 private key would enable eavesdroppers to listen in on conversations between wireless clients 405 and the proxy server 180 and undermine the entire security scheme. Thus, the proxy server 180 private key is kept under complete confidence. To maintain the secrecy of the private key, the unencrypted private key never appears on paper or in electronic form, but rather is encrypted using a sufficiently long pass phrase that must be entered by a proxy server 180 administrator at run-time.

Indicating Subsequent Action Characteristics

Method for Indicating Subsequent Action Characteristics

A detailed description of a method for indicating subsequent action characteristics is described with reference to FIGS. 15 through 18. The method for indicating subsequent action characteristics 1500 is implemented in a communications device 100 having processing resources. The subsequent action includes data communications performed by the communications device 100.

The first step of the method includes the communications device 100 processing resources providing sensory cues 1510 to the user. The sensory cues correspond to sets of subsequent action characteristics. The sensory cues are adapted for perception by the user. The sensory cues can be visual, auditory, by touch, by smell, by taste, or by any other user perceptible sensation that can be stimulated by the communications device 100, or peripheral equipment connected thereto. For some embodiments, the informing step includes the user perceiving the sensory cue. Examples of sensory cues include a first wireless link icon 120 as shown in FIG. 1, a second wireless icon shown in FIGS. 16 and 17 as reference number 1610, and a secure link icon, shown in FIG. 17 as reference number 1710. The first wireless link icon 120 and the second wireless link icon 1610 represent two different images that can be used to convey the same set of characteristics to the user. Preferably, only one of the two wireless link icons would be used for any particular communications device 100.

The subsequent action characteristics can correspond to any feature, or set of features, of the subsequent action data communications including features of the communication path used for exchanging the data. Knowledge of the features enables the user to determine whether to initiate the subsequent action. Subsequent action characteristics can relate to the mode of transmission, the network type, data communication security measures, the maximum message size, associated cost, or the speed of the network.

Data can be transmitted wirelessly, using a wireline connection, or within the communications device. The network can be circuit switching, Ethernet, token ring, packet switching, asynchronous transfer mode, or any other network that supports data communications. Security measure attributes can describe the type of encryption, or inform the user whether or not a firewall will be encountered. The maximum message size is especially important for low bandwidth communication systems. A subsequent action cost indication can reveal whether or not any cost is incurred, or can indicate different levels of cost, such as less than $1.00, less than $10.00, or more than $10.00. The speed of the network provides a basis for the user to set reasonable expectation regarding how quickly a particular subsequent action will be completed, and is especially helpful for avoiding networks that are operating at close to their bandwidth capacity.

Subsequent action characteristics are especially useful when they accurately set user expectations regarding the expense, security, wait time, or maximum message size for the subsequent action because such information enables the user to make an informed decision regarding whether to initiate the subsequent action. If the user is not familiar with the set of characteristics corresponding to the sensory cue, the user can avoid cost, wait time and maximum message size surprises by determining the set of characteristics corresponding to the sensory cue before initiating the subsequent action associated with the sensory cue.

The second step of the method includes each sensory cue informing 1520 the user of the corresponding set of the subsequent action characteristics.

Figure 17:
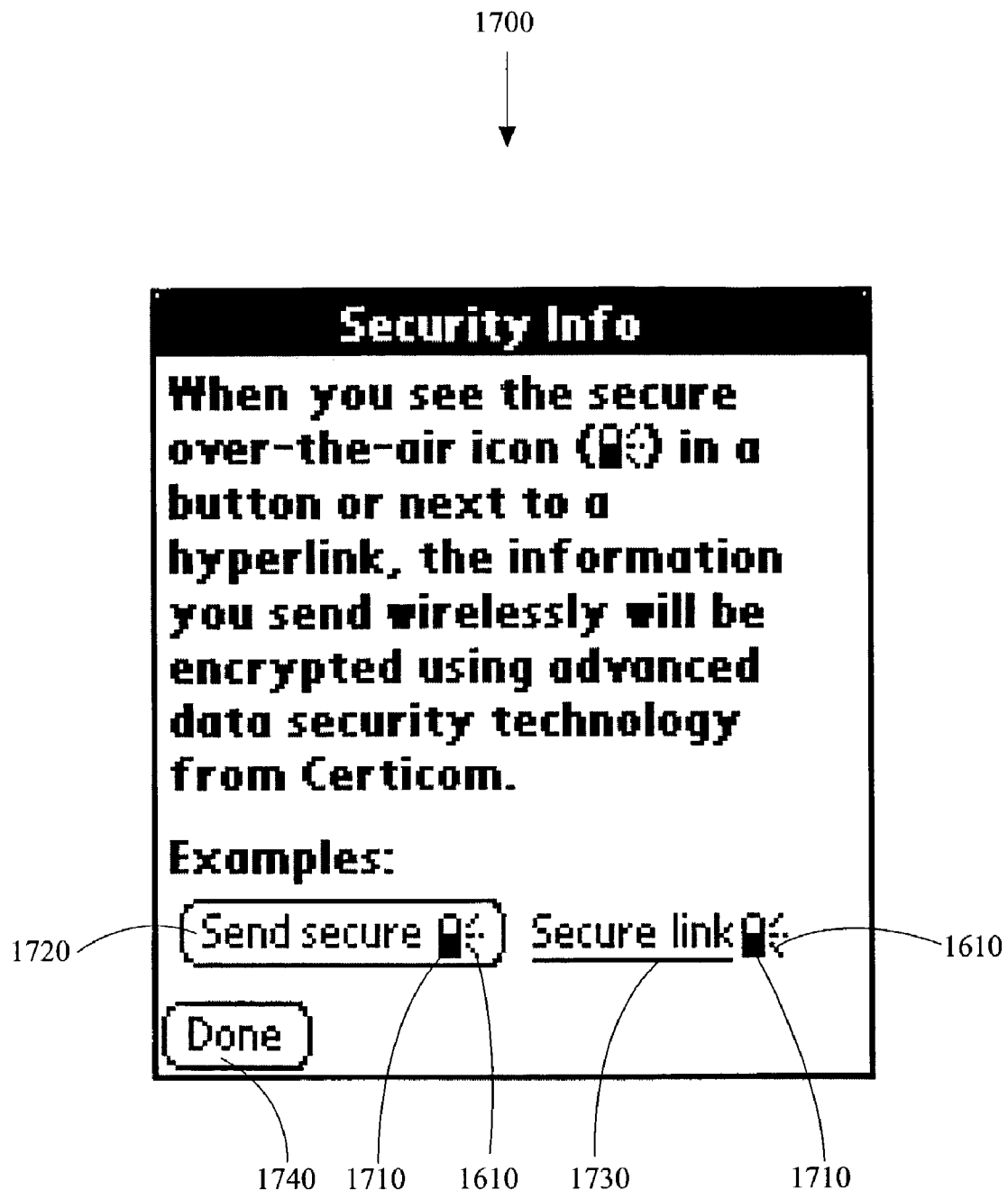
FIG. 17 illustrates a screen view including a secure link icon and a wireless link icon.

For some embodiments, selection of a user interface element corresponding to the subsequent action by the user initiates the subsequent action. The user interface element is an operating system 102 object, and can be provided as a button (as shown in FIG. 17 for a "done" user interface graphic element 1740 and a "Send secure" user interface graphic element 1720), or a hyperlink (as shown in FIG. 17 for a "Secure link" user interface graphic element 1730). Initiating the subsequent action can include transmitting subsequent action data 1530 from the communications device 100. The sensory cue is embedded into the user interface element operating system 102 object.

For some embodiments, more than one sensory cue is embedded into a user interface element. For these embodiments, each embedded sensory cue preferably reveals a different set of data communications features to the user. For example, the secure link icon 1710 and the second wireless link icon 1610 convey two different sets of features to the user.

The communications device 100 can include a screen 101. In conjunction with the screen 101, the sensory cue includes an image. At least one image is embedded into a corresponding user interface element. The communications device 100 processing resources simultaneously displays the at least one image and the user interface graphic element on the screen 101. For some embodiments, the at least one image is displayed proximally to the user interface graphic element. Note that user interface graphic elements with no corresponding sensory cue can be displayed on the same screen 101 as other user interface graphic elements that have at least one embedded sensory cue image.

For some embodiments, more than one user interface graphic element is simultaneously displayed on the screen 101. For user interface graphic elements having at least one corresponding embedded image, each embedded image corresponds to a set of data communication characteristics and each embedded image is disposed proximally to the corresponding user interface graphic element.

The image can comprise a variety of icons. The icons inform the user of the corresponding set of data communication characteristics. For example, the icons can inform the user of a link type or transmission mode, security measure attributes, maximum message size for a corresponding data communication (or message), cost of the subsequent action, or speed of the network. For some embodiments of the method, the embedded image(s) is (are) disposed proximally to the corresponding user interface graphic element.

The sensory cues can also include sounds when the communications device 100 includes an audio output. The communications device 100 processing resources for these embodiments emit the sounds from the audio output.

Method for Indicating Subsequent Action Characteristics Using Compact Markup Language The method for indicating subsequent actions can be implemented in conjunction with the compact mark-up language (CML) described in the Content Layer section of this document. The subsequent action can correspond to a request for a hyperlink document. The hyperlink document is disposed in a base document.

The subsequent action data communication includes the transfer of packets of data. According to CML, each packet of data has a base document uniform resource locator followed by compressed data. The compressed data includes references to fields in the hyperlink document, and the compressed data includes a user interface graphic element, such as a hyperlink, indicating use of the hyperlink document.

According to another aspect of the invention, the subsequent action includes receiving an HTML message from a source of content data 190, such as the Internet, where the HTML message comprises text and images.

For aspects of the invention where the transaction includes receiving an HTML message from a source of content data 190 and where the HTML message comprises text and images, the receiving can include the communications device 100 processing resources fetching the HTML message directly from the source of content data 190 (i.e., without an intermediary proxy server 180). The receiving can also include the communications device 100 processing resources compressing selected portions of the HTML message by translating selected portions of the HTML message using CML.

The receiving also includes communications device 100 processing resources passing compact markup language representations of the selected portions and HTML representations of unselected portions of the HTML message to a rendering layer in the communications device 100. The receiving includes communications device 100 processing resources rendering the selected portions and the unselected portions for viewing, for example on the communications device 100 screen 101.

The subsequent action can include the wireless client 405 transmitting subsequent action data in packets of data to a proxy server 180. The proxy server 180 can include means for transforming subsequent action data formatted in a compact transfer protocol into an HTML request, and means for converting an HTML message into a first message in a compact markup language. The compact transfer protocol is discussed in greater detail in the "Transfer Layer" section of this document.

The subsequent action can also include the wireless client 405 transmitting the subsequent action data in packets of data to the proxy server 180. The proxy server 180 transforms the subsequent action data into an HTML request. The transforming includes combining the subsequent action data received from the wireless client 405 with an HTML hyperlink document. The subsequent action data include field values and field indices corresponding to fields in the HTML hyperlink document.

For one embodiment, the subsequent action can include the proxy server 180 requesting HTML messages from a source of content data 190. The subsequent action also includes the communications device 100 processing resources submitting compressed representations of field values and field indices corresponding to fields in a hyperlink document to the wireless client 405. The compressed representations comprising data are formatted in a compact markup language. The wireless client 405 transmits the subsequent action data in packets of data to the proxy server 180, the subsequent action data comprising field values and field indices. The requesting includes the proxy server 180 transforming the subsequent action data into an HTML request; and transmitting the HTML request to the source of content data 190.

Figure 15:
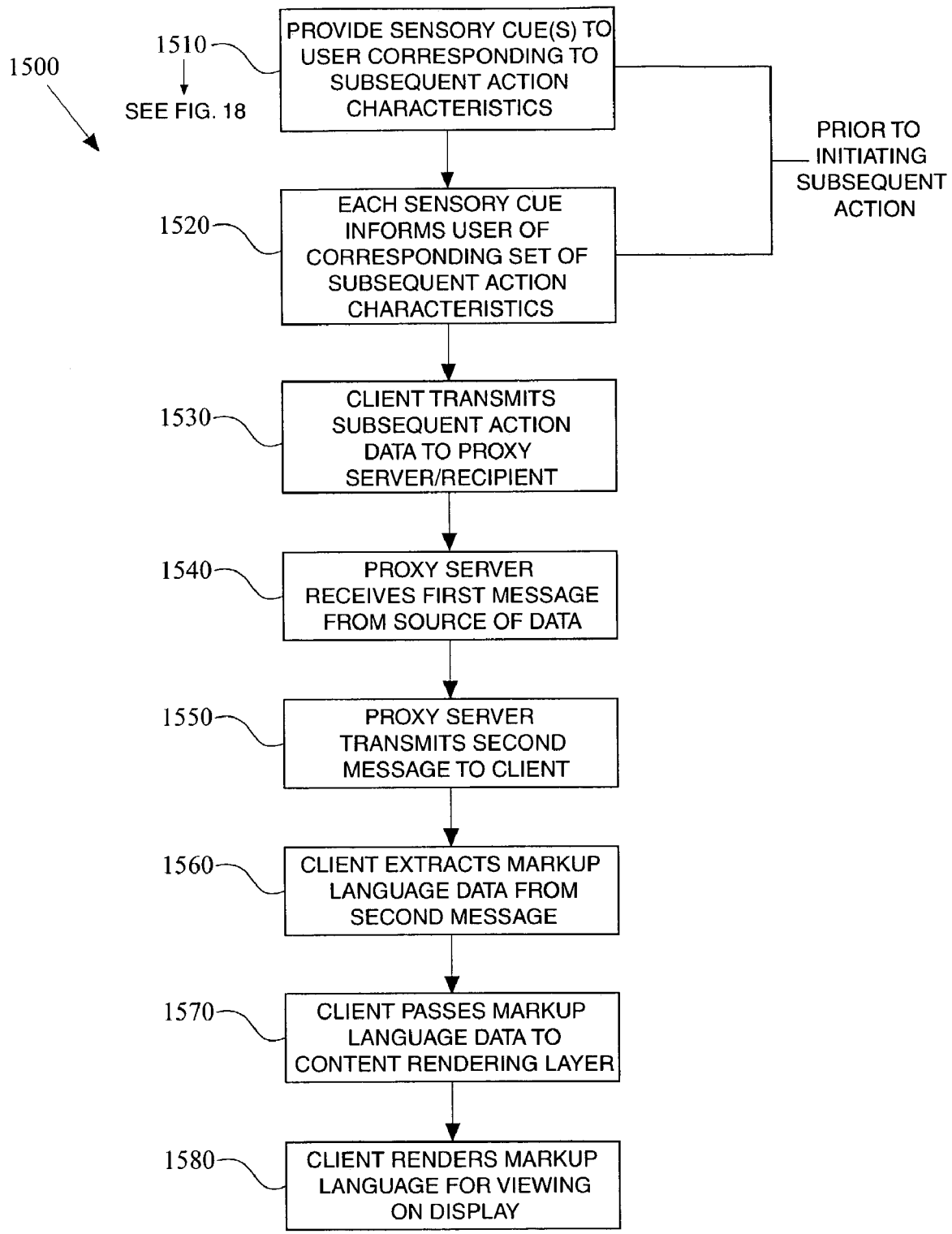
FIG. 15 is a flow diagram illustrating the basic method for indicating subsequent action characteristics.

According to another embodiment of the invention, the communications device 100 has a screen 101, the wireless client 405 communicates with a proxy server 180, and the proxy server 180 communicates with a source of content data 190. The subsequent action, as shown in FIG. 15, includes the proxy server 180 receiving a first message 1540 from the source of content data 190, such as the Internet. Receiving the first message 1540 includes the proxy server 180 fetching the first message from the source of content data 190. Receiving the first message 1540 also includes the proxy server 180 converting the first message into a second message. The second message includes data in the compact mark up language representing text and images.

The proxy server 180 then transmits the second message 1550 to the wireless client 405. The second message comprises packets of data. The wireless client 405 extracts 1560 the compact markup language data from the second message. The wireless client 405 passes 1570 the compact mark up language data to a content rendering layer, and renders 1580 the compact mark up language data for viewing on the screen 101.

For transactions including the wireless client 405 transmitting the subsequent action data 1530 in packets of data to a proxy server 180, where the subsequent action data corresponds to a hypertext document and the hypertext document has fields, transmitting the subsequent action data 1530 can include the communications device 100 submitting to the wireless client 405 compressed representations of data corresponding to the fields. The compressed representations are formatted according to a compact transfer protocol. The wireless client 405 transmits the compressed representations in packets of data to the proxy server 180.

Transmitting the subsequent action data 1530 can also include formatting each packet of data as described in greater detail the "Header Compression" section of this document. The formatting includes the wireless client 405 processing resources determining that the destination of the packet of data is a proxy server 180. The packet of data includes a message fragment 740 encapsulated by a compressed user datagram protocol header 720. The formatting also includes the wireless client 405 processing resources setting a first bit in the compressed user datagram protocol header 720 to indicate that the destination of the packet of data is the proxy server 108, placing bit flags in the compressed user datagram protocol header 720, and placing a source port number identifying the wireless client 405 in the compressed user datagram protocol header 720. The bit flags indicate inclusion of optional user datagram protocol fields and inclusion of optional Internet protocol fields.

The transaction can include securely transmitting packets of data corresponding to the subsequent action from the wireless client 405 to a proxy server 180. As discussed in greater detail in the "Secure Communications" section of this patent application, the secure transmission includes the wireless client 405 encrypting a data encryption key using a proxy server 180 public key to form an encrypted data encryption key. The data encryption key corresponds to a specific transaction between the wireless client 405 and the proxy server 180. The wireless client 405 encrypts the subsequent packets of data using the data encryption key to form an encrypted message. The wireless client 405 transmits the encrypted message to the proxy server 180.

Method for Displaying Link Type Icons

The compact representation of a hyperlink user interface element can include bits that indicate subsequent action characteristics. For one embodiment, as shown in the Tag Definitions: TagHyperlink section starting on page 73 of this document, each hyperlink tag (or index) in CML includes a single link type bit indicating whether the hyperlink is an internal link (generally indicated by a 1) or an external hyperlink, i.e., a hyperlink requiring communication over a wireline or wireless connection (generally indicated by a 0).

For one embodiment, if the link type bit is 1, then the data corresponding to the link resides within the communications device 100, no connection is needed, and no link type icon is displayed for the subsequent action. If the link bit is 0, but the URL for the hyperlink item starts with "palm:", or "palmcall:", or "file:" then the file is also stored within the communications device 100 and no link type icon is displayed for the subsequent action. If the link type bit is 0, and the URL for the hyperlink item does not start with any of the names provided above, then the second wireless link icon 1610 is displayed. Note that, as discussed below, a separate wireline link icon can be displayed when the communications device is connected to a wireline network.

Figure 18:
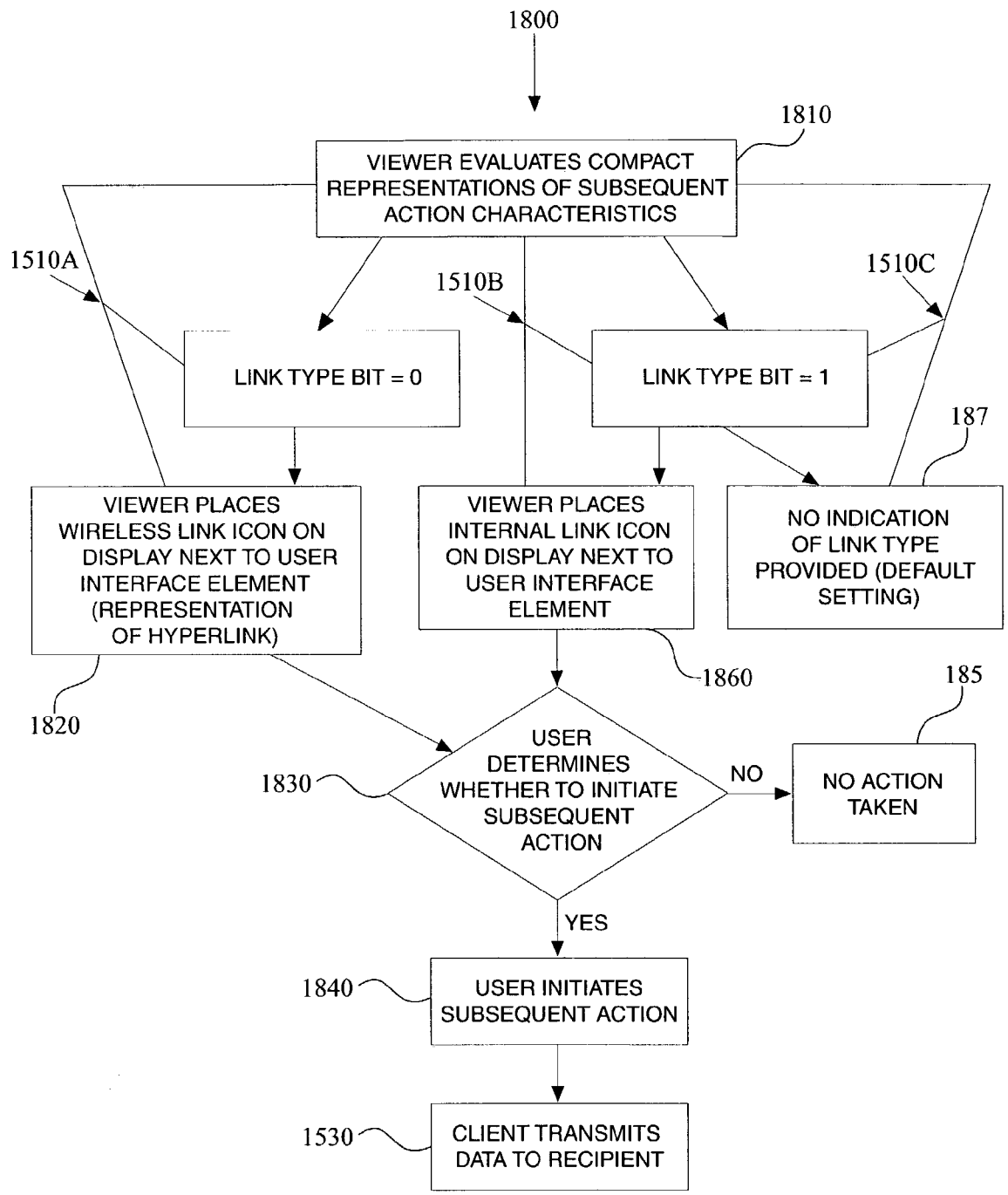
FIG. 18 is a flow diagram illustrating the method for indicating subsequent action characteristics when the communications device processing resources include a viewer.

According to another embodiment of the invention, shown in FIG. 18, the communications device 100 processing resources includes a viewer. The compact representation of the hyperlink document includes a compact representation of subsequent action characteristics. The sensory cue comprises an image. Providing the sensory cue 1510 to the user includes the viewer evaluating the compact representation of the subsequent action characteristics. Typically, the viewer simultaneously displays each image proximally to a corresponding user interface graphic element. Each user interface element comprises an operating system 102 object corresponding to a selectable hyperlink. The compact representation of the image is embedded in the user interface element object. Therefore, no additional action is required by the user or developers to ensure that the sensory cue image is displayed along with the corresponding user interface graphic element. All that is needed is to provide the operating system 102 object with the CML representation of the hyperlink including the appropriately embedded code that triggers the viewer to display the sensory cue image.

Figure 16:
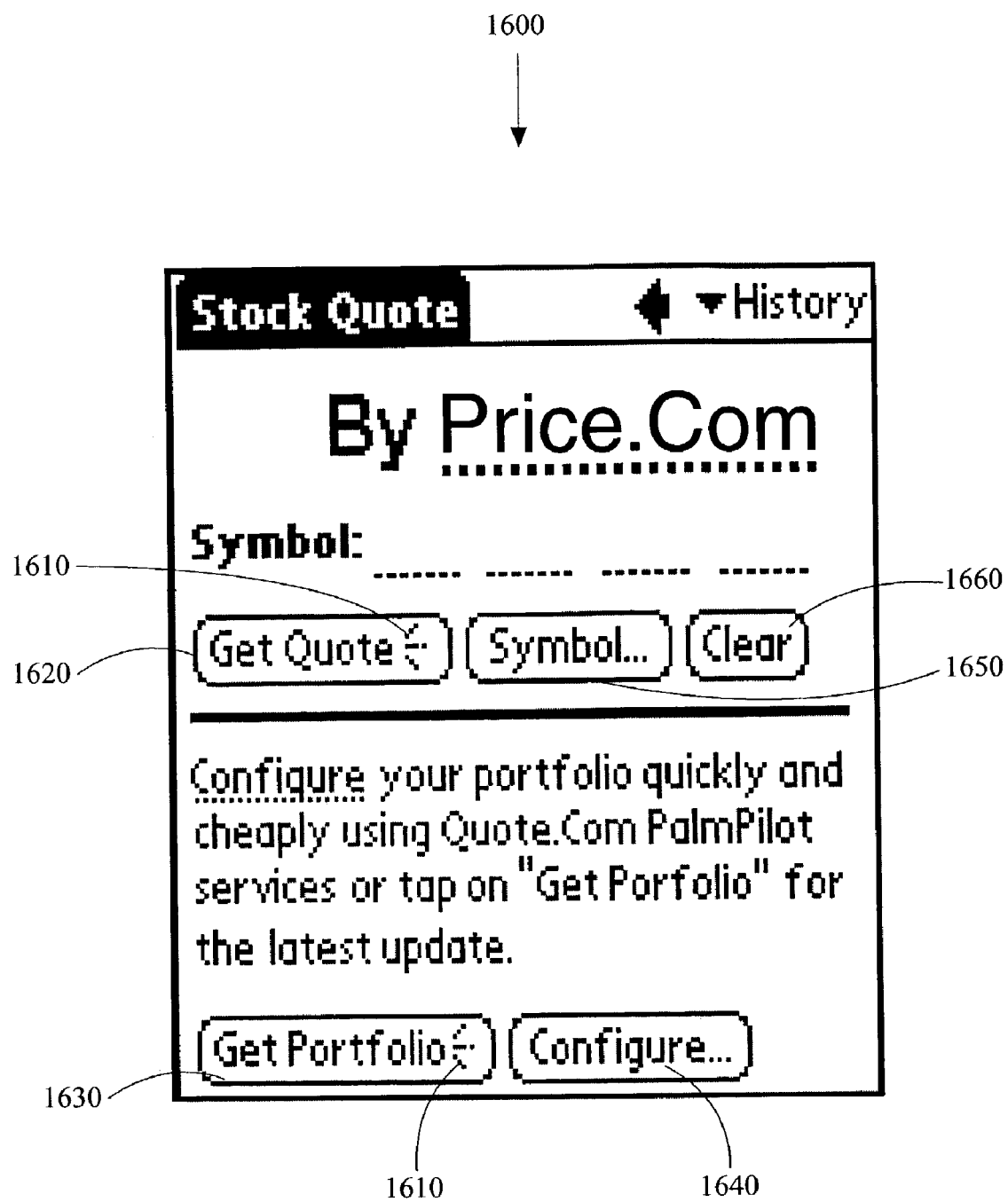
FIG. 16 illustrates a screen view including a wireless link icon.

A screen 101 view 1600 including the second wireless link icon 1610 is depicted in FIG. 16. FIG. 17 provides a view 1700 of the secure link icon 1710. As shown in FIG. 17, the secure link icon 1710 and the second wireless link icon 1610 can be placed together to indicate that the subsequent action requires a secure wireless data communication.

FIG. 18 provides a block diagram illustrating an alternative embodiment of the method for indicating subsequent action characteristics when the communications device 100 processing resources include a viewer 1800. This alternative embodiment can be implemented in a palm-sized computer communications device.

The subsequent action characteristics can include a link type. The compact representation of the subsequent action link type includes the link type bit. The image comprises a link type icon. Responsive to the value of the link type bit, the viewer displays a corresponding link type icon proximal to a user interface element that initiates the subsequent action. For one embodiment, the link type icon corresponds to the value of the link type bit as described below. The user determines whether to initiate the subsequent action by selecting the corresponding user interface element based on the knowledge the user acquires from the displayed link type icon, or the absence thereof.

The step of providing sensory cues 1510 to the user can include the viewer evaluating 1810 a compact representation of subsequent action characteristics, such as the link type bit, in the compact representation of the hyperlink document (or hyperlink index). If the link type bit is not set (i.e., equals 0), the viewer can place the second wireless link icon 1820 on the screen 101 next to the user interface graphic element (hyperlink representation) corresponding to the subsequent action. The sequence of the viewer evaluating 1810 and the viewer placing the second wireless link icon 1820 steps is indicated in FIG. 18 as a first sensory cue provision protocol 1510A, and is a specific implementation of the step of providing sensory cues 1510. In FIG. 16, the second wireless link icon 1610 is placed next to the "Get Quote" user interface graphic element 1620 and the "Get Portfolio" user interface graphic element 1630.

The user then determines 1830 whether to initiate the subsequent action corresponding to the "Get Quote" user interface graphic element 1630. If the user determines to proceed, the user interface graphic element is used for initiation 1840 of the subsequent action. Otherwise, no action is taken 1850 by the user. The initiation 1840 of the subsequent action can be accomplished by simply clicking a mouse when a cursor is placed on, or near, the corresponding user interface graphic element, by pressing a stylus against a touch screen on or near the corresponding user interface graphic element, or taking any appropriate action to initiate the subsequent action corresponding to the user interface graphic element.

Upon user initiation 1840 of a subsequent action, the client transmits 1530 the subsequent action data to the appropriate recipient thereby initiating the transaction. The client can be a wireless client 405, and the recipient can be a proxy server 180.

If the transmission mode bit is set (i.e., equals 1), the viewer can also place 1860 a wireline link icon next to the hyperlink on the screen 101. The sequence of the viewer evaluating 1810 and the viewer placing the wireline link icon 1860 steps is indicated in FIG. 18 as a second sensory cue provision protocol 1510B and is a specific implementation of the step of providing sensory cues 1510.

To simplify the presentation of the hyperlinks on the screen 101, the viewer response to a set link type bit can be to provide no sensory cue 1870. The sequence of the viewer evaluating 1810 and the viewer placing no sensory cue 1870 steps is indicated in FIG. 18 as a third sensory cue provision protocol 1510C and is a specific implementation of the step of providing sensory cues 1510. Typically, subsequent actions having nominal or default characteristics where the user interface graphic elements are not accompanied by any sensory cue, because the user does not need to be informed of any special cost in terms of time or money associated with the transaction corresponding to the subsequent action. Therefore, in most embodiments, no sensory cue would be provided for subsequent actions that were accomplished within the communications device 100, i.e., where no data transmission over a wireline or wireless path was needed.

For example, in FIG. 16, the "Configure" 1640, "Symbol" 1650, and "Clear" 1660 user interface graphic elements are internally processed, and therefore do not require wireless or wireline communication. Because no added time or expense is associated with these subsequent actions, there is no need to inform the user of their characteristics, and therefore no sensory cue revealing their characteristics is provided on the screen 101 view 1600.

Displaying the second wireless link icon 1610 for dual mode applications [i.e., applications that can operate in both a wired (and/or internal) and wireless mode] informs the user that wireless time and expense will be incurred for use of the corresponding wireless mode data transmission. Because the second wireless link icon 1610 is embedded in appropriate user interface elements, the second wireless link icon 1610 automatically appears for any subsequent action that requires wireless communication, thereby alerting the user that wireless time and expense will be incurred if the wireless data communication is executed. No user or developer action is needed to ensure that the second wireless link icon 1610 appears.

In one embodiment, the communications device 100 is a palm-sized computer having wireless communications capability. The screen 101 of the computer shows a user interface element that is used to initiate the subsequent action. The subsequent action corresponds to a request for a hyperlink document. The subsequent action characteristics include a message transmission mode. The representation of the hyperlink document includes a transmission mode bit. The set of images includes a link type icon. The link type bit can have a first value, or a second value.

Responsive to the link type bit having the first value, the communication device 100 displays a wireless link icon proximal to the user interface graphic element. Responsive to the transmission mode bit having the second value, the communications device 100 displays no image proximal to the user interface graphic element. Responsive to a user selection of the user interface graphic element, the communications device 100 initiates the subsequent action.

The subsequent action can include messages exchanged by the communications device 100 that are transmitted wirelessly, or can include only data provided internally within the communications device 100, or messages exchanged by the communications device 100 that are transmitted by a wireline connection. Before the user selects the subsequent action, the communications device 100 responds to the link type bit for hyperlink documents requiring wireless messages by displaying a wireless link icon. The wireless link icon informs the user that the corresponding subsequent action will result in wireless communication.

In many situations the user can select an alternative to the wireless transaction and avoid the expense, in time and money, associated with transmission of a wireless message. In other situations, the user can determine that the selectable wireless message is desired despite the greater costs associated therewith. When the wireless communication is desired, the user makes a decision to select the wireless message only after being informed by the wireless link icon that the time and expense of the wireless message will be incurred.

Additional subsequent action characteristic bits can provide sensory cues that indicate whether a set of security measures is required for a data communication included in the subsequent action. Examples of subsequent actions including secure wireless data communications include financial or other transactions for which a secure communication is desired by the user, or required by law. On the other hand, the sensory cue indicating a forthcoming secure transmission enables a user to avoid the expense and time required for a secure transmission when such a transmission is not desired. Note that the secure link icon 1710 can be used for secure wireline data communications.

Device and System for Indicating Subsequent Action Characteristics

One aspect of the invention provides a communications device 100 including a client. The client includes processing resources adapted to initiate a subsequent action, where the subsequent action has characteristics. The subsequent action includes data communications performed by the client. The client also includes processing resources adapted to indicate to a user the subsequent action characteristics prior to the user to initiating the subsequent action. The processing resources adapted to indicate provide a sensory cue to the user. The sensory cue corresponds to a set of subsequent action characteristics and informs the user of the characteristics. The client can be a wireless client 405.

In some embodiments, the communications device 100 has an operating system 102 object that includes a user interface element. The sensory cue is embedded into the user interface element.

The communications device 100 can include a screen 101 and processing resources. The sensory cue can be an image. The communications device processing resources can simultaneously display the image and the user interface element on the screen 101.

The subsequent action can include the wireless client 405 requesting a hyperlink document. The hyperlink document is indicated by a hyperlink in a base document. The wireless client 405 processing resources are adapted to request the hyperlink document. The requesting includes transmitting to the proxy server 180 a compact representation of the hyperlink document. The compact representation of the hyperlink document includes a base document uniform resource locator and a compact representation of the hyperlink.

For one embodiment, the communications device 100 includes a screen 101 and the communications device processing resources include a viewer. The compact representation of the hyperlink document includes a compact representation of the subsequent action characteristics. The sensory cue comprises an image. The viewer is adapted to evaluate the compact representation of subsequent action characteristics; and cause the display of the image proximally to a corresponding user interface element. The corresponding user interface element is used to select the hyperlink document and comprises an operating system 102 data object.

The communications device 100 can perform the methods described in the Method for Indicating Subsequent Action Characteristics section of this patent application.

Another aspect of the invention provides a communications system. The communications system includes a source of content data 190, a communications device 100, and a server. The communications device includes a client as described in the paragraph above. The server communicates with the source of content data 190 and the client. The client can be a wireless client 405, and the server can be a proxy server 180

Reliable Message Layer and Reliable Message Protocol

This section describes the reliable message layer 635 of the wireless communications device 100. The reliable message layer 635 provides reliable, efficient delivery of arbitrary length messages over both wireline and wireless networks. The protocol it uses over wireless links is called the reliable message protocol (RMP). When operating over wireline links, it uses the Internet standard TCP protocol.

In terms of functionality, the reliable message layer 635 is situated below the transfer layer and above the network layer. The network layer is the layer responsible for sending packets over the network. On a wireless communications device 100, the network layer is the wireless communications device 100 operating system 102 network library (also referred to as NetLib, and shown as Net Library, reference number 1110 in FIG. 11).

When operating over a wireline network, the reliable message layer 635 uses the TCP Internet protocol. TCP provides guaranteed delivery of stream data and works well over networks that have relatively high bandwidth and low latency. By following a few simple usage rules that are described below, the TCP protocol is easily adapted to send discrete messages instead of stream data.

When operating over a wireless network, the reliable message layer 635 will instead use the RMP protocol. RMP is used because TCP is not practical over high latency low bandwidth networks. RMP is much more efficient than TCP and is optimized for use in an environment where small requests and responses are transferred between the wireless client 405 and the proxy server 180.

On Wireless Networks

The reliable message layer's job is to reliably send and receive messages with the remote host. A message is simply a block of data that represents either a request from a wireless client 405 to a proxy server 180, or a response from a proxy server 180 to a wireless client 405. These messages can in general be any size but the majority of them will be small enough to fit within a single wireless network packet.

Some messages will be too large to fit within a single packet. RMP therefore provides a mechanism to identify packets in such a way that the receiving host can reconstruct the message as each packet arrives. Furthermore, the packets are not guaranteed to arrive in the same order they were sent out, so the receiving host is also prepared to re-order them.

In some embodiments wireless networks do not guarantee delivery of packets. For such networks, RMP provides a mechanism for re-transmission of packets that are not received by the remote host. This mechanism is adapted to minimize any unnecessary traffic over networks that have guaranteed delivery.

Finally, RMP is extremely efficient in its use of network bandwidth. Wireless networks typically have a very high latency for every packet, no matter how small the packet size. For example, a one byte packet on a packet data network typically takes an average of 3 seconds just to travel from a remote wireless client 405 to the proxy server 180. To reduce overall latency then, most transactions should be accomplished with just one packet sent from wireless client 405 to proxy server 180 and just one packet returned. To reduce bandwidth, the header space used by RMP is minimal.

The following table summarizes these design goals of RMP:

| Goal | Description |
| --- | --- |
| 1.) Minimal number of packets | If both the request and response messages are less than 1 packet in length, an entire transaction should take place with just 1 packet sent from wireless client 405 to proxy server 180 and just 1 packet returned. |
| 2.) Minimal header size | The packet header used by RMP is minimal in size and optimized for small messages. |
| 3.) Correct for out-of-order delivery | RMP works over networks that do not guarantee order of delivery. In particular, messages that do not fit within a single packet are correctly reconstructed at the receiving host even if the packets arrive out of order. |
| 4.) Correct for lost packets | When operating over networks that do not guarantee delivery of packets, RMP automatically re-transmits packets as necessary. This mechanism is adapted to abide by the one packet up one packet down goal when operating over networks that do provide guaranteed delivery. |

The RMP Header

The following structure defines the format of the RMP header. The notation used to represent the RMP header (shown in FIG. 7 as reference number 730) is the same notation used to document CML and CTP. This notation was introduced and described in the previous "Compact Data Structure Notation" section.

| Bit | lastDg | // set for last datagram in a |
| --- | --- | --- |
|  |  | // message |
| UIntV | dgIndex | // index of datagram |

As shown, the RMP header 730 has only two fields: a single bit that is set for the last datagram of a message, and a variable size integer specifying the datagram index. The datagram index is zero for the first datagram in a message and increments by one for each subsequent datagram. The maximum allowed index for a datagram is 65534 (0xFFFE).

Figure 7:
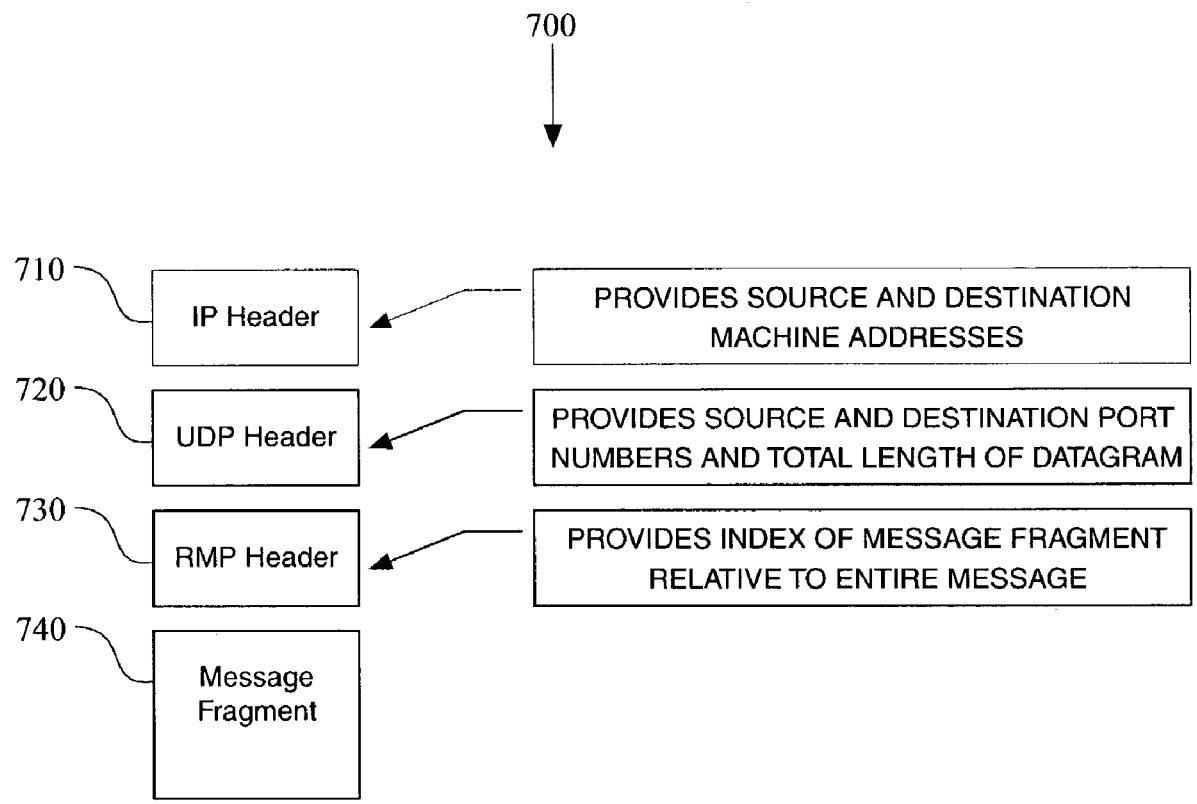
FIG. 7 illustrates a reliable message protocol packet structure.

Notice that the RMP header 730 does not contain any fields specifying the packet length, the byte offset within the message that the packet represents, addressing information or port numbers. These fields are not required because RMP datagrams are sent using the Internet UDP protocol. The IP header 710 and UDP header 720 present in a UDP packet provide the overall packet length, source and destination machine addresses, and source and destination port numbers. As a further simplification, RMP ensures that datagrams are small enough to fit within a single network packet, so a single RMP datagram will never be fragmented across 2 or more IP packets. FIG. 7 illustrates an entire RMP Packet Structure 700.

The IP header 710 and the UDP header 720 are typically transmitted over the wireless network in a highly compressed form since most of the information in these headers is redundant or unnecessary over the wireless link. When using a packet data wireless network, the IP header 710 and UDP header 720 are reduced from 28 to 3 bytes. The "Wireless Network Interface" section below describes how the IP header 710 and UDP header 720 are compressed over the packet data wireless network.

The RMP Data Area

Because RMP packets are sent using UDP, and because UDP packets are always an even number of bytes long, the total size of the RMP area (header +data) is an even number of bytes long. Since the RMP header 730 is not generally an even number of bytes long, anywhere from 0 to 7 pad bits (which are always 0 bits) are appended to the header before the start of the data area in order to place the start of the data area on an even byte boundary.

The actual messages (e.g., message fragment 740) that RMP transports are an even number of bytes long. The box below illustrates the Data Area Padding and shows an example of a single packet request that has a 2 byte message in it. Notice that the header section is padded with 6 bits. This makes the entire RMP packet an integer number of bytes long (24 bits, or 3 bytes). If instead the RMP header 730 area had been 8, 16, or any other multiple of 8 bits long, then no padding bits would be inserted before the data area.

| | | Bit Offset | |
|---|---|---|---|
| 0 | Bit | lastDG = 1 | |
| 1 | UintV | dgIndex = 0 | |
| 2 | Bit[6] | padding | |
| 8 | Bit[16] | data | |
| 24 | | | |

Re-Transmission of Lost Packets

When RMP is being used over a network that does not guarantee delivery of packets, RMP provides a mechanism for the re-transmission of lost packets. Most reliable protocol designs rely on acknowledgements from the remote host to indicate to the sender that a packet was properly received. Then, if an acknowledgement is not received within a specified timeout period, the packet is resent. This method is not used in RMP because it forces a minimum of three packets to be exchanged for a single transaction (request to proxy server 180, response to wireless client 405, acknowledgement of response to proxy server 180).

Instead, RMP will assume by default that packets are correctly delivered to the remote host. The only time a packet will be re-transmitted is when an RMP re-transmit request is explicitly received from a remote host. Furthermore, the only time that a remote host will even send a re-transmit request is if the remote host has not received all packets from a multi-packet message within a certain timeout period.

Thus, for transactions with single packet requests and responses, packets will never be re-transmitted. If a response is not received within a certain timeout period, the reliable message layer 635 will simply return with a timeout error and the user or higher layer software will have to re-submit the request. If at least one packet of a multi-packet message is received before the timeout period however, the reliable message layer 635 will send a re-transmit request to the remote host and tell it which datagrams of the message need to be re-transmitted. The following structure shows a re-transmit request:

| | | |
|---|---|---|
| Bit | lastDg = 1 | // always 1 |
| UIntV | dgIndex = 0xFFFF | // special value indicates |
| | | // re-transmit request |
| UInt16 | numSegments | // number of segment pairs that |
| | | // follow |
| | | // First Segment |
| UInt16 | startDg0 | // start datagram index |
| UInt16 | numDgs0 | // number of datagrams in segment |
| | | // Optional Additional segments... |
| UInt16 | startDg1 | |
| UInt16 | numDgs1 | |

The first two fields, lastDg and dgIndex are set to 1 and 0xFFFF respectively in order to identify this RMP packet as a re-transmit request. The numSegments field indicates how many startDg and numDgs pairs follow. Each startDg/numDg pair indicates a range of packets that need to be re-transmitted. For example, a startDg of 2 and numDg of 3 indicates that datagrams 2, 3 and 4 need to be re-transmitted. Finally, a numDgs value of 0xFFFF is a special case that indicates that all datagrams from startDg to the end of the message need to be re-transmitted. This special value is used because the host receiving the message does not know how big the entire message is until it receives the last packet in the message (the one with the lastDg bit set).

The definition of what range of bytes a particular datagram index represents is up to the sending host to decide and maintain. The receiving host simply tells the sender which datagrams have not been received by index, not by byte number or byte count.

This protocol, although very efficient in terms of network bandwidth, can place a significant burden on the sending host to implement, particularly the proxy server 180. For example, after a proxy server 180 sends a multi-packet response, the proxy server 180 saves the response data in a buffer somewhere just in case the wireless client 405 needs part of it re-transmitted. Only after the timeout period expires (which can be quite long for wireless networks—up to 60 seconds or more) can the proxy server 180 safely dispose of the response message and recover the memory used to hold it.

The Reliable Message Protocol

The reliable message protocol (RMP) protocol is described herein through examples. The RMP protocol combined with the compact transport protocol and the compressed markup language provide the basis for packet minimized communications between the wireless client 405 and the proxy server 180.

One embodiment of the invention includes a method for completing a transaction between the wireless client 405 and the proxy server 180. The method comprises transmitting a single request message from the wireless client 405 to the proxy server 180, and transmitting a single response message from the proxy server 180 to the wireless client 405. The request message comprises packets of data. Transmitting the request message comprises placing in the request message a base document uniform resource locator followed by compressed data. The compressed data comprises field values and field indices corresponding to fields in a hyperlink document, and a user interface element indicating of use of a hyperlink document. Field values and field indices correspond to fields in the hyperlink document. The number of packets is small and the size of each packet is small.

In some embodiments, each response message packet is less than one kilobyte.

In some embodiments, the base uniform resource locator can be expressed in CTP by a binary string. The binary string includes a first field that indicates the encoding scheme used in the request message. The binary string can also include a second field comprising a representation of a second segment of the base uniform resource locator (URL). Lower case letters in the base URL and other selected text are represented by a multi-bit alphabet. The alphabet has less than eight bits. Characters not represented by the multi-bit alphabet, are preceded by a multi-bit escape character. The escape character indicates that text following the escape character is represented by a different scheme than the multi-bit alphabet. These alternate schemes can be eight bit ASCII representation or sixteen bit ASCII representation.

Figure 8:
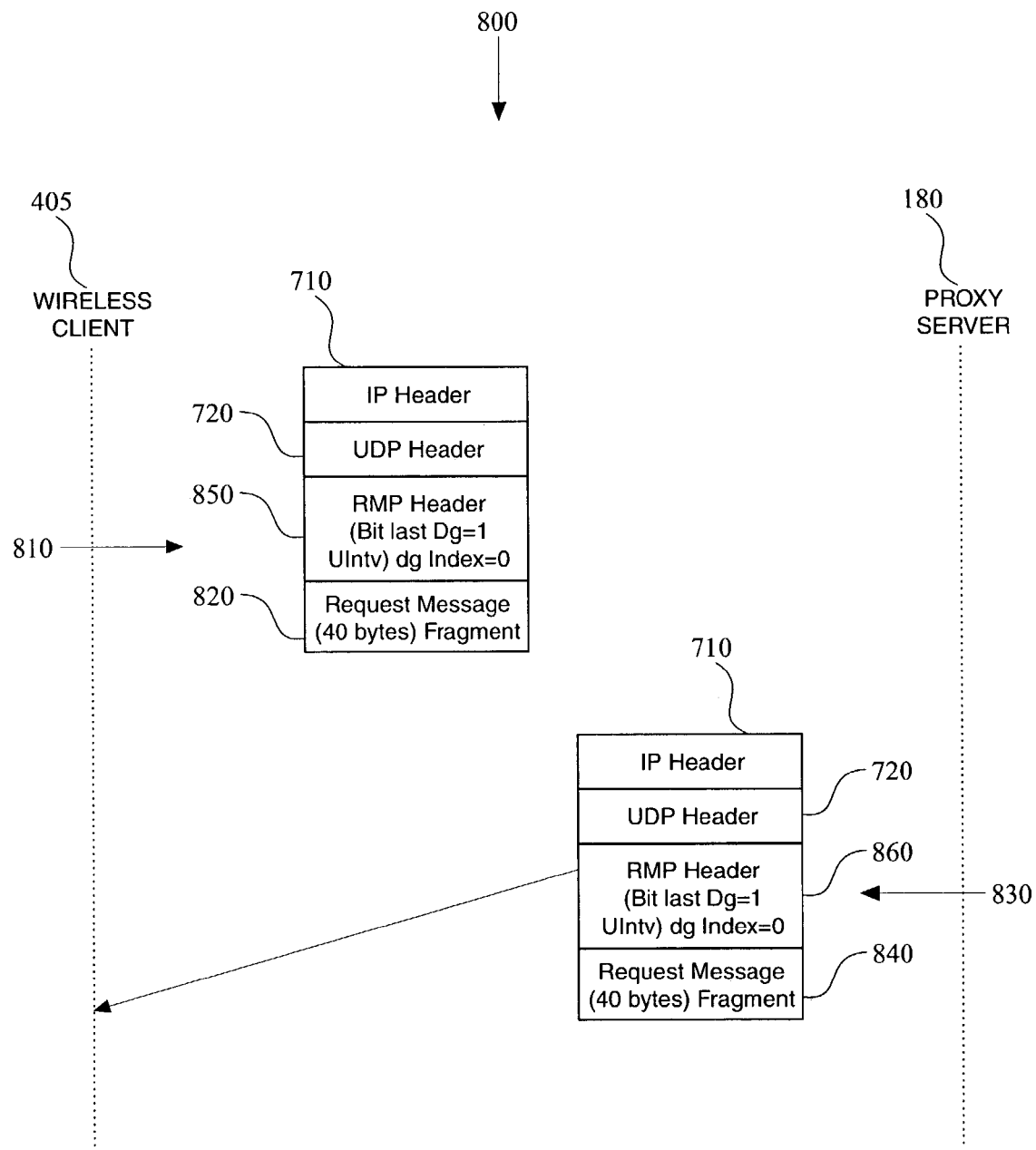
FIG. 8 illustrates an exchange of a single request packet and a single response packet using the reliable message protocol.

The simplest RMP case is where both the request and response messages are small enough to fit in one packet. As shown in FIG. 8, the wireless client 405 sends a single packet request 810 to the proxy server 180. Because the entire request fits in the one packet, the lastDg bit is set in the single packet request RMP header 850 to indicate that the single packet is the last packet in the request message. The single packet request 810 comprises an IP header 710, a UDP header 720, the single packet request RMP header 850, and a request message fragment (RQMF) 820.

The proxy server 180 then sends a single packet response 830 back to the wireless client 405 after processing the request. Because the entire response fits in one packet, the lastDg bit is set in the single packet response RMP header 860. The single packet response 830 comprises an IP header 710, a UDP header 720, the single packet response RMP header 860, and a response message fragment (RSMF) 840.

The RMP protocol is built on top of UDP. Each one of the examples that follow shows a complete transaction from the client's point of view. The wireless client 405 sends a single message request and receives a single message response. Whenever a wireless client 405 initiates a new transaction, the wireless client 405 uses the next available local UDP port number. This port number is sent to the proxy server 180 as part of the UDP header 720 information and tells the proxy server 180 to which port the response packets 830 are to be returned. By using a unique port number for each transaction, packets that do not belong to the current transaction can be safely and effectively ignored.

On the other hand, the destination port of each UDP transaction is constant for very transaction, i.e., the pre-defined port number for the UDP socket on the proxy server 180 that is listening for requests.

Figure 9:
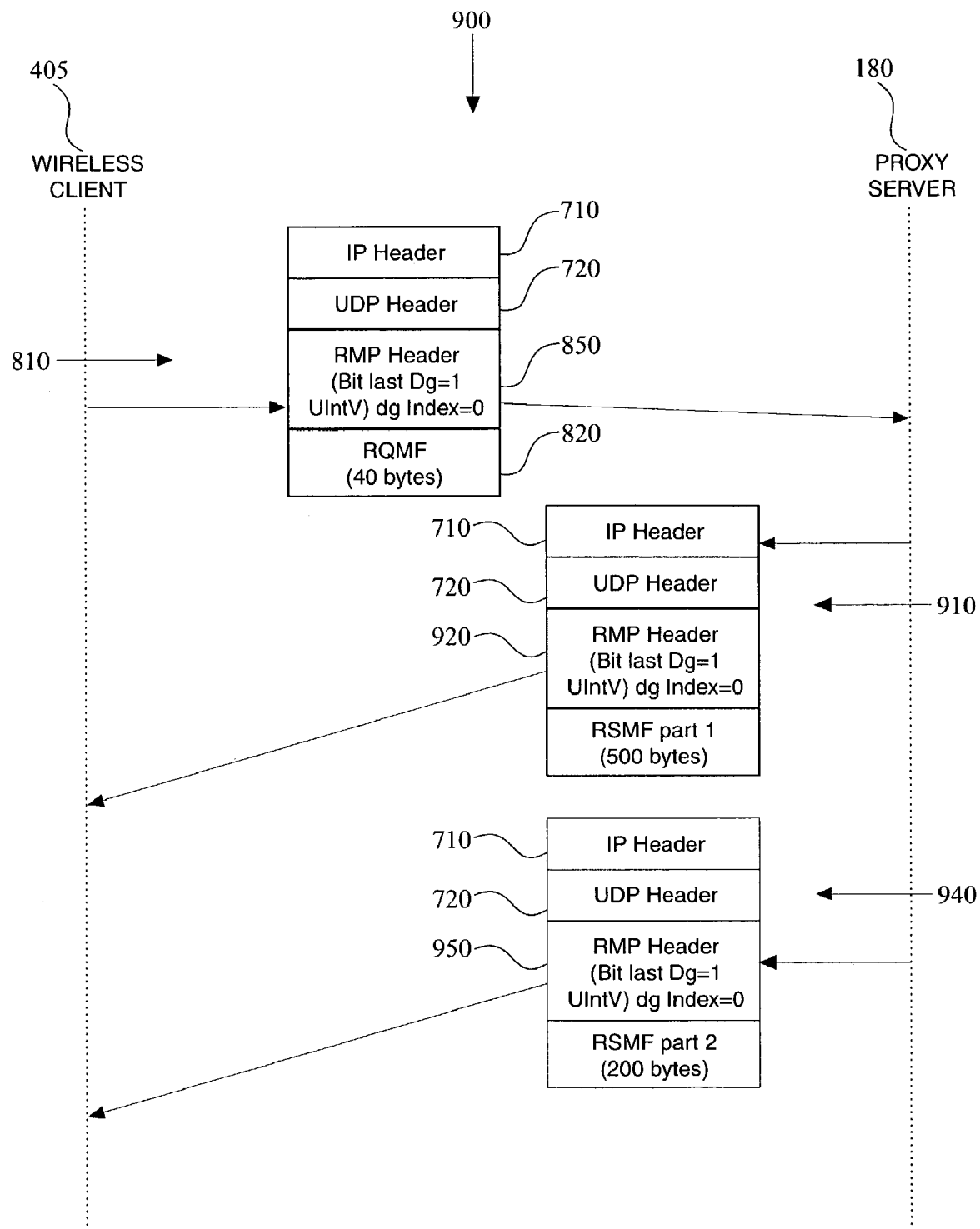
FIG. 9 illustrates an exchange of messages comprising a single request packet and two response packets using the reliable message protocol.

FIG. 9 shows an example of a seven hundred byte response message that is too large to fit in one five hundred byte packet. The proxy server 180 sends a two packet response back to the wireless client 405 where the first response packet 910 does not have the lastDg bit set in the first response packet RMP header 920. The second response packet 940 has the lastDg bit set in the second response packet RMP header 950. An interesting point to bring up here is that the RMP headers never indicate how many bytes of the message have already been sent, only the relative index of each packet. It is up to the receiver to determine the correct message byte offset of each packet by adding up the message fragment sizes from the previous packets.

Figure 10:
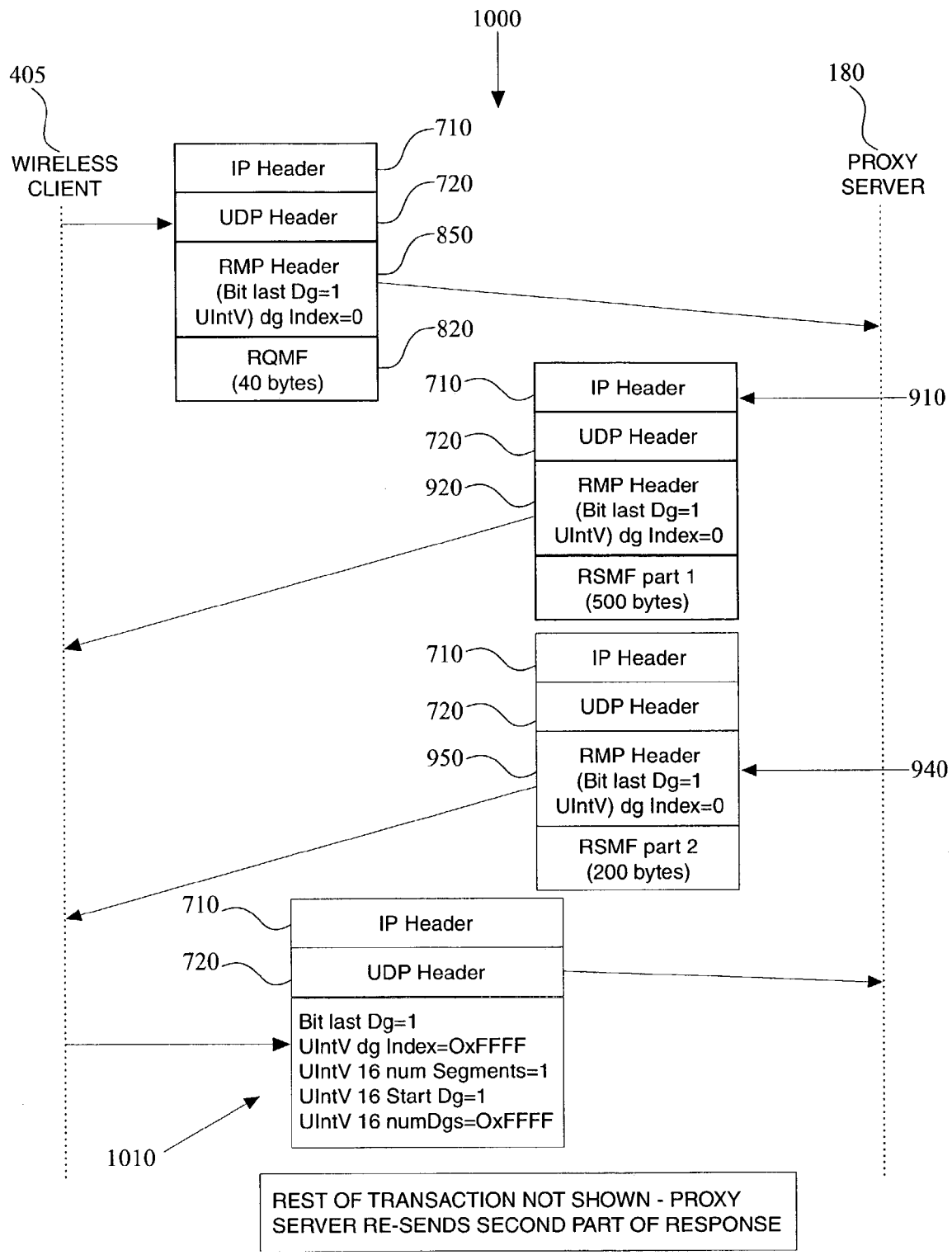
FIG. 10 illustrates an exchange of messages including a retransmit sequence using the reliable message protocol.

FIG. 10 shows an example of a re-transmit packet being sent from the wireless client 405 to the proxy server 180. The proxy server 180 sends a two packet response back to the wireless client 405 but the second packet gets lost. The wireless client 405, after a timeout period, sends a re-transmit request 1010 back to the proxy server 180. Note that the numDgs field in the re-transmit request 1010 is 0xFFFF indicating that every datagram from the startDg to the end of the message is missing.

On Wireline Networks

When operating over a wireline network, the reliable message layer 635 uses the TCP Internet protocol instead of RMP to communicate with the proxy server 180. TCP provides acceptable performance over these networks because they have relatively low latency and high bandwidth. Performance issues aside, TCP is preferable over RMP because of its widespread use and implementation as an Internet standard.

The API to the reliable message layer 635 effectively hides the actual network and protocols used over the network Thus, the caller does not need to know whether RMP or TCP is being used to send messages to the remote host.

When TCP is being used on the wireless client 405, the reliable message layer 635 simply opens up a TCP connection to a pre-defined port number on the proxy server 180, and sends the actual message data. When the entire request message has been transmitted, the wireless client 405 shuts down the transmit side of the client's connection, causing the proxy server 180 to receive an end-of-file indication. This end-of-file indication informs the proxy server 180 that the request message has ended. Likewise, after the proxy server 180 sends the response back, it closes down the TCP connection and the wireless client 405 receives an end-of-file indication that the end of the response message has been transmitted.

Note that a new TCP connection is established for every transaction, i.e., a request message sent from wireless client 405 to proxy server 180 and a response message back from the proxy server 180. Whenever a new TCP connection is established on a host, a new unique local port number is assigned to the connection. This port number is used by TCP to keep track of connections—much like how RMP uses the UDP port number to keep track of its connections.

Reliable Message Layer Application Program Interface (API)

The reliable message layer 635 provides access to the remote host through the RMP or TCP protocols. When a wireline network is in place, the two hosts communicate using TCP, which is already built-in to nearly all desktop and server operating systems, as well as on the wireless communications device 100 operating system 102.

When a wireless network is in place, the two hosts communicate using the reliable message protocol. This protocol is unique to the wireless communications device 100 and therefore requires implementation on both the wireless client 405 and the proxy server 180. Rather than invent a whole new API however, the reliable message protocol will instead use the same Berkeley sockets API that's used for TCP and UDP. Berkeley sockets is the de-facto standard network API on most platforms.

Since both TCP and RMP are accessed through the Berkeley sockets API, there is very little layering that needs to be added on top of these two protocol APIs in order to provide a network independent reliable message layer 635 API. In fact, the only difference between the two protocols is the socket type used when opening up the socket (TCP vs. RMP). Hence, the only API call unique to the reliable message layer 635 on the wireless client 405 will be a call to return the preferred socket type to use when communicating over the wireless network. This call would query the list of network interfaces and return the correct socket type to use: SOCK_RDM (RMP) if there is a wireless network interface 510 available and the wireless communications device 100 antenna is up, or SOCK_STREAM (TCP) otherwise.

Using the Reliable Message Layer on the Wireless Communications Device

Figure 11:
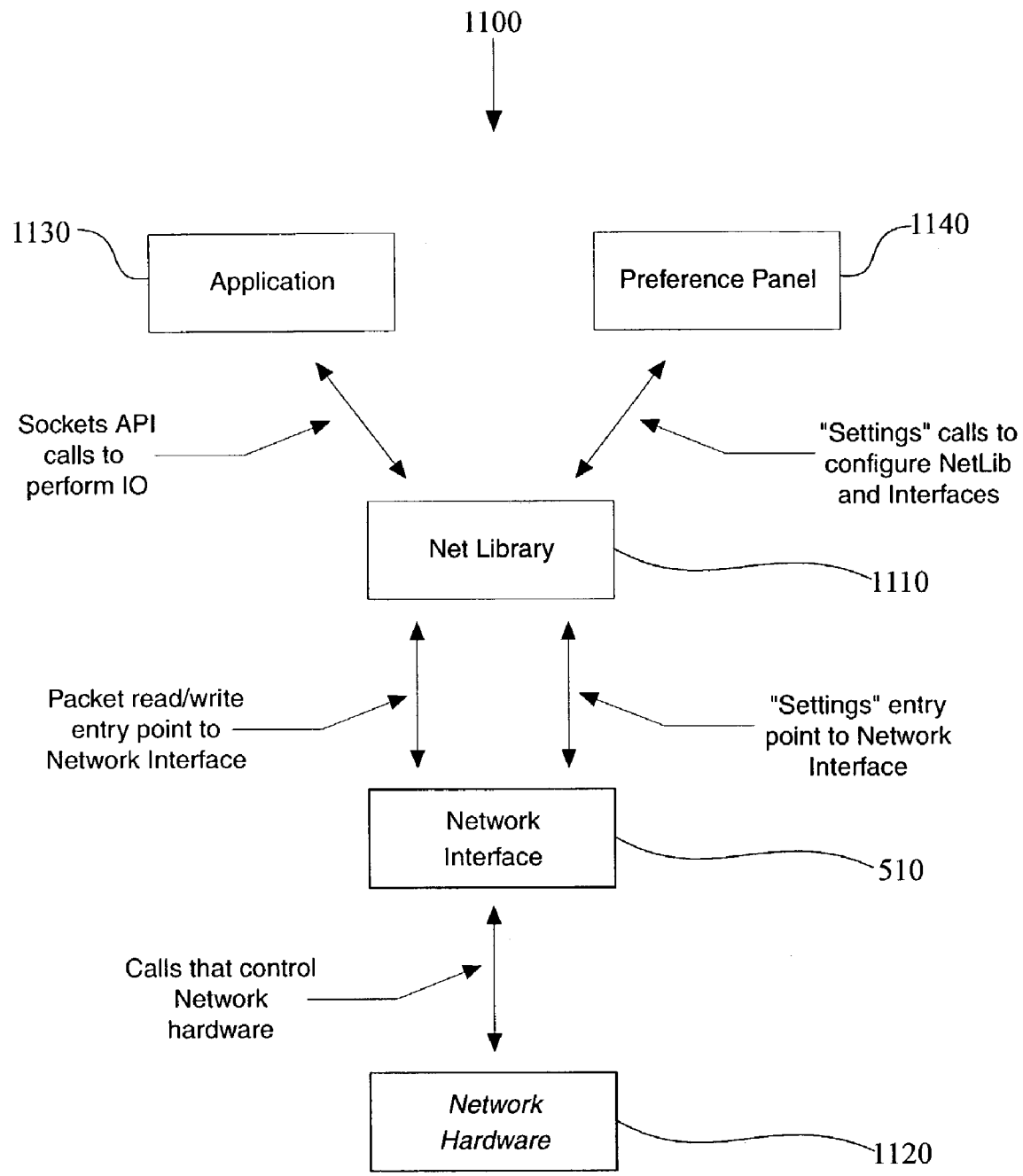
FIG. 11 illustrates lower level communication layers.

On the wireless communications device 100, the Reliable Message Protocol will be implemented as a new socket type to the network library. The network library is shown in FIG. 11 as 1110. The network library 1110 provides a Berkeley sockets API for network IO on the wireless communications device 100. The network library 1110 can support three socket types: datagram sockets, stream sockets, and message sockets. Datagram sockets utilize the UDP protocol, stream sockets utilize the TCP protocol, and message sockets utilize the RMP protocol.

Since RMP and TCP both use the Berkeley sockets API, the reliable message layer 635 API is essentially the Berkeley sockets API. Once a socket of the appropriate type has been opened, all other calls for reading and writing data, etc. are the same for the three protocols. There are certain usage restrictions in the sockets API that are observed (see below), but these restrictions can be applied equally to the socket types.

The following sequence of instructions details how the wireless client 405 application on the wireless communications device 100 performs a transaction with the proxy server 180. Keep in mind that every new transaction will go through the following sequence:

1.) Call RMLSocketType( ) to find out what type of socket to open up. This call will determine whether the client radio 440 antenna is up and if so, will return SOCK_RDM (Reliably Delivered Message) indicating that a RMP socket should be opened. If the client radio 440 antenna is not up, or if there is no wireless network interface 510 attached, SOCK_STREAM will be returned indicating that a TCP socket should be opened.

2.) Open up the socket using the socket( ) call. If there are any wireless network interfaces 510 attached, the socket( ) call will tell the wireless network interface 510 to prepare the client radio 440 for a transaction. Preparing the client radio 440 includes taking the client radio 440 out of low power mode, verifying signal strength, searching for a base station 170 if necessary, etc.

3.) Associate a local port number to the socket using bind( ) and a remote host IP address and port number using connect( ). The remote host port number used will be a pre-defined constant for the proxy server 180. The local host port number will be specified as 0—which tells the sockets API to pick the next unused local port number. Similar to sockets of type SOCK_DGRAM, SOCK_MESSAGE sockets do not perform any network IO during bind or connect calls. These calls simply store the local and remote addresses in the socket structure.

4.) Send the message request using write( ), send( ), sendto( ) or sendmsg( ). The entire message is passed at once (a requirement for SOCK_MESSAGE sockets) and the caller will not be allowed to send any more additional data for the same socket. After the message is sent, the socket should be shutdown in the transmit direction using shutdown( ) (a requirement for SOCK_STREAM sockets). The shutdown call is necessary so that the TCP socket on the proxy server 180 receives an end-of-file indication at the end of the message.

5.) Receive the response using read( ), recv( ), recvfrom( ), or recvmsg( ). These calls should be made repeatedly until end-of-file is returned, which indicates the end of the response message. Optionally, the caller can block on both network IO and user events simultaneously by using the select( ) call.

6.) Close the socket using close( ). If there are any wireless network interfaces 510 attached, this will have the side effect of putting the client radio 440 back into power-save mode.

Implementation of RMP

Ideally, RMP would appear as a new socket type on both the wireless communications device 100 and the proxy server 180 platform. Unfortunately, new socket types can not be easily implemented on the proxy server 180 since this is usually not a part of the proxy server 180 operating system that can be extended by third party developers. So, a compromise will be made on the proxy server 180 side. Therefore, the RMP protocol is implemented as a layer on top of the built-in sockets API, but with more or less the same calling conventions and parameters as the sockets API.

On the wireless communications device 100, the RMP protocol is incorporated into the network 1 library 1110 as a new socket type. In order to accomplish this, the network library 1110 is re-structured to allow for optional extensions, like RMP, that add new socket types or network types. This approach, although more involved than the approach taken on the proxy server 180 platform, paves the way for adding other socket types to network library 1110 in the future for features such as infra-red and non-IP network protocols.

Implementation of RMP on the Proxy Server

On the proxy server 180 platform, RMP will be implemented as a layer of code on top of a TCP (SOCK_STREAM) socket. This layer of code will have the same calling conventions as the standard sockets API and behave in the same manner. Each of the calls in this layer will have the name RMPxxxxx where xxxxx is the name of the corresponding sockets API call.

Nearly all of the RMP socket calls correspond to an equivalent sockets API call, except RMPReady( ) which is used to implement select( ) functionality. The select call is unique in that it provides blocking support for a set of different socket types at once—both RMP sockets and standard sockets. See the description below of SuperSelect( ) for details on how this functionality is implemented.

For convenience, RMP socket calls are written to simply fall through to the standard sockets call if the socket descriptor is not for a RMP socket. Similarly, the SuperSelect( ) call is written such that it can be used in place of the standard select( ) call.

RMPsocket

This call creates a new socket and returns the socket refnum. It will be implemented as follows:

If the family and type of the socket are not the right values for a RMP socket, simply call socket( ) and return.

Allocate a private structure to hold the RMP socket info.

Create a TCP socket and store its descriptor in the newly created RMP socket info structure.

Store the RMP socket structure pointer in a global array indexed by descriptor. This array is large enough to hold all possible descriptor values for the operating system since it is used by other RMP calls to determine if a given descriptor is for a RMP socket or a built-in socket. This global array is referred to as the descriptor array.

Return the TCP socket descriptor.

RMPlisten

This call prepares a socket to accept incoming connection requests. It will be implemented as follows:

Call listen( ).

RMPaccept

This call blocks until an incoming connection request arrives for the socket. It then creates a new socket for the connection and returns the new socket refnum. It will be implemented as follows:

Call accept( ).

RMPbind

This call specifies a local IP address and port number for the socket. It will be implemented as follows:

Call bind( ).

RMPconnect

This call specifies a remote IP address and port number for the socket.

Call connect( ).

RMPrecv

This call blocks incoming data from the remote host and returns the number of bytes read. If end-of-file has been reached (the remote host shutdown the transmit side of its connection), 0 is returned. It will be implemented as follows:

Lookup the associated RMP socket structure pointer from the global descriptor array. If this is not a RMP socket (nil RMP socket pointer), simply call recv( ) and return.

If the next 1 or more bytes of the message have already been queued up in the RMP socket structure, return them.

If no more data is queued up AND all parts of the message have already been received (including the last packet which has the lastDg bit set in the RMP header 730), return end-of-file (0).

Loop calling recv( ) on the TCP socket. If a packet arrives out of order, queue it up in the socket structure and keep looping. Otherwise, return the requested number of bytes from the packet.

RMPsend

This call sends data to the remote host. For RMP sockets, the entire message is passed at once to RMPSend. It will be implemented as follows:

Lookup the associated RMP socket structure pointer from the global descriptor array. If this is not a RMP socket (nil RMP socket pointer), simply call send( ) and return.

Split the message into chunks small enough to fit into single packets, add an RMP header 730, a UDP header 720, and an IP header 710 to each packet, and send the packets to the TCP socket using send( ). The lastDg bit is set in the RMP header 730 of the last packet. If the message is a multi-packet message, save it in the socket structure for a period of time (on the order of 60 seconds) in case the remote host later requests a re-transmission of some of the message. The re-transmit requests are watched for and handled by RMPclose.

Set flag in socket structure indicating that a message has been sent and that further RMPsend( ) calls to this socket are not allowed.

RMPshutdown

This call terminates further input and/or output on a socket. It will be implemented as follows:

Lookup the associated RMP socket structure pointer from the global descriptor array. If this is not a RMP socket (nil RMP socket pointer), simply call shutdown( ) and return.

Set flags in socket structure indicating that the socket has been shutdown and that further IO in the receive and/or send direction is not allowed.

RMPclose

This call closes down a socket. It will be implemented as follows:

Lookup the associated RMP socket structure pointer from the global descriptor array. If this is not a RMP socket (nil RMP socket pointer), simply call close( ) and return.

Set flags in socket structure indicating that the socket has been shutdown and that further IO in the receive and send direction is not allowed.

Set flag in socket structure indicating that the socket has been closed.

If there is no message data saved for possible re-transmission (see RMPsend), free all memory allocated to the socket structure, close down the UDP socket, and remove the entry from the global descriptor array.

If there is message data saved for possible re-transmission, mark the socket structure as being in a close-wait state and block for a period of time (on the order of 60 seconds) waiting for re-transmit requests to arrive. If a re-transmit request is received during this time, re-transmit the requested packets (they were stored in the RMP socket structure pointer by RMPsend).

SuperSelect (int numfds, fd_set rfds, fd_set wfds, fd_set efds, struct timeval timeout)

This call is a replacement for the select( ) call. It supports RMP socket descriptors as well as standard descriptors. It blocks until any of the file descriptors in rfds, wfds, or efds become ready for IO and updates rfds, wfds, and efds with the set of ready descriptors on exit.

SuperSelect is implemented using a subroutine call named RMPReady( ). RMPReady( ) takes a RMP socket descriptor parameter and a direction parameter. It returns 1 if the RMP socket is ready for IO in the given direction, 0 otherwise. The direction parameter is either −1 for input, 0 for exception, or 1 for output.

Generally, the RMPReady( ) just loops calling select( ) on the TCP socket with a timeout of 0 until the socket either returns not ready, or until the next 1 or more bytes of message data can be queued up in the RMP socket structure. Each time that select( ) says that the TCP socket has a packet ready, the packet is read out of the TCP socket and queued into the appropriate place of the RMP socket structure. Since packets may arrive out of order, the arrival of a packet does not necessary mean that the RMPReady should return true.

The following pseudo-code illustrates how RMPReady( ) can be used to implement SuperSelect( ). In summary, Super-Select first checks to see if at least one of the RMP descriptors are ready and if so, changes the timeout for the following select( ) call to 0. It then calls the select( ) call in order to update the list of standard descriptors that are ready for IO. Finally, it goes through each one of the RMP descriptors to see which RMP descriptors are ready. If no descriptors are ready at the end (which could happen if an out-of-order packet arrived at a RMP socket), it loops back to call select again.

```
int SuperSelect(int nfds, fd_set rfds, fd_set wfds, fd_set efds, struct
timeval timeout)
{
numReady = 0
fd_set orig_rfds = rfds
fd_set orig_wfds = wfds
fd_set orig_efds = efds
// ----------------------------------------------------------------
// First, see if at least one of the RMP descriptors are ready
// ----------------------------------------------------------------
for each descriptor in rfds, wfds, efds
if it is an RMP descriptor
if timeout != 0
if RMPready(descriptor)
timeout = 0
// ----------------------------------------------------------------
// If at least one of the RMP descriptors are ready, use a
// 0 timeout just to update the list of other descriptors that are
// also ready.
// ----------------------------------------------------------------
while numReady == 0
rfds = orig_rfds, wfds = orig_wfds, efds = orig_efds
numReady = select(nfds, rfds, wfds, efds, timeout)
// ----------------------------------------------------------------
// Update the lists of standard descriptors that are ready with
// the RMP descriptors that are also ready. RMPReady is smart
// enough not to return true if the received packet is
// out-of-order.
// ----------------------------------------------------------------
for each descriptor in rfds, wfds, efds
if it is an RMP descriptor
if not RMPReady(descriptor)
rfds,wfds,efds[descriptor] = false
numReady --
//end while
return numReady
}
```

Implementation of RMP on the Wireless Communications Device

On the wireless communications device 100, the RMP protocol is incorporated into the network library 1110 as a new socket type. Rather than statically link the RMP protocol into the network library 1110, the network library 1110 is re-structured to accept plug-in network library 1110 extensions that can add new socket or network types.

These network library 1110 plug-ins will be structured as wireless communications device 100 operating system 102 libraries, just like network library 1110 is a library, but with certain pre-defined entry points that are specifically for use by network library 1110. When the plug-in libraries are installed, they will register themselves with network library 1110 and tell network library 1110 which socket type(s) and network type(s) the plug-in libraries support.

Whenever network library 1110 receives a socket open request, it will check the network and socket type and call the appropriate network library 1110 plug-in library to handle the open request. In addition, any network library 1110 calls that take a socket refnum, like listen( ), accept( ), read( ), write( ), etc. will check the socket refnum and pass control onto the appropriate network library 1110 plug-in if the socket is not a built-in type.

The select( ) call in the Network library 1110 will also have to be extended in order to support Network library 1110 plug-ins. One embodiment of select for the Network library 1110 includes logic similar to that described above for the SuperSelect( ) call on the proxy server 180. It will have to be aware of plug-in socket types and call the appropriate plug-in library for any of the socket descriptors that don't correspond to built-in socket types. The plug-in library call will tell select whether or not that particular socket is ready for IO.

In order to simplify the allocation of socket descriptors, network library 1110 reserves a first group of socket descriptors for built-in socket types. Network library 1110 plug-ins can choose a free descriptor number from one of the other 12 possible descriptors that are not reserved for the built-in sockets (there are a total of 16 possible selectors on the wireless communications device 100). Having the descriptors partitioned in this way simplifies and speeds up the logic in the select( ) call and other portions of the network library 1110. Network library 1110 plug-in modules will also have to call the system event group signal function SysEvGroupSignal( ) whenever one of their sockets becomes ready for IO, just like built-in network library 1110 sockets do. This is done in order to unblock the select( ) call, and could be performed from an interrupt routine or a separate background task created by the plug-in.

An important thing to note about RMP sockets, is that the caller will call either recv or select repeatedly while waiting for a response to arrive. This is due to the way that re-transmit requests from the remote host are handled. Instead of creating a separate task to watch for re-transmit requests, the RMP plug-in simply looks for and processes re-transmit requests during recv and select calls.

Network Library RMP Socket Plug-in

The following descriptions provide a cursory overview of how each of the calls in the network library 1110 RMP socket plug-in will operate on the wireless communications device 100. An important difference this wireless client 405 implementation and proxy server 180 implementations of RMP is that the wireless client 405 side is implemented on top of UDP whereas the proxy server 180 is implemented on top of TCP. Since the following calls are part of the network library 1110 plug-in, they will be labeled as PIxxxxx where xxxxx is the particular sockets API call that each one implements.

PIsocket

This call creates a new socket and returns the socket refnum. It will be implemented as follows:

Allocate a private structure to hold the RMP socket info and grab an unused socket descriptor in the range allowed for Network library 1110 plug-ins.

Call Network library 1110 to create a UDP socket and store its descriptor in the newly created RMP socket info structure.

Return the RMP socket descriptor obtained in step #1.

PIlisten

This call prepares a socket to accept incoming connection requests. This call will not be implemented on the wireless client 405 since it does not support incoming RMP connection requests—only the proxy server 180 implementation does.

PIaccept

This call blocks until an incoming connection request arrives for the socket. It then creates a new socket for the connection and returns the new socket refnum.

This call will not be implemented on the wireless client 405 since it does not support incoming RMP connection requests—only the proxy server 180 implementation does.

PIbind

This call specifies a local IP address and port number for the socket. It will be implemented as follows:

Call the network library 1110 bind( ) call on the UDP socket descriptor.

PIconnect

This call specifies a remote IP address and port number for the socket. It will be implemented as follows:

Call the network library 1110 connect( ) call on the UDP socket descriptor.

PIsend, PIsendto, PIwrite, PIsendmsg

These calls send data to the remote host. For RMP sockets, the entire message is passed at once to RMPSend. They will be implemented as follows:

Get the pointer to the RMP socket info structure from the socket descriptor.

Split the message into chunks small enough to fit into single packets, add RMP headers 730, and send them to the UDP socket using send( ). The lastDg bit is set in the RMP header 730 of the last packet. If the message is a multi-packet message, save it in the socket structure in case the remote host later requests a re-transmission of some of the message. The PIrecv( ) and PIReady( ) calls will take the proper action and re-transmit request packets if they detect a re-transmit request while waiting for a response to arrive.

Set flag in RMP socket info structure indicating that a message has been sent and that further PIsend( ) calls to this socket are not allowed.

PIrecv, PIrecvfrom, PIrecvmsg, PIread

These calls block on incoming data from the remote host and return the number of bytes read. If end-of-file has been reached (the remote host shutdown the transmit side of its connection), 0 is returned. They will be implemented as follows:

Get the pointer to the RMP socket info structure from the socket descriptor.

If the next 1 or more bytes of the message have already been queued up in the RMP socket info structure, return them.

If no more data is queued up AND all parts of the message have already been received (including the last packet which has the lastDg bit set in the RMP header 730), return end-of-file (0).

Loop calling network library's 1110 recv( ) on the UDP socket. If a packet arrives out of order, queue it up in the RMP socket info structure and keep looping. If a re-transmit request packet is received, re-transmit the correct packets. Otherwise, return the requested number of bytes from the packet.

PIshutdown

This call terminates further input and/or output on a socket. It will be implemented as follows:

Set flags in socket structure indicating that the socket has been shutdown and that further IO in the receive and/or send direction is not allowed.

PIclose

This call closes down a socket. It will be implemented as follows:

Get the pointer to the RMP socket info structure from the socket descriptor.

Free the RMP socket info pointer.

Call the network library 1110 close( ) function on the UDP socket to close it down.

Network Library Select Call Enhancement

As mentioned above, the network library 1110 is enhanced to support plugins that provide new socket types and network types. Besides branching off to the correct plug-in handler for calls that operate on sockets (like bind, connect, send, recv, etc.) the network library 1110 is also plug-in aware in order to implement the select call.

Select (int numfds, fd_set rfds, fd_set wfds, fd_set efds, struct timeval timeout)

The select call blocks until any of the socket descriptors in rfds, wfds, or efds become ready for IO and updates rfds, wfds, and efds with the set of ready descriptors on exit.

Select is modified to look for sockets that belong to plug-ins and to utilize a routine in each plug-in named PIReady( ). PIReady( ) takes a socket descriptor parameter and a direction parameter. It returns 1 if the socket is ready for IO in the given direction, 0 otherwise. The direction parameter is either −1 for input, 0 for exception, or 1 for output.

For RMP sockets, PIReady( ) just loops calling select( ) on the UDP socket that it owns with a timeout of 0 until the socket either returns not ready, or until the next 1 or more bytes of message data are queued up in the RMP socket structure. Each time that select( ) says that the UDP socket has a packet ready, the packet is read out and processed. Since packets may arrive out of order or they may be re-transmit requests, the arrival of a packet does not necessary mean that the PIready should return true.

The following pseudo-code illustrates how PIReady( ) will be used to implement select( ). In summary, it first checks to see if at least one of the plug-in descriptors are ready and if so, changes the timeout for the following select( ) call to 0. It then calls the select( ) call in order to update the list of built-in descriptors that are ready for IO. Finally, it goes through each one of the plug-in descriptors to see which plug-in descriptors are ready. If no descriptors are ready at the end (which could happen if an out-of-order packet arrived at a RMP socket), it loops back to call select again.

```
int select(int nfds, fd_set rfds, fd_set wfds, fd_set efds, struct timeval
timeout)
{
numReady = 0
fd_set orig_rfds = rfds
fd_set orig_wfds = wfds
fd_set orig_efds = efds
// ----------------------------------------------------------------
// First, see if at least one of the plug-in descriptors are ready
// ----------------------------------------------------------------
for each descriptor in rfds, wfds, efds
if it is an plug-in descriptor
if timeout != 0
if PIready(descriptor)
timeout = 0
// ----------------------------------------------------------------
// If at least one of the plug-in descriptors are ready, use a
// 0 timeout just to update the list of built-in descriptors that are
// also ready.
// ----------------------------------------------------------------
while numReady == 0
rfds = orig_rfds, wfds = orig_wfds, efds = orig_efds
numReady = select(nfds, rfds, wfds, efds, timeout)
// ----------------------------------------------------------------
// Update the lists of built-in descriptors that are ready with
// the plug-in descriptors that are also ready. For example,
// PIReady for RMP sockets is smart enough not to return true
// if the received packet is out-of-order.
// ----------------------------------------------------------------
for each descriptor in rfds, wfds, efds
if it is an plug-in descriptor
if not PIReady(descriptor)
rfds,wfds,efds[descriptor] = false
numReady --
//end while
return numReady
}
```

Wireless Network Interface

This section describes the wireless network interface 510 module for the wireless communications device 100 network library 1110. FIG. 11 shows a block diagram of the lower level communication layers on a wireless communications device 100. The wireless network interface 510 is seen situated between the network library 1110 and the network hardware 1120. The wireless network interface 510 isolates the actual network hardware 1120 from the network library 1110 and provides a generic interface to the network library 1110.

The network library 1110 serves wireless client 405 applications 1130 and a client preference panel 1140.

This module enables the network library 1110 to access the Wireless packet data network as an IP network. Once installed, any application can access the Wireless packet data network using the Berkeley sockets API of the network library 1110.

The network library 1110 is designed in such a way that support for new network hardware, like the client radio 440, can be added dynamically simply by installing an appropriate network interface module onto the wireless communications device 100. Network interface modules are separately linked databases that contain the code necessary to abstract the network hardware. They can be "attached" and "detached" from the network library 1110 at run-time, usually through a preference panel 1140. For example, both PPP and SLIP are provided by separate network interface databases in the ROM and one or the other is selected for use through the network preference panel 1140.

In addition to the PPP and SLIP interfaces, wireless communication devices 100 also have a wireless network interface 510. When this wireless network interface 510 is attached to the network library 1110, applications will be able to communicate over the wireless packet data network using the Berkeley sockets API of the network library 1110.

The wireless communications system operates primarily through the proxy server 180 and therefore does not emphasize providing support for TCP/IP clients like FTP, Telnet, etc. that talk directly to standard Internet services. In particular, the wireless packet data network does not have the built-in IP routing support that would be necessary to transfer IP packets directly from a host on the Internet to a wireless client 405. Furthermore, wireless clients 405 do not have a unique Internet IP address assigned to them. However, there is a mechanism in place that allows wireless clients 405 to communicate indirectly with other hosts on the Internet 190, even in the absence of direct IP routing. In some embodiments, the wireless packet data network is enhanced to support direct IP routing without any further impact on the client software.

Structure of the Wireless Network Interface

Conceptually, all wireless network interfaces 510 have two entry points: a packet read/write entry point and a settings entry point. The packet read/write entry point is used e for sending and retrieving IP packets over the network. The settings entry point is used to configure the wireless network interface 510 with the appropriate settings it needs to communicate—such as IP address, user account information, etc. Typically, only a preference panel 1140 will change or access settings and only applications will read or write packets.

There are a number of existing pre-defined settings that are applicable across all wireless network interfaces 510; like IP address, subnet mask, etc. Besides providing a mechanism to configure the wireless network interface 510, the settings can also be read in order to query the wireless network interface 510 for information. Some of the currently defined settings are very general (like IP address) or applicable only to serial based interfaces (like login script, baud rate, etc.). If a particular setting is not applicable to a wireless network interface 510, the setting can be quietly ignored. For wireless network interfaces 510, like the wireless packet data network interface, a set of new settings is defined for wireless specific functionality. These new settings provide wireless network access point radio 420 specific information like signal strength, base station 170 info, etc.

Enhancements to the Network Library

A unique consideration of wireless network interfaces 510 is their power management. Unlike interfaces such as PPP and SLIP, it is very important that wireless network interfaces 510 are placed into power save mode whenever the wireless network interfaces 510 are not being used. In order to accomplish this, the network library 1110 is adapted to be wireless network "aware", and hence able to place wireless network interfaces 510 into power-save mode when appropriate.

The network library 1110 generally takes the following course of action: when the first socket is opened, the network library 1110 tells all attached interfaces (through a new setting) to come out of power-save mode and to prepare for transactions; when the last socket is closed, the network library 1110 tells all attached interfaces to go back into power-save mode. This requires a change to the network library's 1110 socket open and close routines and a new setting that is implemented by all wireless network interfaces 510. Existing interfaces like SLIP and PPP can quietly ignore the new setting call. This model assumes that wireless applications will be conservative about opening sockets and immediately close them when no longer needed in order to save power.

Another consideration for wireless network interfaces 510 is that they generally search for a base station 170 when the wireless network interfaces 510 first power up. Typically, this search takes only a couple seconds. But if the user has traveled across country for instance, it could take ten seconds or more. This is not entirely unlike the connection negotiation sequence that PPP goes through when it starts up and can in fact be performed when the wireless network interface 510 is told to come "up" by the network library 1110—just like PPP and SLIP do. So, this feature of wireless network interfaces 510 does not require any new functionality on the part of the network library 1110.

Header Compression

Some embodiments of the invention include a method for formatting a packet of data. The formatting method comprises the following four steps. Determining that the packet destination is a proxy server 180. Setting a first bit in a compressed user datagram protocol (C-UDP) header to indicate that the packet destination is the proxy server 180. Placing bit flags in the C-UDP header to indicate whether optional delivery and Internet 190 protocol fields are included in the header. Placing a source port number identifying a wireless client 405 in the C-UDP header. The packet of data comprises a message encapsulated by the C-UDP header. In some embodiments, the bit flags indicate that no optional UDP fields and no optional Internet protocol fields are included in the C-UDP header.

In some embodiments, the method for formatting a packet of data further comprises the following steps are performed prior to determining that the packet of data is to be transmitted to the proxy server 180. A reliable message protocol socket splits messages received from wireless client 405 processing resources into datagrams. The reliable message protocol socket adds a reliable message protocol header 730 to the packet of data before passing the datagram to a user datagram socket. An Internet 190 protocol stack adds an Internet 190 protocol header 710 and a best effort delivery header to the packet of data before passing the packet of data to a wireless network interface 510. The packet of data comprises one of the datagrams.

In some embodiments, the method for formatting a packet of data further comprises the following two steps after placing a source port number in the C-UDP header identifying the wireless client 405 in the compressed C-UDP header after the plurality of bit flags. A wireless network interface 510 adding a wireless system header. Encapsulating the packet of data in the following order: the wireless system header followed by the C-UDP header, followed by the reliable message protocol header 730, followed by the message.

For some embodiments, wireless client 405 processing resources reside at a network library 1110 and comprise the reliable message protocol socket and the Internet protocol stack.

Figure 12:
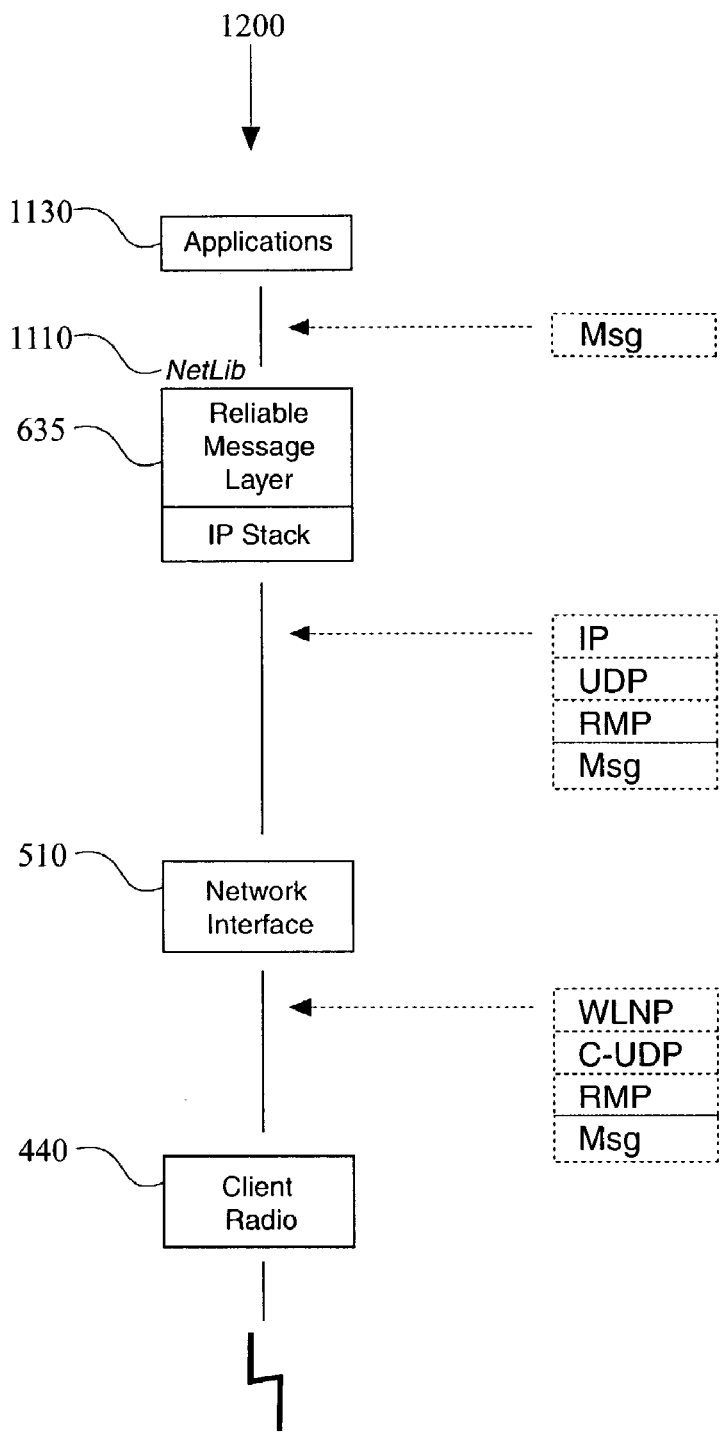
FIG. 12 illustrates the format of data passed between wireless client software layers.

FIG. 12 shows a block diagram of wireless client 405 software and the format of the data passed between each of the software layers. The application at the very highest layer sends messages to a reliable message protocol socket in the network library 1110. The reliable message protocol socket then splits the message into datagrams and adds a RMP header 730 to each datagram before passing it to a UDP socket of the network library 1110. The IP stack in the network library 1110 then adds an IP header 710 and UDP header 720 to each packet and passes the packets on down to the wireless network interface 510.

As shown in FIG. 12, packets that get sent to the packet-write entry point of the wireless network interface 510 by the network library 1110 have an IP header 710, followed by a UDP header 720, followed by a RMP header 730, and finally, the message datagram.

Now, before the wireless network interface 510 passes the packet to the client radio 440, the wireless network interface 510 adds the wireless network protocol header, called a WLNP, to the packet. A WLNP header contains source and destination host addresses and the overall packet size, among other things. All hosts on the wireless packet data network are addressed using unique source account numbers that are 24 bits long.

In the case where the packets are destined for the proxy server 180, the unique destination account number will be of the tunneler 430, which can be connected through an X.25 link to a wireless network access point 410 as illustrated in FIG. 5—Wireless Network Topology. The unique source account number will be the client's unique account number. Since the source and destination host addresses are already specified in the WLNP header, the source and destination IP addresses that are in the IP header 710 are not necessary.

In addition to source and destination IP addresses, there are a number of other fields in the IP header 710 and the UDP header 720 that are not required when transferring RMP datagrams between the wireless client 405 and the proxy server 180. In order to reduce the overall header size to an absolute minimum, the entire IP header 710 and UDP header 720 are replaced with a Compressed UDP (C-UDP) header which contains only the bare minimum amount of information necessary. Likewise, at the proxy server 180 side, the tunneler 430 will have to re-create the original IP header 710 and UDP header 720 using just the information from the WLNP and C-UDP headers.

The C-UDP Header

In order to determine what information is necessary in the C-UDP header, we look at a number of factors, including the contents of IP header 710 and the UDP header 720 as well as the environment in which the C-UDP headers are used. Unlike the IP header 710 and the UDP header 720, the C-UDP header is not optimized as a general purpose header. The C-UDP header can be highly specialized (and hence highly compressed) for use between a wireless client 405 and proxy server 180 over the wireless packet data network. The C-UDP header also provides a mechanism to represent any possible IP packet type that could be sent from a wireless packet data network wireless client 405 including IP packets meant for applications other than a wireless communications device 100.

Figure 13:
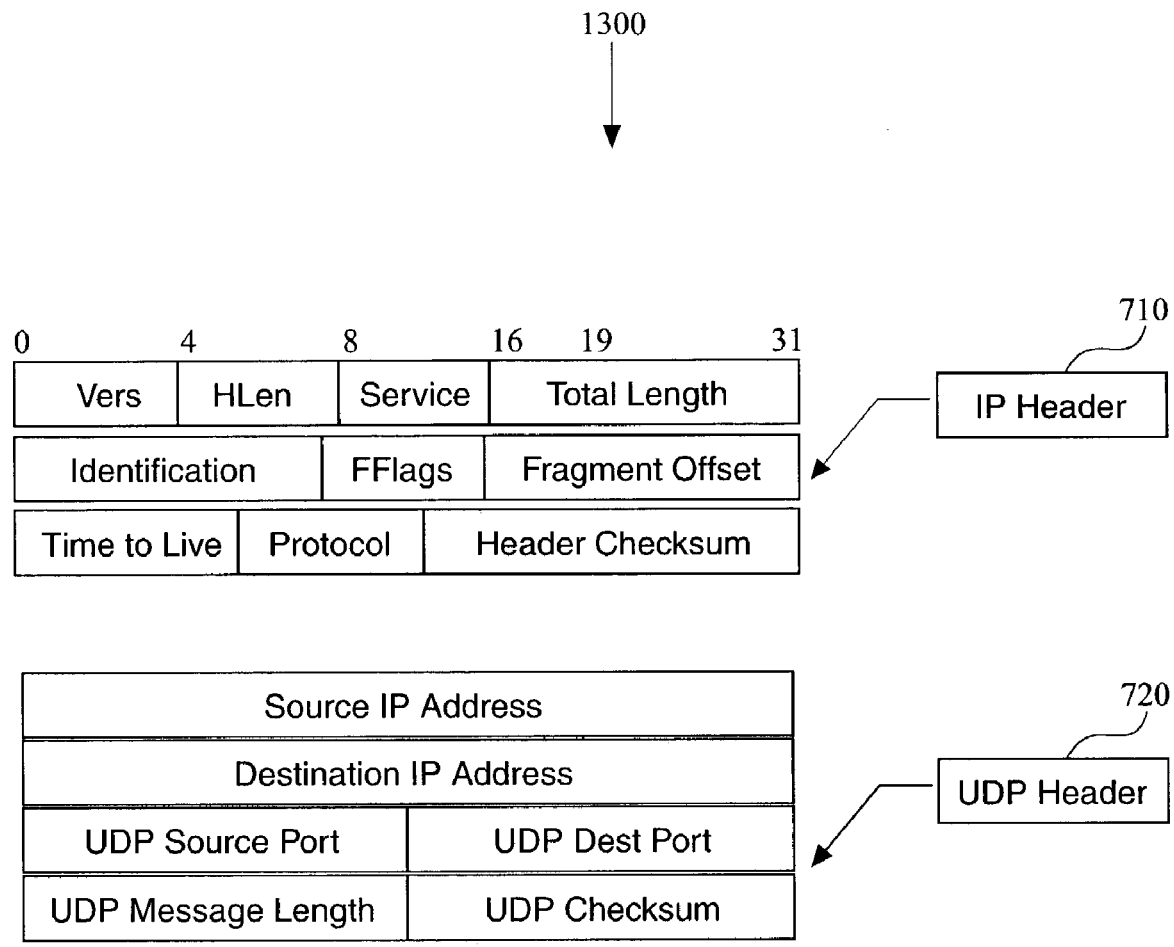
FIG. 13 illustrates the format of an IP header and a UDP header.

FIG. 13 shows the format of the IP header 710 and the UDP header 720. All together, the two headers take up 28 bytes: 20 for the IP header 710 and 8 for the UDP header 720.

The format of the C-UDP header using the notation used to document CML and CTP is shown below. This notation was introduced and described in "Compact Data Structure Notation" section above.

```
Bit            jerryPkt
Bit            hasVersHlenServiceTTL
Bit            hasFragmentation
Bit            hasProtocol
Bit            hasSrcIP
Bit            hasDstIP
Bit unused
Bit            noCompression          // see description . . .
if (jerryPkt)
Bit[16]        sourcePort             // UDP source port
else
if (hasVersHlenServiceTTL)
Bit[4]         vers
Bit[4]         hlen
Bit[8]         serviceType
Bit[8]         ttl
if (hasFragmentation)
Bit[16]        identification
Bit[3]         fragFlags
Bit[13]        fragOffset
if (hasProtocol)
Bit[8]         protocol
if(hasSrcIP)
Bit[32]        sourceIPAddr
if(hasDstIP)
Bit[32]        destIPAddr
if(hasVersHlenService)
UInt32[?] ipOptions
if(!hasProtocol || protocol == udp)
Bit[16] sourcePort
Bit[16] destPort
//Byte[ ] udpData
else
//Byte[ ] ipData                      // may include TCP header
```

The C-UDP header can compress any type of IP protocol, not just the UDP protocol like the name implies. It is optimized however for UDP and doesn't provide as optimal a level of compression for other protocols like TCP.

The C-UDP header has a number of optional fields that are either present or not, depending on the value of the flag bits in the beginning of the header. The following sub-sections explain the various formats of the C-UDP header and where they are used.

The C-UDP Header for Compressed Packets

The first bit in the header is set for packets sent using the UDP protocol to the proxy server 180. For these packets, the only fields present in the C-UDP header are the UDP source port number for the wireless client 405 and the other seven bit flags for optional UDP header 720 and IP header 710 fields as shown above. The RMP header 730 and data then immediately follow the UDP source port number. All other fields that are present in normal IP header 710 and UDP header 720 can be omitted.

The vers, hlen, and serviceType fields can be omitted because these packets use version 4 of the IP header 710, have no IP options, and use normal service type. The total length is redundant because the WLNP header contains the total length. The identification, fflags, and fragment offset fields can be omitted because RMP datagrams are guaranteed to be small enough to not require fragmentation. The time to live field is not required because these packets go directly to the proxy server 180 at the wireless network access point 410 and do not pass through any IP routers. The protocol field is not required because the protocol is always UDP. The header checksum is not required because WLNPs already have CRC checks for data integrity. The source and destination IP addresses are not required because the source and destination hosts can be identified by the source and unique destination account numbers in the WLNP header.

Regarding fields in the UDP header 720, the UDP dest port is not required since the packets are always destined for the proxy server 180 destination port and the UDP message length and checksum are not required because the WLNP header already contains the overall packet length and has a CRC check for data integrity.

The wireless network interface 510 can determine if a packet can be compressed into this format by checking that the destination IP address is for the proxy server 180, that the protocol is UDP, and that the destination UDP port number is for the proxy server 180 service port. Determining that the destination IP address is for the proxy server 180 can be done by checking for a special value or comparing it with a value that has been registered with the wireless network interface 510 through a settings call. Since the packet itself will not go out onto the Internet 190, the address used to identify the proxy server 180 does not have to be a unique Internet IP address.

The C-UDP Header for Generic UDP Packets

For UDP packets that are not destined for the proxy server 180 service port, the first bit in the packet header will be 0 and will be followed by 7 more bits of flags that indicate the presence of other optional IP header 710 and UDP header 720 fields.

If the packet has a vers field of 4, no IP options, and a standard service type field (0), then the hasVersHlenService bit will be 0. Otherwise, the vers, hlen, and serviceType fields will follow the 8 bits of flags.

If the packet is not fragmented (the more fragments bit in the fFlags field is clear and the fragment offset is 0), then the hasFragmentation bit will be 0. Otherwise, the identification, fFlags, and fragment offset will be included. Notice the only time the identification field is present is when the fragmentation fields are also included. Technically, this identification field is not required except for fragmented packets, but there is a possibility that some IP implementations may not work correctly if this field is not sent verbatim between the 2 hosts.

If the packet's ttl field is the default ([what is the default value??]), then the hasTTLProtocol bit will be 0. Otherwise, the ttl and protocol (which is UDP) fields will be included.

If the source IP address is included in the packet, then the hasSrcIP bit will be set. Whether the source IP address is included or not is up to the wireless network interface 510 to decide. In some embodiments, the rule applied is to only include the source IP address if in fact the wireless client 405 has a real Internet 190 or intranet IP address. There is also a setting for wireless network interfaces 510 that gets set by a preference panel 1140 and this new setting will tell the wireless network interface 510 whether or not the wireless client 405 owns a genuine IP address or just a fake placeholder.

If the destination IP address is included in the packet, then the hasDstIP bit will be set. The only time the destination IP address will be left out is when sending packets to the proxy server 180.

The C-UDP Header for Other IP Packets

If a packet is not a UDP packet, its compressed format will generally be the same as for generic UDP packets described above, but the hasTTLProtocol bit will be set, the ttl and protocol fields will be included, and the sourcePort and destPort fields will NOT be included. Instead, the protocol specific fields will appear as-is immediately following the C-UDP header. For example, a TCP packet that has a destination IP address but no IP options would have its IP header 710 portion compressed into the C-UDP header format but its TCP header fields would appear as-is immediately after the destIPAddr field in the C-UDP header.

Finally, yet another option for C-UDP headers is for the noCompression bit to be set. If this bit is set, there are NO other fields from the C-UDP header following the first 8 bits of flags. Instead, the original, unadulterated IP header 710 and data of the packet will immediately follow the 8 bits of flags.

Proxy Server Details

Many embodiments of the invention arise from combining the compression techniques discussed above with proxy server 180 processing resources and wireless client 405 processing resources. Some of these embodiments are discussed directly below.

Some embodiments of the proxy server 180 include a method of transforming a first CTP message into an HTML request. In some embodiments, the method of transforming comprises combining the first message received from the wireless client 405 with a hypertext markup language hyperlink document. The first message comprises compressed representations of field values and field indices corresponding to fields in the hypertext markup language hyperlink document.

The proxy server 180 responds to requests by wireless clients 405 to fetch either web content or messaging information. The proxy server 180 carries most of the burden of bringing the information from the Internet 190, converting it to wireless client 405 compatible CTP and CML formats, and transferring it to the wireless client 405 over the wireless network. The wireless client 405, by comparison, simply sends requests to the proxy server 180 and displays the transferred data onto the wireless communications device 100 screen 101.

The proxy server 180 adequately services 100,000 users without introducing substantial delays. The proxy server 180 design is scalable so that any number of users can be supported in the future.

Besides acting as a proxy server 180 to the wireless clients 405, the proxy server 180 also acts as a client to existing Internet 190 mail and web servers. This means that the proxy server 180 includes support for almost all versions of HTML, HTTP, SMTP, POP, etc. as well as support for security protocols like SSL, S-HTTP, etc.

As described herein, some wireless network layouts require the use of multiple proxy servers 180 scattered throughout different regions in order to adequately service the entire country. Thus, proxy server 180 is designed to run on multiple machines simultaneously.

The proxy server 180 is to be stateless. In general, a stateless design is more tolerant of communication and protocol errors than a stateful design. A stateless design is also easier to implement and manage, especially with a network of distributed proxy servers 180. For example, with multiple distributed proxy servers 180, a stateful design would have to transfer state from one proxy server 180 to another if a user happened to temporarily move to a different region or if one of the proxy servers 180 went down for maintenance.

Because the proxy server 180 connections are distributed throughout various regions, proxy server 180 processing resources are replicated onto as many machines as necessary in order to handle regional loads. Proxy server 180 processing resources are shared on two or more machines to for load sharing for a single region and to provide both load balancing and continuous service in case a single machine goes down.

The proxy server 180 design is stateless so that the proxy servers 180 do not have to share information with each other, and so that users will not encounter any difficulties when they move from area to area and change which proxy server 180 they are using.

Some embodiments of the proxy server 180 can support a user database. The user database sets browsing options, messaging options, etc. on the proxy server 180 and reduces the amount of data that is sent between the wireless client 405 and proxy server 180 during normal operation. The user database is also used to collect statistics on usage patterns. Note that the user database is shared between all the proxy servers 180.

The proxy server 180 design also enables corporations to create their own intranets. For example, corporations can use a leased line connection from the nearest wireless network access point 410 center to a proxy server 180 at the corporation's own site and connected to the corporation's private intranet. To facilitate this, proxy server 180 processing resources are easy to setup, maintain and operate using off-the-shelf hardware.

The performance goal of the proxy server 180 is to process each request in less than 1 second. That is, given a typical request of 40 bytes to the proxy server 180, the proxy server 180 is able to access the requested content off the Internet, reformat it, and send a typical size response of 360 bytes to the wireless client 405 in less then one second. Taking into account the bandwidth and latency of the wireless packet data network, the user will see roughly a 7 to 11 second response time overall. The peak usage rate of the wireless communications devices 100 with 100,000 users will be 920,000 transactions per hour which is 256 transactions per second. This load can be divided up by as many proxy servers 180 as required.

Another important component of the proxy server 180 design is configuration and trouble-shooting support. Configuration support includes mechanisms for configuring the proxy server 180 for different environments, adjusting performance settings, displaying usage statistics, etc. These are all tasks that a system administrator performs when first setting up the proxy servers 180 and also performs periodically in order to keep the proxy servers 180 tuned and to monitor their performance. Trouble-shooting support includes mechanisms for an engineer to debug problems with the design and to enable special purpose diagnostics. Because of the distributed nature of the proxy server 180, these functions are controlled remotely. In order to enable remote control, the proxy server 180 processing resources support a telnet-like connection for these purposes.

Communications System Details

Many embodiments of the invention arise from combining the compression techniques discussed above with proxy server 180 processing resources, wireless client 405 processing resources, and features of the wireless packet data network. Some of these embodiments are discussed directly below.

Some embodiments of the invention provide a wireless client 405 comprising means for requesting a hyperlink document in a compressed form. The means for requesting a hyperlink document in a compressed form comprise means for sending a base document uniform resource locator followed by a compact representation of a first hyperlink and a compact representation of a hash value corresponding to the first hyperlink to proxy server 180 processing resources.

In some embodiments the wireless client 405 further comprises means for completing a transaction between a wireless client 405 and a proxy server 180. Some embodiments of the wireless client 405 further comprise means for transmitting a first message in packets of data to a proxy server 180. The first message corresponds to a hypertext document. The hypertext document has input fields and control fields. The means for transmitting comprises the following two steps. Submitting compressed representations of data corresponding to input fields and control fields formatted according to CTP to wireless client 405 processing resources. Transmitting packets of data comprising compressed representations of data to the proxy server 180. The compressed representations comprise text and name attributes corresponding to input fields and compressed values and value attributes corresponding to control fields and select fields.

In some embodiments of the wireless client 405 means for completing a transaction between a wireless client 405 and a proxy server 180 comprise means for transmitting a single request message sent from the wireless client 405 to a proxy server 180 and means for receiving a single response message from the proxy server 180. The request message comprises packets of data. Means for transmitting the request message comprise means for placing in the request message a base uniform resource locator followed by compressed data. The compressed data comprise field values and field indices corresponding to fields in a hyperlink document, and an indication of use of a hyperlink document.

Some embodiments of the invention include communications system comprising a source of data, a wireless client 405, and a proxy server 180. The wireless client 405 comprises means for requesting a hyperlink document in a compressed form. The proxy server 180 comprises means for transforming a first message into an HTML request, and means for converting an HTML response into a second message in a compact markup language. Some embodiments of the communications system further comprise a wireless network. The wireless network is in communication with both the proxy server 180 and the wireless client 405. For some embodiments of the communications system, the proxy server 180, the wireless client 405, and the source of data are disposed at three separate locations. For some embodiments of the communications system, the compact markup language comprises a stream of data comprising text and image data. The text data comprises multibit character representations for selected characters, eight-bit character representations for a first set of unselected characters, and sixteen-bit character representations for a second set of unselected characters, the multi-bit character representations comprising less than eight bits.

Some embodiments of the communications system further comprise means for completing a transaction between a wireless client 405 and a proxy server 180. The means for completing the transaction comprise means for transmitting a single request message from the wireless client 405 to the proxy server 180 and means for transmitting a single response message from the proxy server 180 to the wireless client 405. The request message comprises packets of data. Transmitting the request message comprises placing in the request message a base uniform resource locator followed by compressed data. The compressed data comprises field values and field indices corresponding to fields in a hyperlink document, and an indication of use of a hyperlink document. The single response message comprises packets of data. For some embodiments of the communications system, the number of packets in the request message is one and the packet size is less than one kilobyte.

Tunneling Support

Because the proxy server 180 is connected to the wireless network access point 410, the proxy server 180 can communicate with wireless clients 405 without having to go over the Internet 190. Therefore, the proxy server 180 does not require the IP routing support that other hosts on the Internet 190 would require. Generic IP access between wireless clients 405 and other hosts on the Internet 190 can be accomplished by adding the appropriate IP routing support to the wireless network access point 410 and assigning a unique Internet IP address to each wireless client 405.

As an alternative to direct IP routing support over the wireless packet data network, the proxy server 180 tunneler 430 (which can be a part of the proxy server 180 processing resources) will support a mechanism that enables wireless client 405 applications to "tunnel" IP packets to and from other hosts on the Internet 190. But, because the IP packets are imbedded within a TCP stream, custom proxy server 180 software written on the remote host is required in order to accept, process, and reply to these tunneled packets.

FIG. 5, Wireless Network Topology, shows a diagram of how the wireless client 405, wireless network, and tunneler 430 are interconnected. In general, the tunneler 430 takes packets off the wireless network, restores the original IP header 710 and UDP header 720 from the WLNP and C-UDP headers, and then tunnels each packet to the appropriate host using TCP. Most of the packets off the wireless network will be destined for the proxy server 180, but the packets can be sent to any other host accessible from the tunneler 430 over TCP. The tunneler 430 simply uses the destination IP address of each packet to determine which host is to receive the packet.

For a wireless packet data network with IP routing support, the tunneler 430 can act as a gateway and send the packets directly to the remote host without tunneling them within a TCP stream. Then, because the Internet 190 routing support would be in place, the packets sent back from the remote host would find their way back to the tunneler 430 and then get forwarded back over the wireless network to the wireless client 405.

With IP routing support present on the wireless packet data network, the tunneler 430 decides whether to send packets within a TCP stream to the remote host or to send them directly. There are advantages to tunneling packets even when IP routing support is available because the wireless client 405 can use the more efficient UDP protocol over the wireless link but still be guaranteed that the UDP packets received by the wireless access point 410 get delivered to the Internet 190 host (since they are sent using TCP). In order to make this decision easy for the tunneler 430, the following rule is used: the tunneler 430 will only tunnel UDP packets that have a destination UDP port number of between 0x7000 and 0x7FFF.

In order to effectively use the tunneler 430, the wireless client 405 and the proxy server 180 processing resources follow similar rules as those used by the RMP protocol. Namely, the host on the Internet 190 automatically closes down the TCP connection between it and the tunneler 430 whenever a transaction is over. Otherwise, TCP connections established from the tunneler 430 to remote hosts would remain open indefinitely. Just in case though, the tunneler 430 has a fairly large inactivity timeout on the TCP connections in order to automatically close them down.

Alternative System

Figure 14:
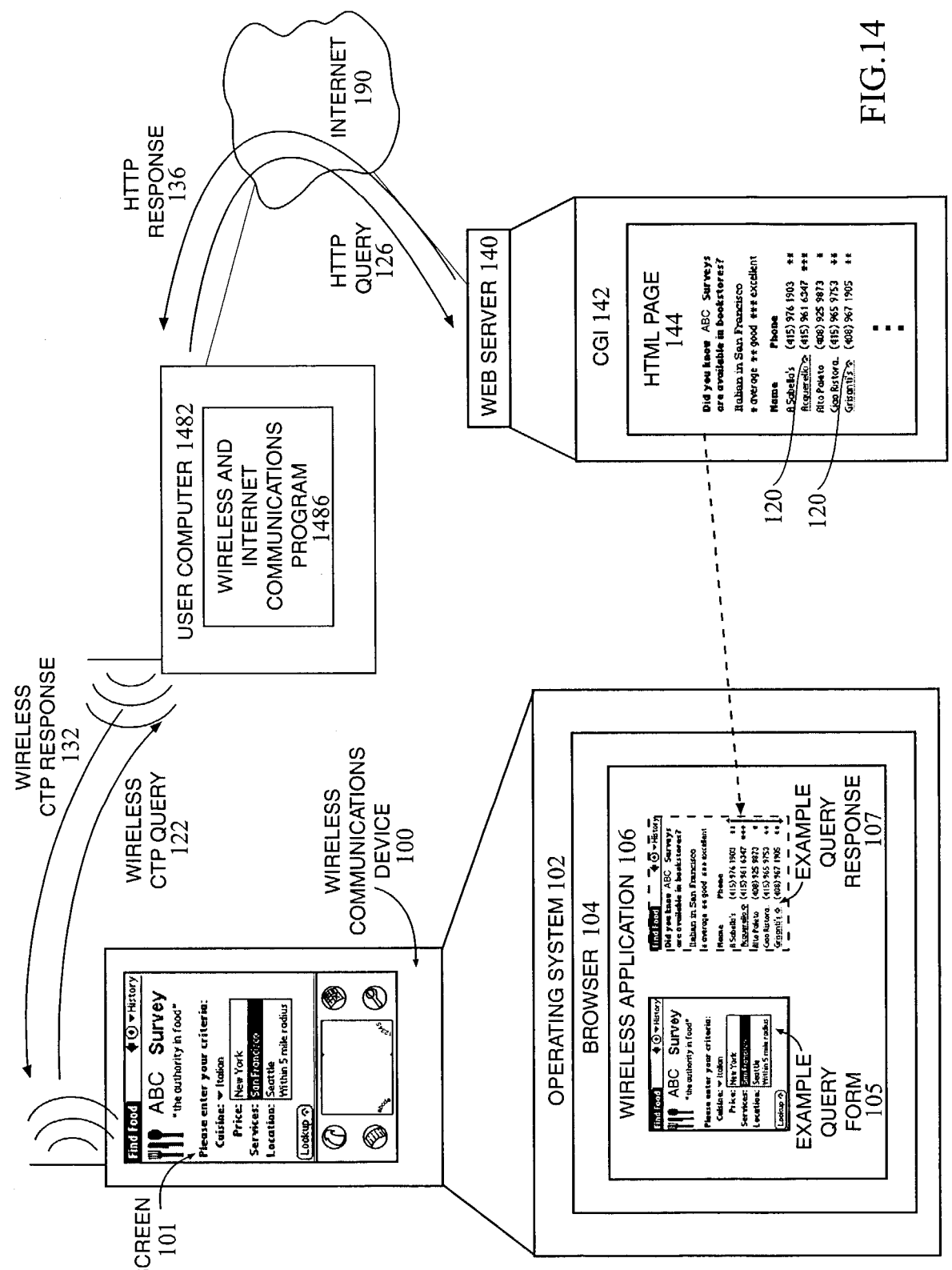
FIG. 14 illustrates an alternative system for communicating between a wireless communications device and a web server.

FIG. 14 illustrates another embodiment of a system that allows the wireless communications device 100 to communicate with the web server 140. The system of FIG. 14 illustrates an alternative embodiment where users can turn their own desktop computers or servers into wireless communications base stations 170 and proxy servers 180 for communicating with their wireless communications devices 100. The users install transceiver cards, or other hardware, and software on their computers. In this way, users can provide localized "free" Internet 190 access to wireless communications devices 100. Corporations can purchase additional hardware and software for some user computers or servers throughout their campus. Thus, the corporations can provide wireless communications to their employees. Alternatively, standalone systems can be purchased and plugged directly into the corporate Intranet.

The following describes an embodiment of the invention where a user's computer is substituted for the base station 170 and the proxy server 180. The other embodiments of the invention work in a similar manner.

Instead of the base station 170 and the proxy server 180, a user computer 1482 is included in this system. The user computer 1482 is executing a wireless and Internet communications program 1486. The user computer 1482 also includes an antenna 1470 and related wireless communications hardware. The user computer 1482 has an Internet connection that can be used for communicating to the web server 140.

The wireless communications device 100 communicates wirelessly with the user computer 1482. In one embodiment of the invention, the protocols used to communicate wirelessly are the same as those used in the wireless packet data network described above. In one embodiment of the invention, the wireless communications device 100 can communicate with both the wireless packet data network and computers having the wireless communications capability of the user computer 1482. However, other communications protocols can be used instead.

The wireless and Internet communications program 1486 performs the functions of the base station 170 and the proxy server 180.

In some embodiments, the user computer 1482 couples to a proxy server 180 through the Internet 190. The wireless and Internet communications program 1486 provides wireline communications to the proxy server 180. This would be for the purposes of providing secure communications, e-mail access, or for updating query form information that is not stored in the user computer 1482. In this configuration, the wireless and Internet communications program 1486 can perform the basic wireless communications base station functions, while the proxy server 180 can still perform the security and other proxy server functions. This configuration helps to provide users with a higher degree of security because the proxy server 180 is performing the secure communications with the web server 140. The proxy server 180 or the user computer 1482 can perform the conversions.

In some embodiments, instead of a transceiver card, an external transceiver device is used. The external transceiver can be connected to the computer via, for example, a serial connection, a Universal Serial Bus, a SCSI connection, or some other connection.

In some embodiments, the device is a standalone device that couples directly to a network (e.g., the device has its own IP address).

In some embodiments of the invention, the wireless communications device 100 can communicate with both the Mobitex system, or some other wireless data communications system, and the wireless communications system established with the computer 1482.

What is claimed is:

1. A method for indicating characteristics of a subsequent action, the method implemented in a communications device having processing resources and an operating system object including a user interface element for selection of the subsequent action, the method comprising: prior to a user beginning the subsequent action, the communications device processing resources providing a sensory cue corresponding to a set of subsequent action characteristics when the subsequent action includes wireless data communications performed by the communications device using compact mark-up language (CML), the set of subsequent action characteristics relate to the wireless data communications; the subsequent action characteristics comprise a link type, transmission mode, security measure attributes, maximum message size, cost of a subsequent action, or speed of a network; the sensory cue informing the user of the corresponding set of subsequent action characteristics, and the sensory cue comprises an image that is embedded into the user interface element when the subsequent action includes wireless data communications performed by the communications device and is removed when the subsequent action does not include wireless data communications performed by the communications device.

2. The method of claim 1, wherein responsive to a user selection of the subsequent action, the communications device processing resources transmitting data from the communications device.

3. The method of claim 1, wherein: responsive to a user selection of the user interface element, the communications device processing resources transmitting data from the communications device.

4. The method of claim 1, wherein the informing step includes adapting a sensory cue for perception by the user.

5. The method of claim 1, wherein the subsequent action characteristics correspond to factors enabling the user to determine whether to initiate the subsequent action.

6. The method of claim 1, wherein the communications device processing resources provide at least one sensory cue for at least one subsequent action, each sensory cue corresponding to characteristics of the data communication including characteristics of a communication path used for the data communication, each sensory cue informs the user of the corresponding data communication characteristics.

7. The method of claim 1, wherein the communications device includes a screen, and the method includes communications device processing resources displaying the image on the screen.

8. The method of claim 1, wherein: the sensory cue includes an image; the communications device includes a screen; and the method includes the communications device simultaneously displaying the at least one image and the user interface element on the screen.

9. The method of claim 1, wherein: the sensory cue includes sounds; the communications device includes an audio output, and the method includes the communications device emitting the sounds from the audio output.

10. The method of claim 1, wherein: the communications device includes a wireless client, the wireless client in communication with a proxy server; the subsequent action corresponds to a hyperlink document, the hyperlink document disposed in a base document; and the subsequent action includes transmitting packets of data from the client to the proxy server, each packet of data has a base document uniform resource locator followed by compressed data, the compressed data includes references to fields in the hyperlink document, and the compressed data includes a user interface element indicating the hyperlink document.

11. The method of claim 1, wherein the subsequent action includes the communications device receiving an HTML message from a source of data, the HTML message comprising text and images.

12. The method of claim 1, wherein: the communications device includes a wireless client and a screen, the wireless client adapted to communicate with a proxy server, the proxy server adapted to communicate with a source of data; and the subsequent action includes the proxy server receiving a first message from the source of data, the receiving including: the proxy server fetching the first message from the source of data; the proxy server converting the first message into a second message, the second message includes data in a compact mark up language representing text and images; the proxy server transmitting the second message to the wireless client, the second message comprising packets of data; the wireless client extracting the compact mark up language data from the second message; the wireless client passing the compact mark up language data to a content rendering layer; and the wireless client rendering the compact mark up language data for viewing on the screen.

13. The method of claim 1, wherein: the communications device processing resources include a wireless client; and the subsequent action includes the wireless client requesting a hyperlink document, the hyperlink document indicated by a hyperlink in a base document, the requesting including the wireless client transmitting to a proxy server a compact representation of the hyperlink document, the compact representation of the hyperlink document including a base document uniform resource locator and a compact representation of the hyperlink.

14. The method of claim 1, wherein: the communications device processing resources include a wireless client; and wherein the subsequent action includes the communications device transmitting packets of data to a proxy server, the packets of data corresponding to a hypertext document, the hypertext document having fields, the transmitting including: the communications device processing resources submitting to the wireless client compressed representations of data corresponding to the fields, the compressed representations formatted according to a compact transfer protocol; and the wireless client transmitting the compressed representations in packets of data to the proxy server.

15. The method of claim 1, wherein: the communications device processing resources include a wireless client; and the subsequent action includes the communications device transmitting packets of data to a proxy server, the transmitting including formatting each packet of data, the formatting including: the wireless client determining that the destination of the packet of data is the proxy server, the packet of data comprising a message fragment encapsulated by a compressed user datagram protocol header; the wireless client setting a first bit in the compressed user datagram protocol header to indicate that the destination of the packet of data is the proxy server; the wireless client placing bit flags in the compressed user datagram protocol header, the bit flags indicating inclusion of optional user datagram protocol fields and inclusion of optional Internet protocol fields; and the wireless client placing a source port number identifying the wireless client in the compressed user datagram protocol header.

16. The method of claim 1 wherein: the communications device includes a wireless client; the subsequent action includes a transaction including securely transmitting packets of data from the wireless client to a proxy server, the transmitting including: the wireless client encrypting a data encryption key using a proxy server public key to form an encrypted data encryption key, the data encryption key corresponding to a specific transaction between the wireless client and the proxy server; the wireless client encrypting the packets of data using the data encryption key to form an encrypted message; and the wireless client transmitting the encrypted message to the proxy server.

17. The method of claim 8, wherein the communications device simultaneously displays more than one user interface element on the screen.

18. The method of claim 8, wherein the communications device displays the at least one image proximally to the user interface element.

19. The method of claim 8, wherein the image comprises an icon, the icon informs the user of a link type for the data communications.

20. The method of claim 8, wherein the image comprises an icon, the icon informing the user of security measure attributes for the data communications.

21. The method of claim 8, wherein the communications device simultaneously displays more than one user interface element is on the screen, for user interface elements having at least one corresponding embedded image, each embedded image corresponds to a set of data communication characteristics, and the communications device displays each embedded image proximally to the corresponding user interface element.

22. The method of claim 11, wherein the receiving includes: the communications device processing resources fetching the HTML message from the source of data; the communications device processing resources compressing selected portions of the HTML message by translating the selected portions of the HTML message using a compact markup language; the communications device processing resources passing compact markup language representations of the selected portions and HTML representations of unselected portions of the HTML message to a rendering layer in the communications device; and the communications device processing resources rendering the selected portions and the unselected portions for viewing.

23. The method of claim 13, wherein: the communications device includes a screen; the communications device processing resources include a viewer, the compact representation of the hyperlink document includes a compact representation of the subsequent action characteristics; the sensory cue comprising an image; and the step of providing the sensory cue to the user includes: the viewer evaluating the compact representation of subsequent action characteristics; and the viewer displaying the image proximally to a corresponding user interface element, the corresponding user interface element adapted for user selection of the hyperlink and comprising an operating system data object, the image embedded in the operating system data object.

24. The method of claim 13, wherein: the communications device includes a screen; the communications device processing resources include a viewer, the subsequent action characteristics include a link type; the compact representation of the link type includes a link type bit; the image comprises a link type icon; and responsive to a value of the link type bit, the viewer displays a corresponding link type icon proximally to the user interface element.

25. The method of claim 13, wherein: the communications device includes a screen; the communications device comprises a palm-sized computer; the subsequent action characteristics include a link type; the compact representation of the subsequent action link type includes a link type bit; the image comprises a link type icon; responsive to the link type bit having a first value, the computer displays a wireless link icon proximal to the user interface element; responsive to the link type bit having a second value, the computer displays no image corresponding to the link type; and responsive to a user selection of the user interface element, the communications device initiates the subsequent action.

26. A communications device including a client and an operating system object including a user interface element for user selection of a subsequent action, the client comprising: processing resources adapted to initiate the subsequent action, the subsequent action having characteristics, the subsequent action includes wireless data communications performed by the client using compact mark-up language (CML); and processing resources adapted to indicate to a user, prior to the user initiating the subsequent action, the subsequent action characteristics, the subsequent action characteristics comprising a link type, transmission mode, security measure attributes, maximum message size, cost of a subsequent action, or speed of a network, the indicating processing resources provide a sensory cue to the user corresponding to a set of subsequent action characteristics when the subsequent action includes wireless data communications, the sensory cue informs the user of the subsequent action characteristics, and the sensory cue comprises an image and is embedded into the user interface element when the subsequent action includes wireless data communications performed by the communications device and is removed when the subsequent action does not include wireless data communications performed by the communications device.

27. The device of claim 26, wherein the subsequent action characteristics correspond to factors enabling the user to determine whether to initiate the subsequent action.

28. The device of claim 26, wherein the communication device processing resources provide at least one sensory cue for at least one subsequent action, each sensory cue corresponds to characteristics of the data communication including characteristics of the communication path user for the data communication, each sensory cue informs the user of the corresponding data communication characteristics.

29. The device of claim 26, wherein: responsive to a user selection of the user interface element, the client transmitting data from the communications device.

30. The device of claim 26, wherein the communications device includes a screen and processing resources, and the communications device processing resources adapted to display the image on the screen.

31. The device of claim 26, wherein: the sensory cue includes an image; the communications device includes a screen and processing resources; and the communications device processing resources adapted to simultaneously display the at least one image and the user interface element on the screen.

32. The device of claim 26, wherein: the client comprises a wireless client; the subsequent action includes the wireless client requesting a hyperlink document, the hyperlink document indicated by a hyperlink in a base document; and the wireless client processing resources adapted to request the hyperlink document, the requesting including transmitting to a proxy server a compact representation of the hyperlink document, the compact representation of the hyperlink document including a base document uniform resource locator and a compact representation of the hyperlink.

33. The device of claim 26, wherein: the client comprises a wireless client; the subsequent action includes a transaction including securely transmitting packets of data from the wireless client to a proxy server; the wireless client adapted to securely transmit the packets of data, the transmitting including: encrypting a data encryption key using a proxy server public key to form an encrypted data encryption key, the data encryption key corresponding to a specific transaction between the wireless client and the proxy server; the wireless client encrypting the packets of data using the data encryption key to form an encrypted message; and the wireless client transmitting the encrypted message to the proxy server.

34. The device of claim 32, wherein: the communications device includes a screen and processing resources, the communications device processing resources include a viewer, the compact representation of the hyperlink document includes a compact representation of the subsequent action characteristics; the sensory cue comprises an image; and the viewer adapted to evaluate the compact representation of subsequent action characteristics; and display the image proximally to a corresponding user interface element, the corresponding user interface element adapted for user selection of the hyperlink and comprising an operating system data object, the image embedded in the operating system data object.

35. A communications system comprising: a source of data; a communications device including a client and an operating system object including a user interface element for user selection of a subsequent action, the client including: processing resources adapted to initiate the subsequent action, the subsequent action having characteristics, the subsequent action including wireless data communications performed by the client using compact mark-up language (CML); and processing resources adapted to indicate to a user, prior to the user beginning the subsequent action, the subsequent action characteristics, the subsequent action characteristics comprising a link type, transmission mode, security measure attributes, maximum message size, cost of a subsequent action, or speed of a network, the processing resources adapted to indicate by providing a sensory cue to the user corresponding to a set of subsequent action characteristics when the subsequent action includes wireless data communication, wherein the sensory cue comprises an image and is embedded into the user interface element when the subsequent action includes wireless data communications performed by the communications device and is removed when the subsequent action does not include wireless data communications performed by the communications device; and a server, in communication with the source of data and the client.

36. The system of claim 35, wherein responsive to a user selection of the subsequent action, the communications device initiating processing resources initiate the subsequent action.

37. The system of claim 35, wherein the subsequent action characteristics correspond to factors enabling the user to determine whether to initiate the subsequent action.

38. The system of claim 35, wherein: responsive to a user selection of the user interface element, the client transmitting data from the communications device.

39. The system of claim 35, wherein: the communications device: includes a screen and is adapted to display the image and the user interface element on the screen.

* * * * *